June 2, 1925.

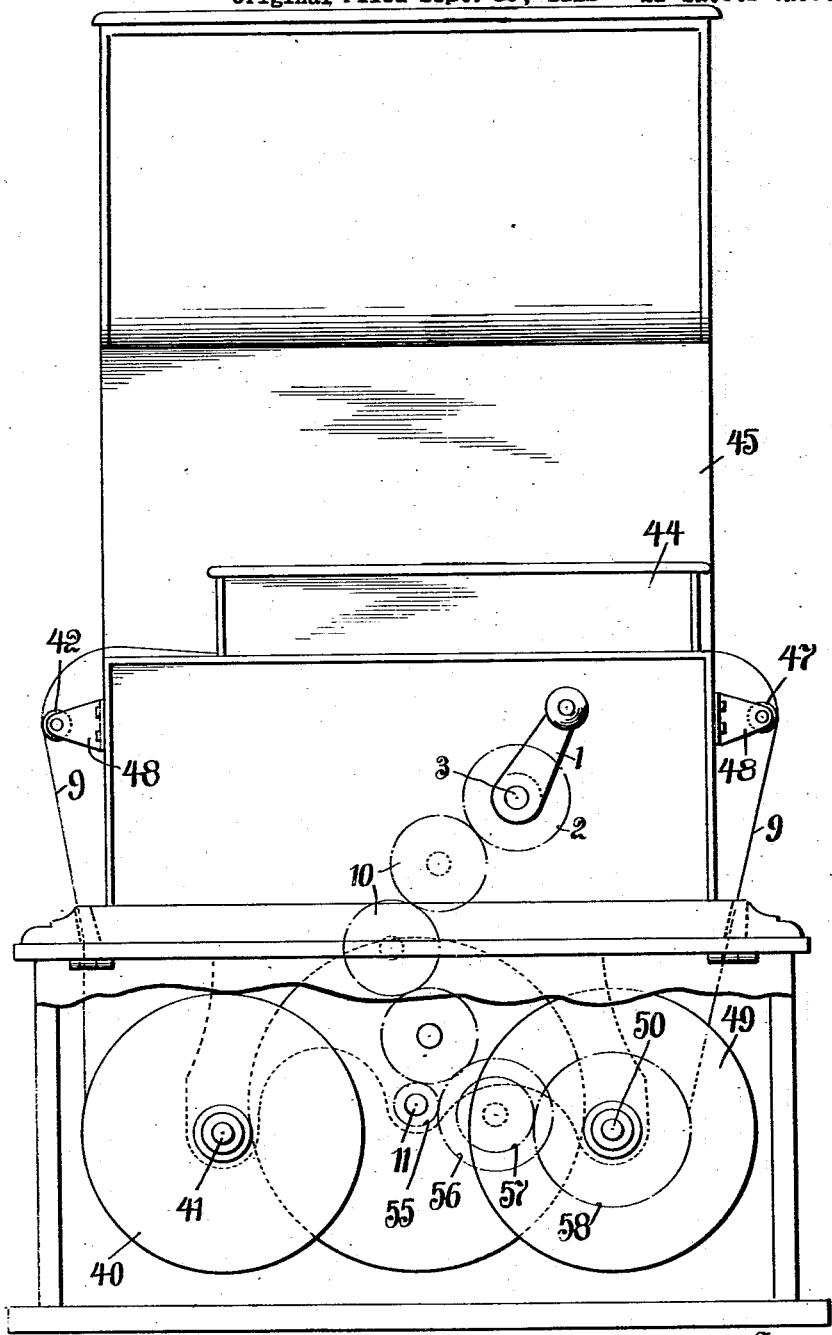

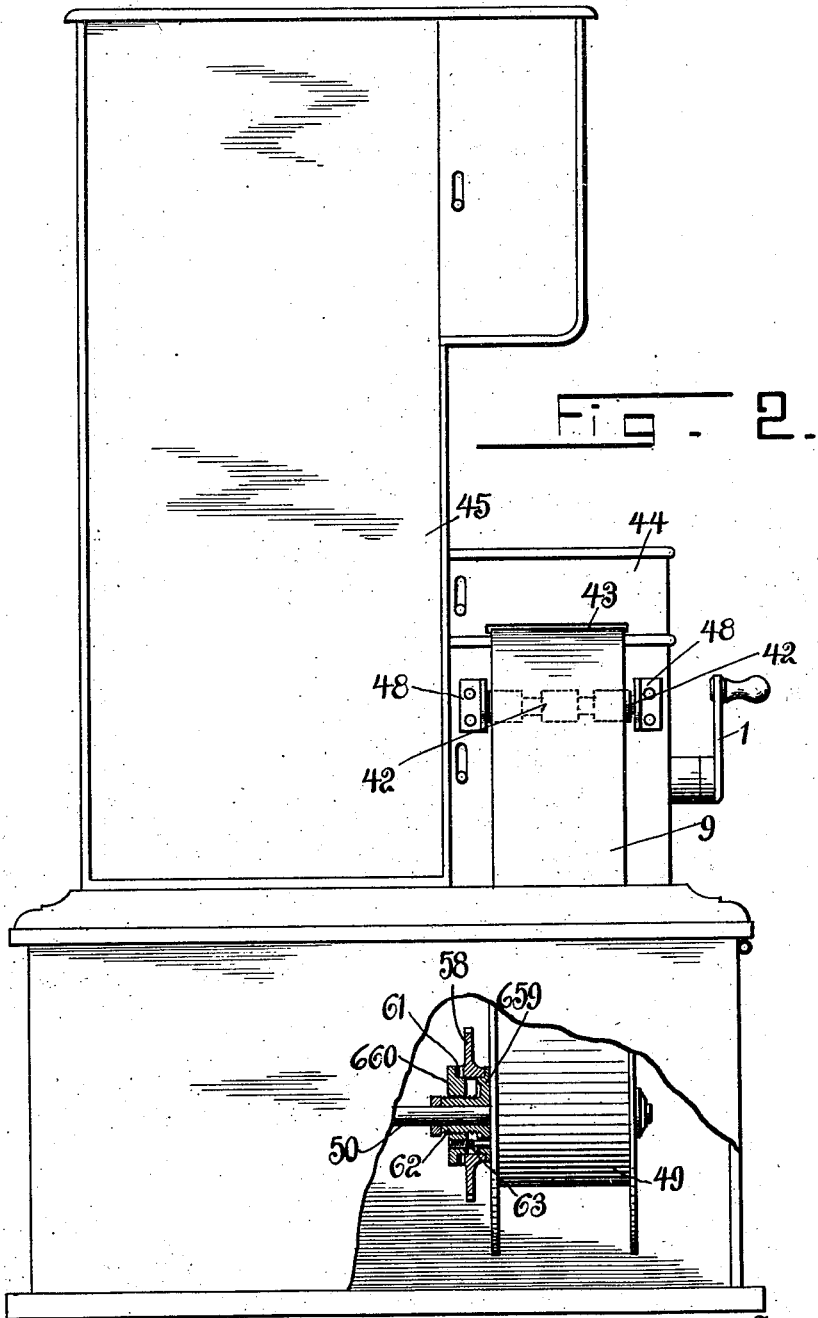

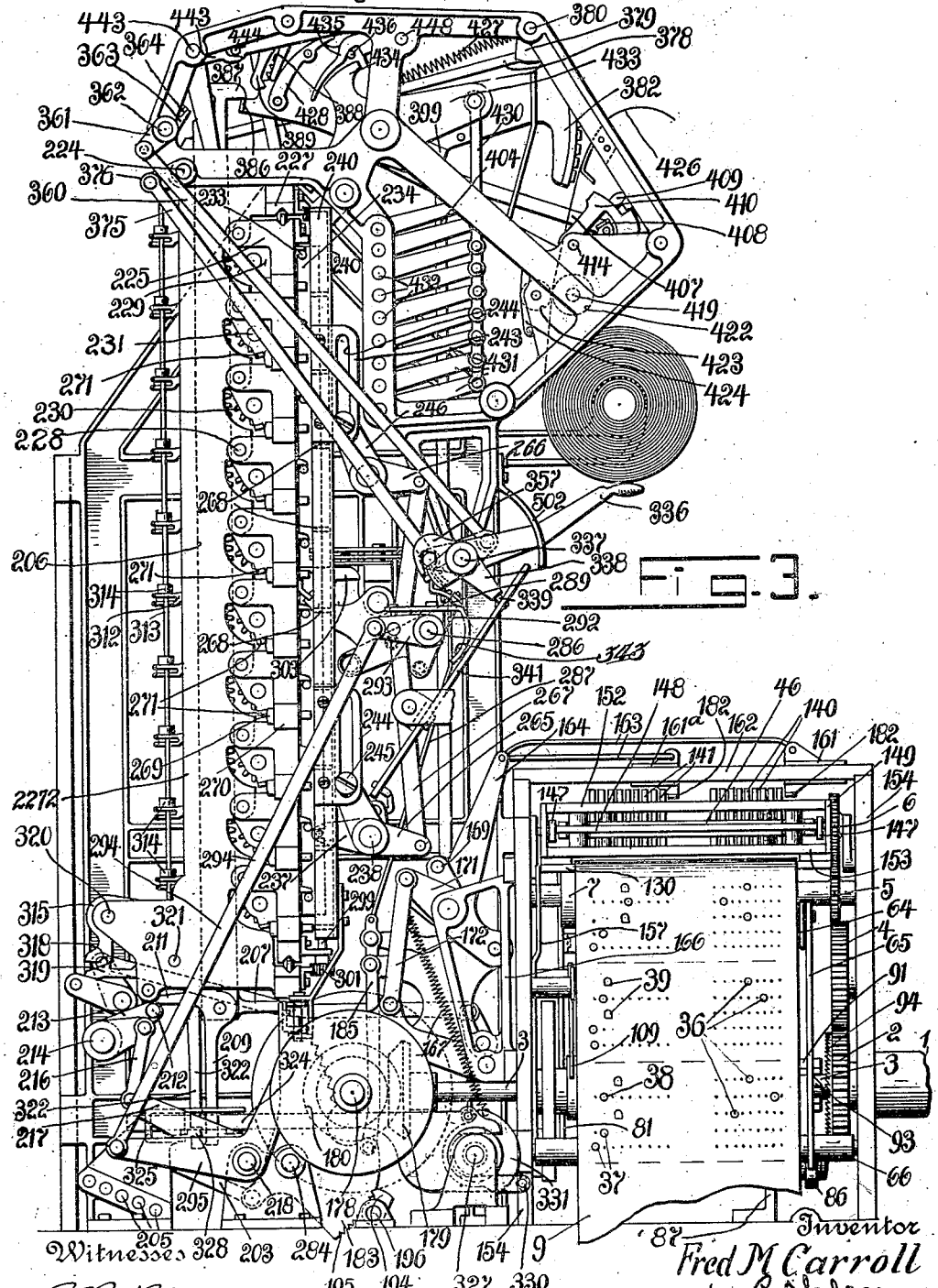

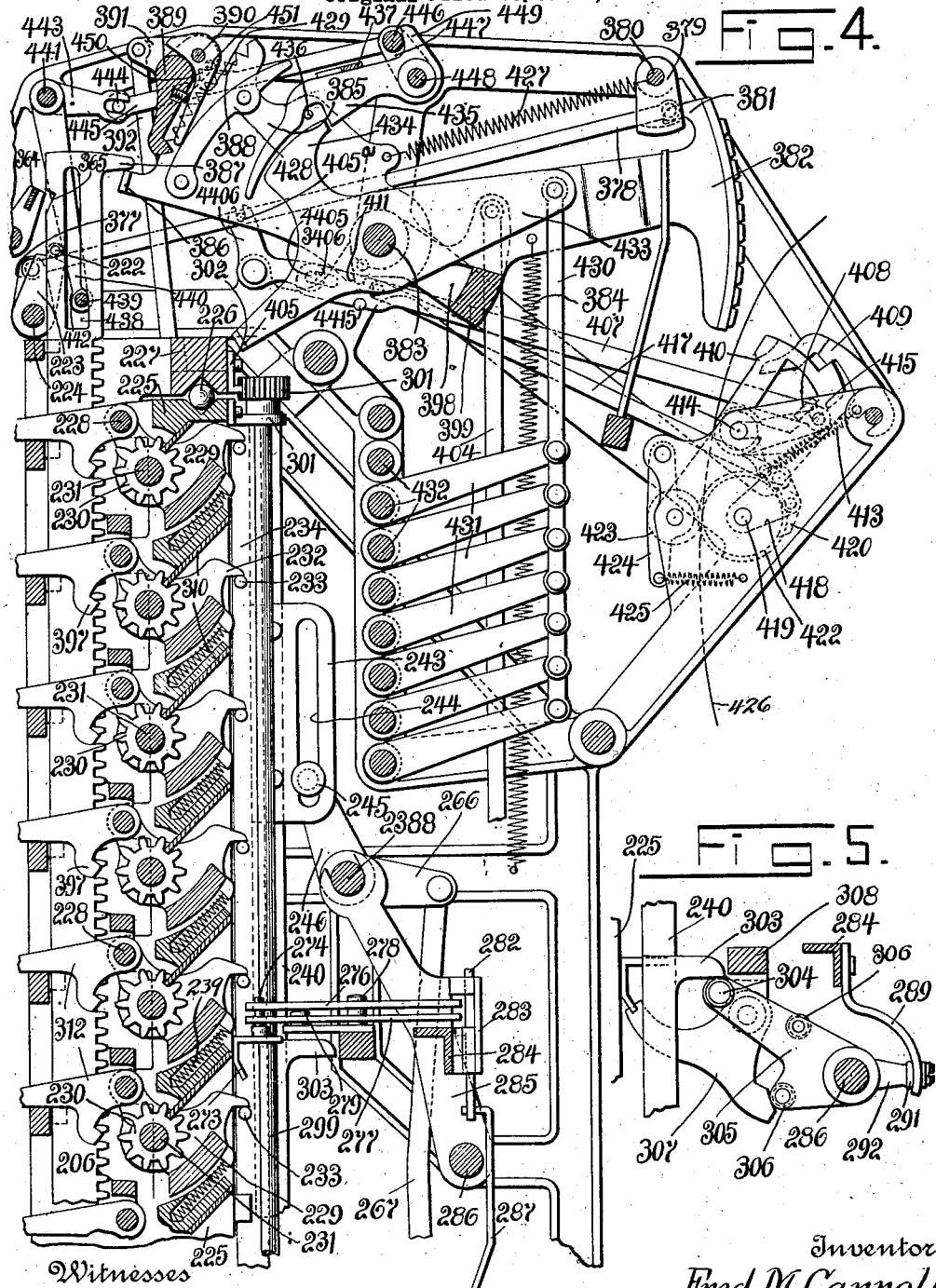

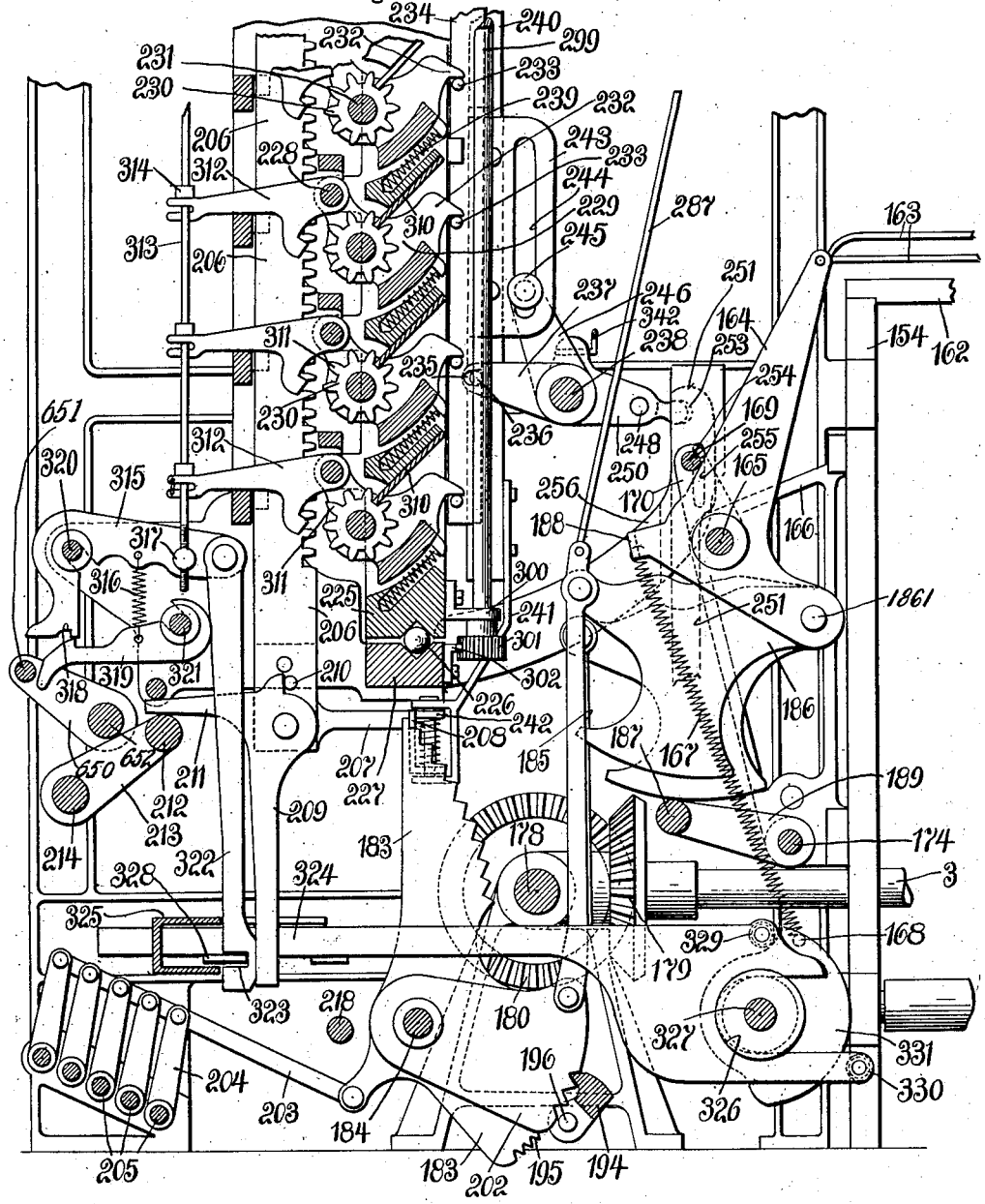

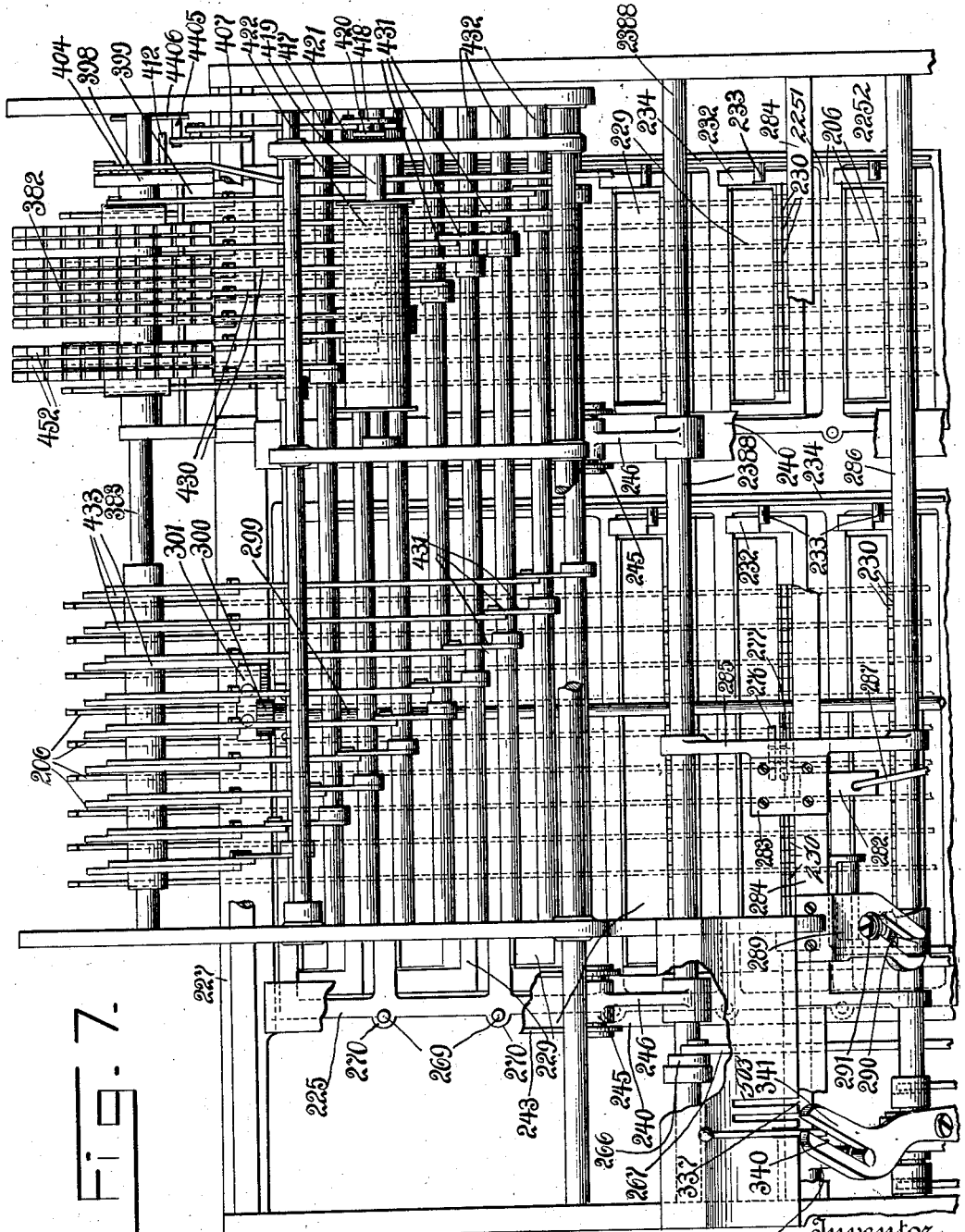

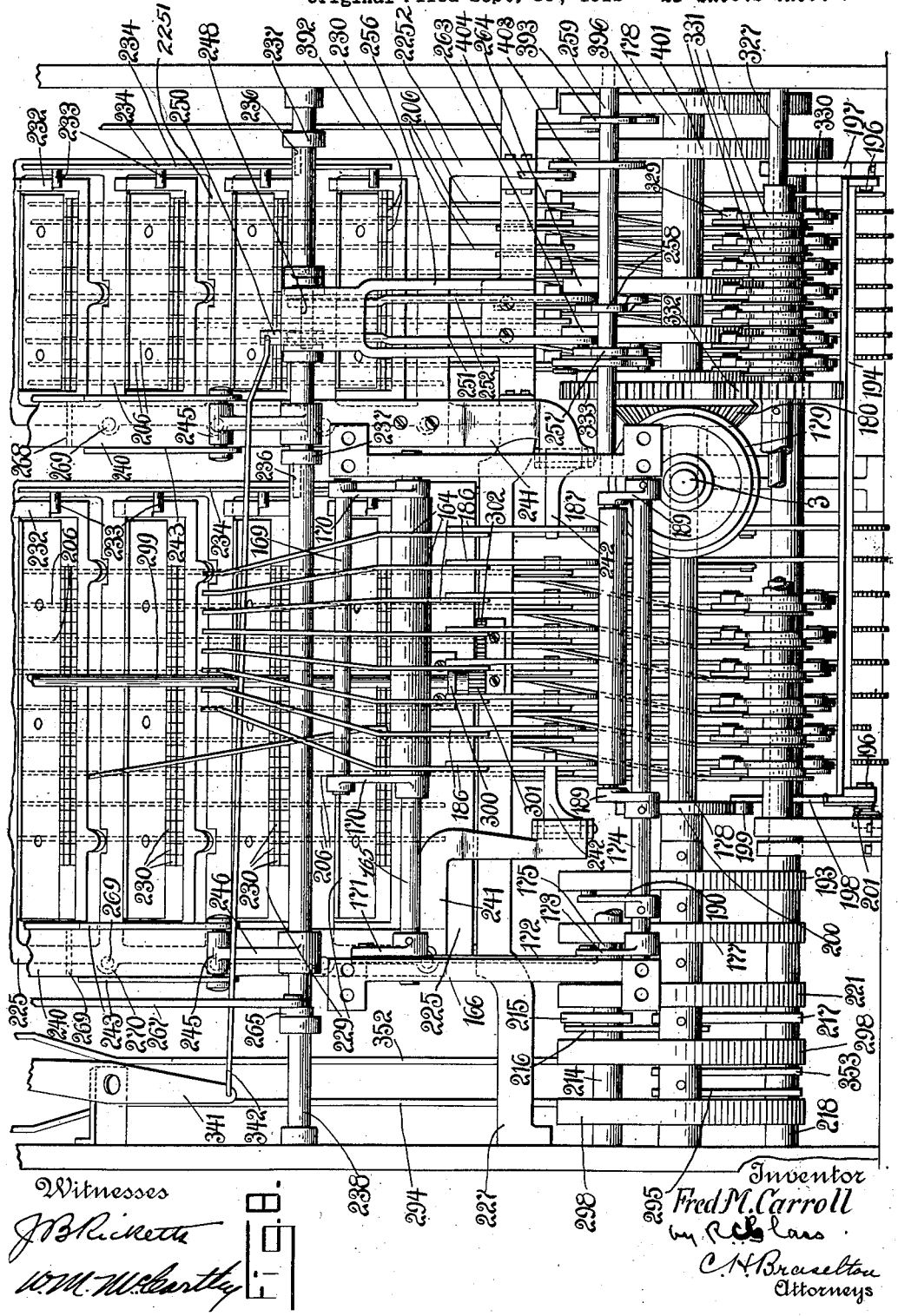

F. M. CARROLL

AUDITING MACHINE 1,540,162

Original Filed Sept. 30, 1912  21 Sheets-Sheet 8

Witnesses

Inventor
Fred M. Carroll
by
Attorneys

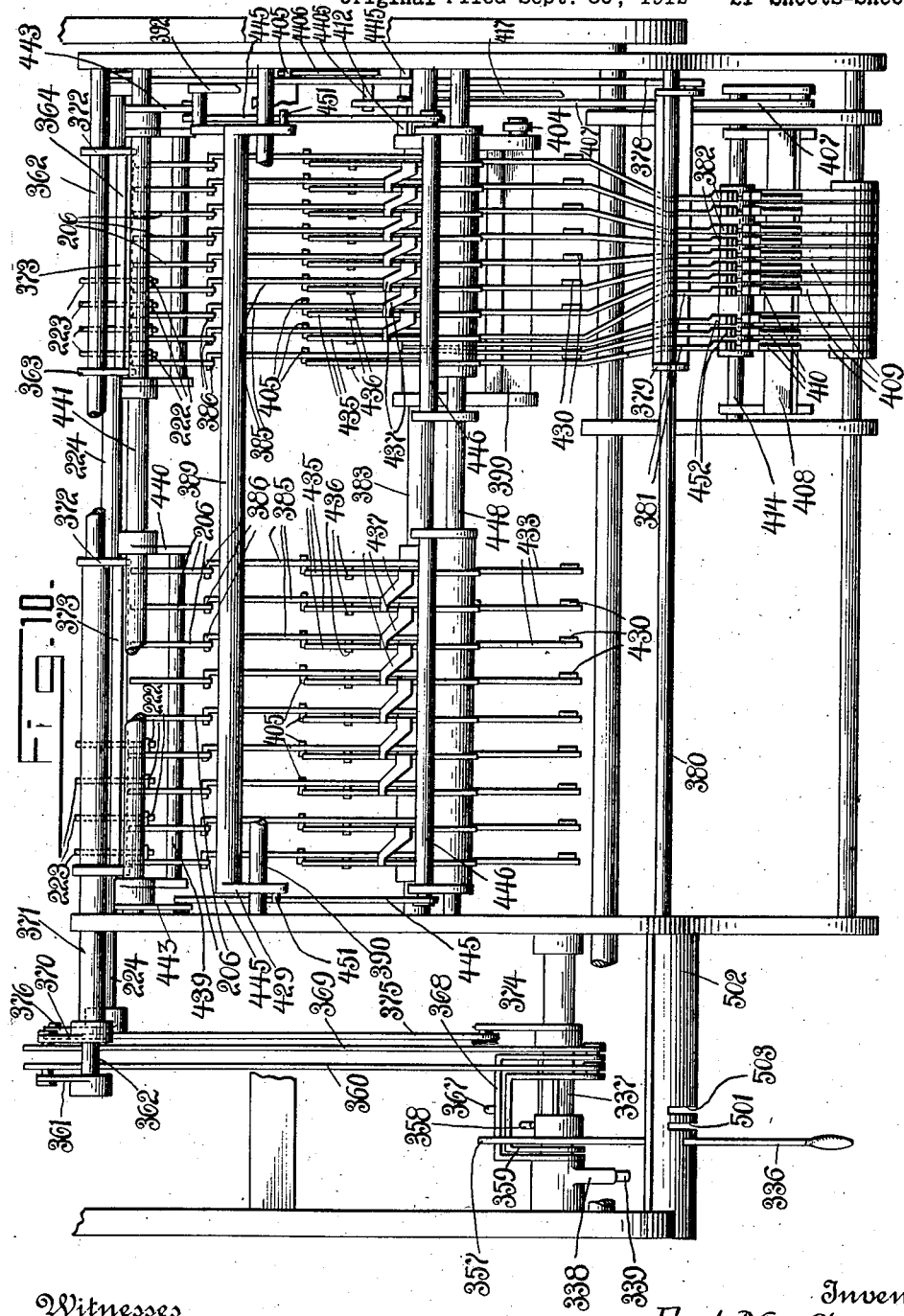

June 2, 1925.						1,540,162
F. M. CARROLL
AUDITING MACHINE
Original Filed Sept. 30, 1912    21 Sheets-Sheet 10
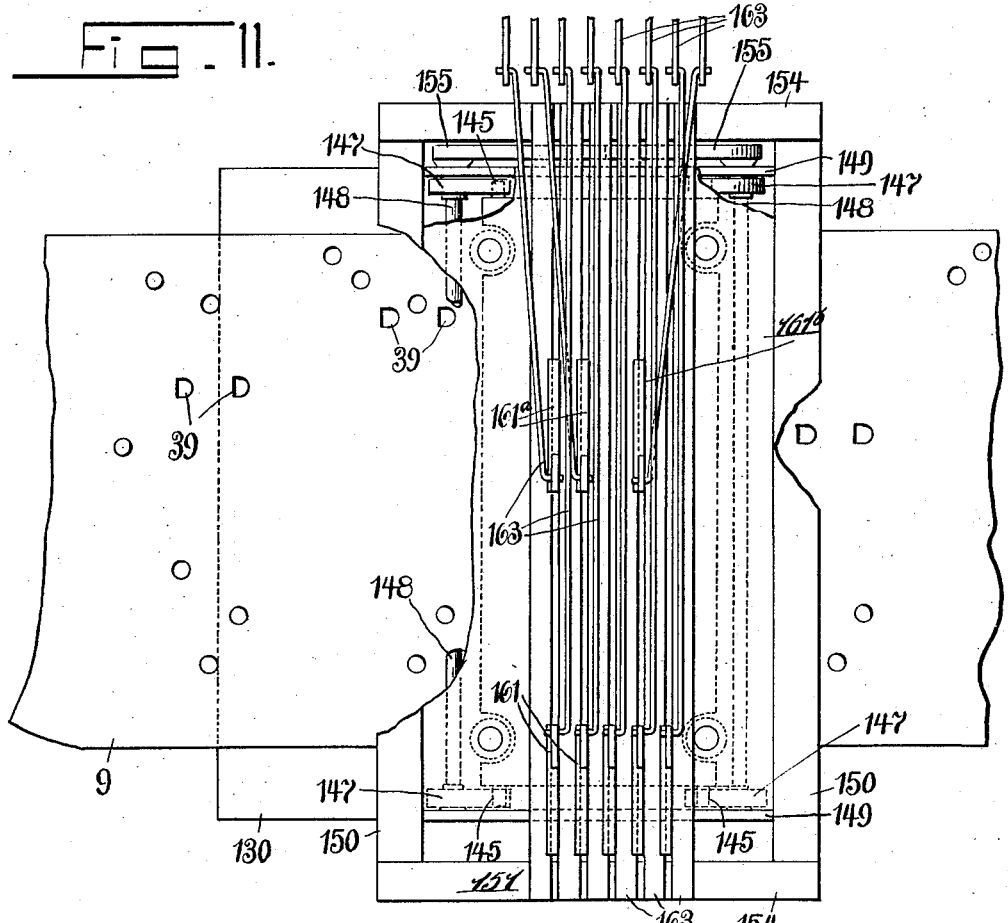
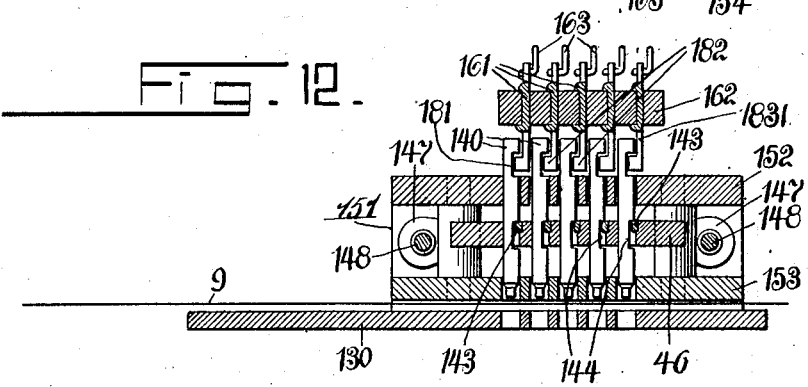
Witnesses
J. B. Ricketts
W. M. McCarthy
Inventor
Fred M. Carroll.
by R. Chlain
C. A. Braselton
Attorneys June 2, 1925.
F. M. CARROLL
1,540,162
AUDITING MACHINE
Original Filed Sept. 30, 1912     21 Sheets-Sheet 11
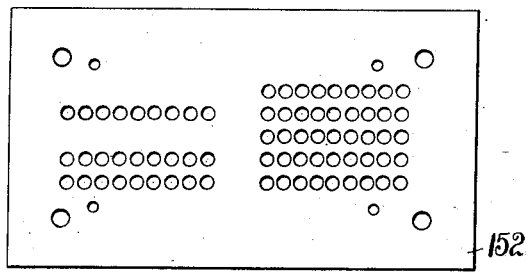
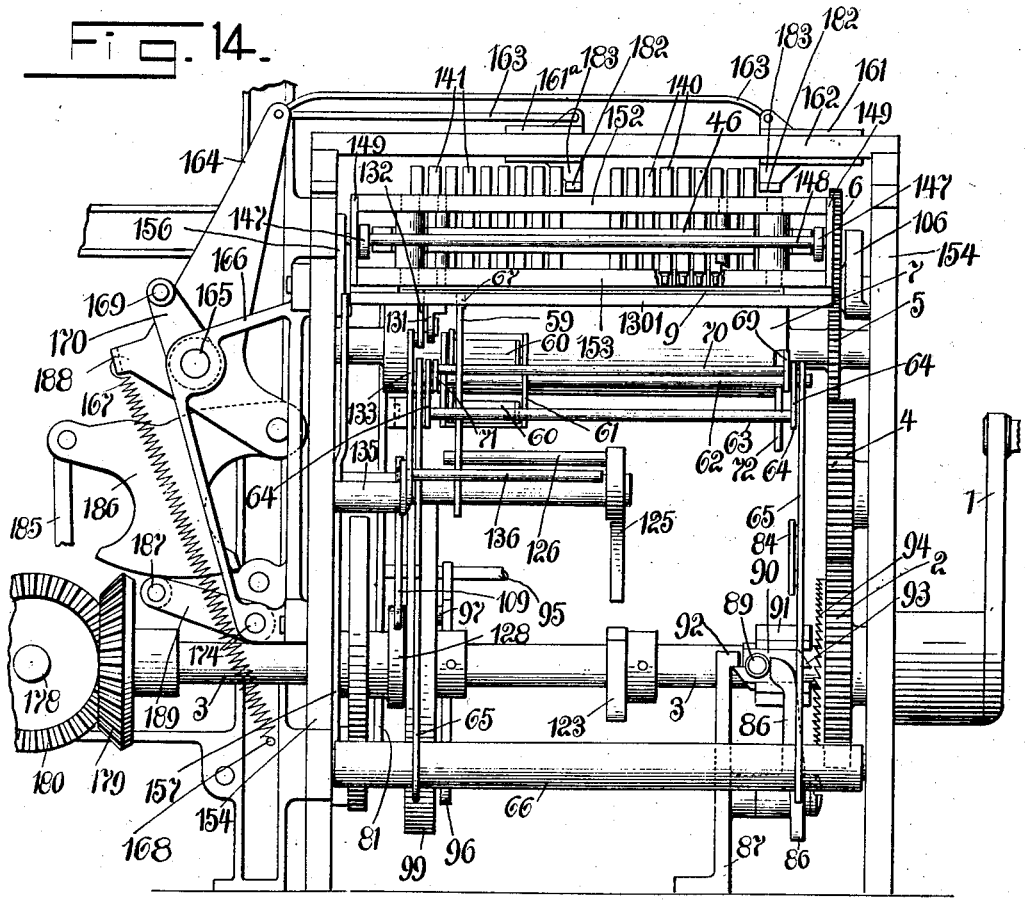
Witnesses
J. B. Ricketts
W. M. McCarthy
Inventor
Fred M. Carroll
by R. Dolan
C. H. Brazelton
Attorneys June 2, 1925.
F. M. CARROLL
AUDITING MACHINE
Original Filed Sept. 30, 1912      21 Sheets—Sheet 12
1,540,162
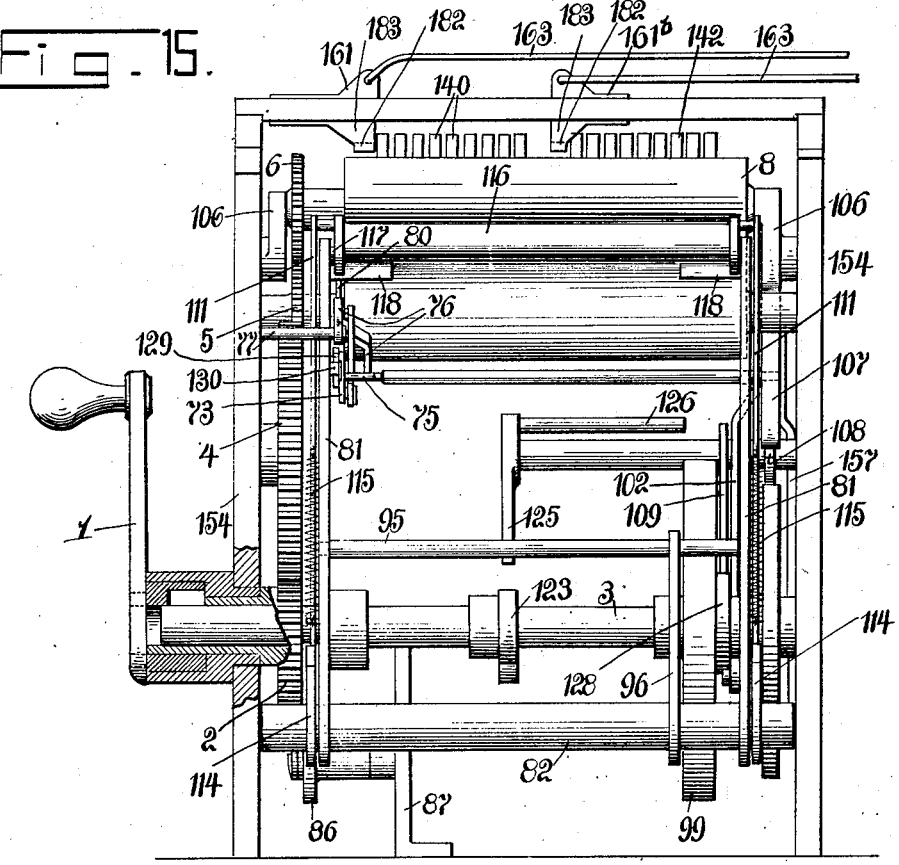
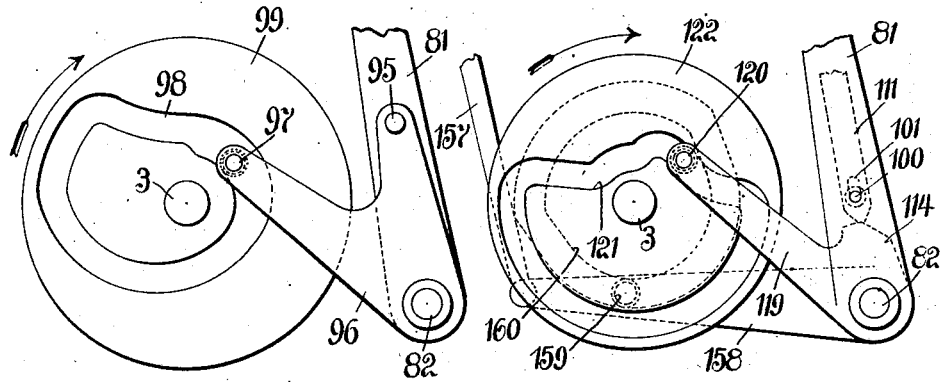
Witnesses
Inventor
Fred M Carroll
Attorneys June 2, 1925.
F. M. CARROLL
1,540,162
AUDITING MACHINE
Original Filed Sept. 30, 1912. 21 Sheets-Sheet 13
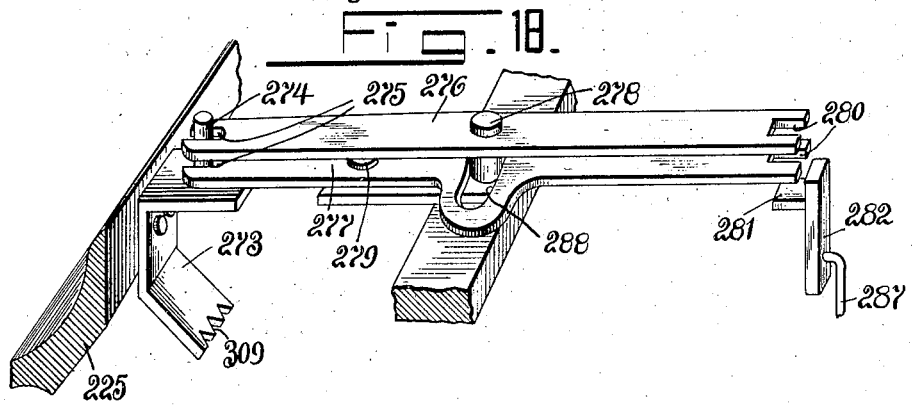
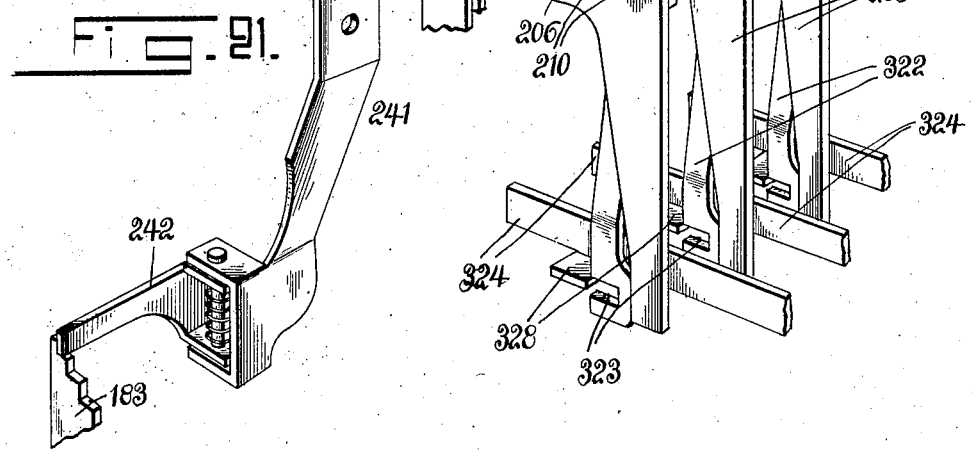

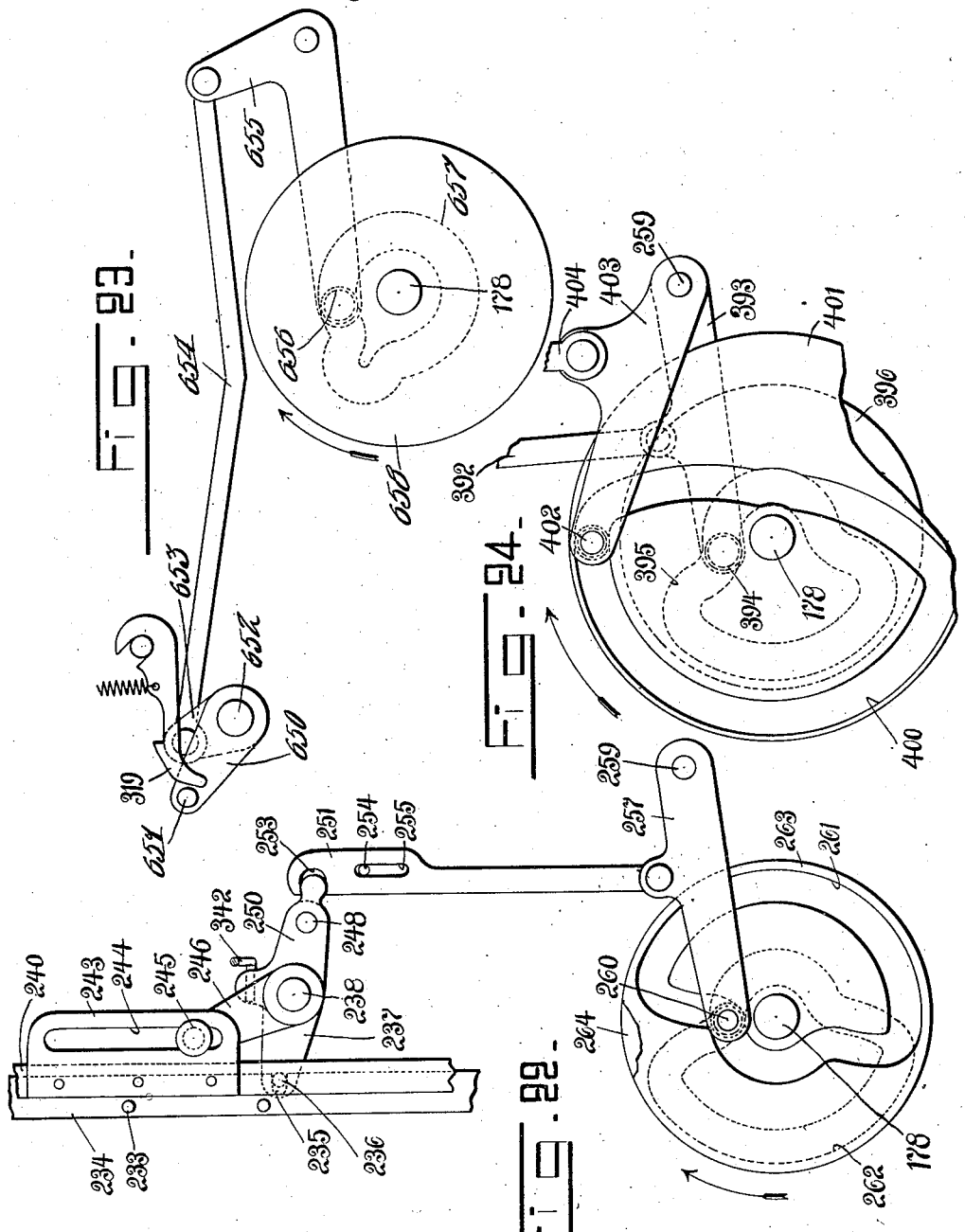

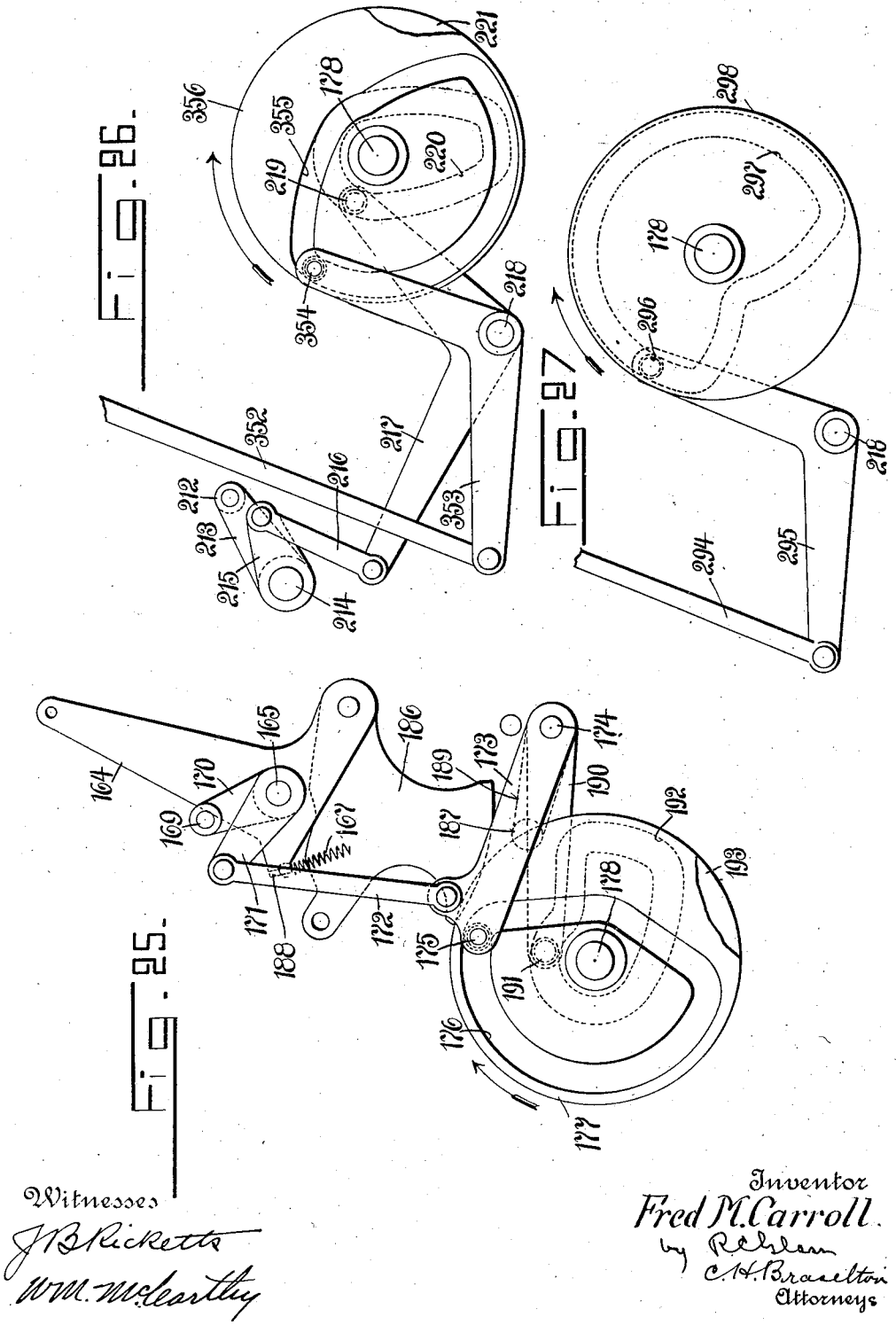

June 2, 1925.  
F. M. CARROLL  
AUDITING MACHINE  
Original Filed Sept. 30, 1912  21 Sheets-Sheet 16

1,540,162

Witnesses  
J B Ricketts  
W M McCarthy

Inventor  
Fred M Carroll  
by  
C H Braselton  
Attorneys

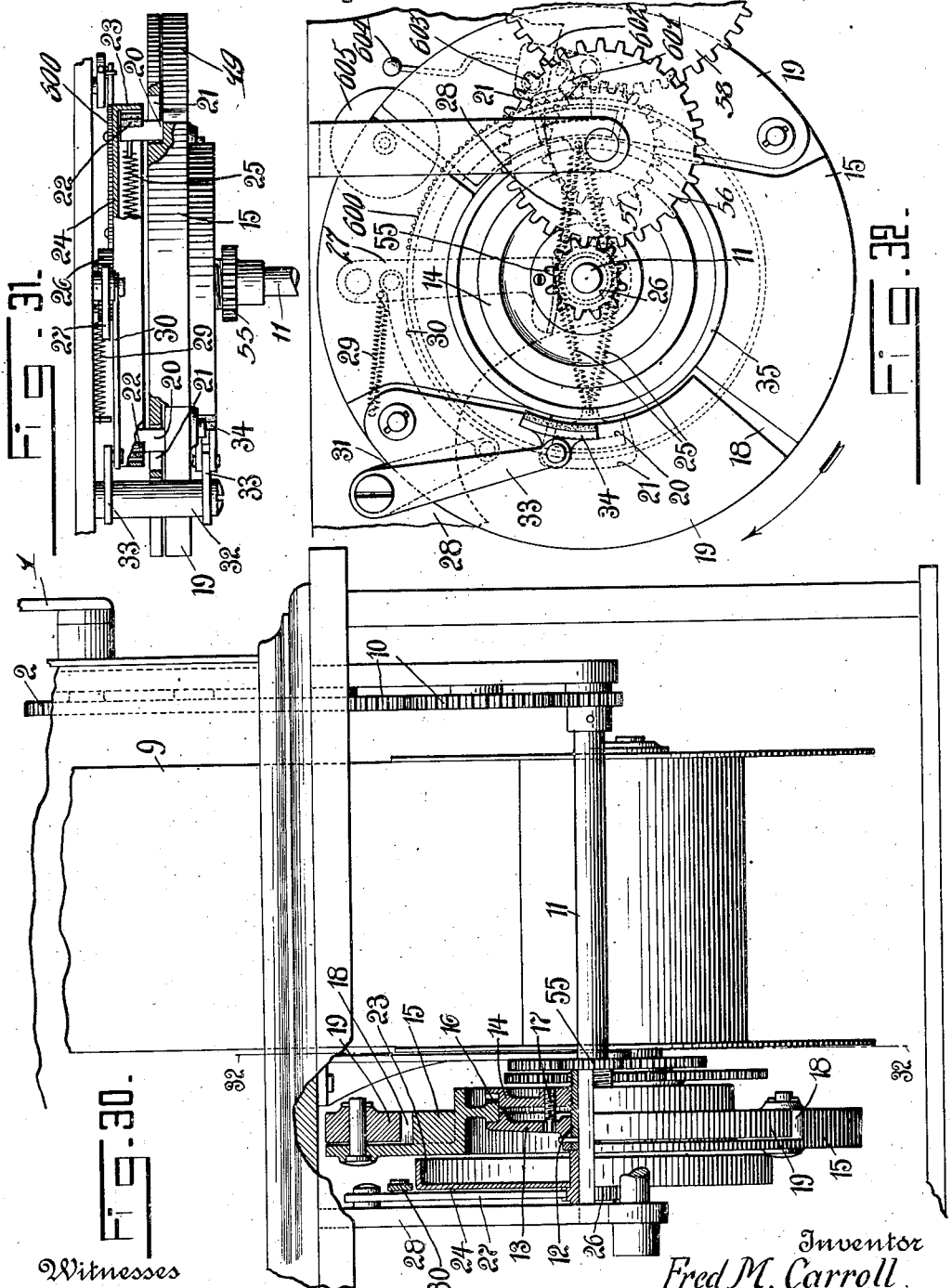

June 2, 1925.
F. M. CARROLL
AUDITING MACHINE
Original Filed Sept. 30, 1912   21 Sheets-Sheet 18
1,540,162
FIG.33
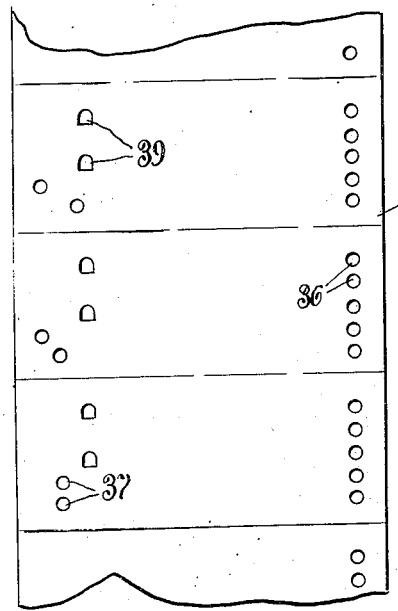
FIG.34.
| 1  | 14.09 |
|----|-------|
| 2  | 9.18  |
| 3  | 24.00 |
| 00 | 13.15 |
| 13 | 8.04  |
| 14 | 10.00 |
| 21 | 16.19 |
| 24 | 11.60 |
| 29 | 17.01 |
| 25 | 15.25 |
| 19 | 14.25 |
426
FIG.35.
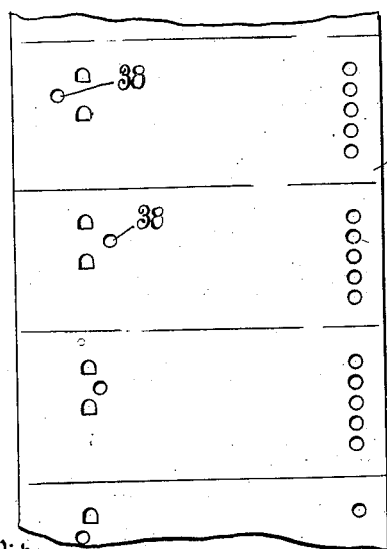
FIG.36.
| 100 | 56.73 |
|-----|-------|
| 200 | 74.00 |
| 300 | 43.70 |
| 500 | 65.50 |
| 700 | 50.00 |
| 400 | 60.75 |
| 800 | 75.00 |
426
Witnesses
JB Ricketts
WM. McCarthy
Inventor
Fred M. Carroll.
by R Wilson
C H Braselton
Attorneys.

June 2, 1925. 1,540,162
F. M. CARROLL
AUDITING MACHINE
Original Filed Sept. 30, 1912 21 Sheets-Sheet 19
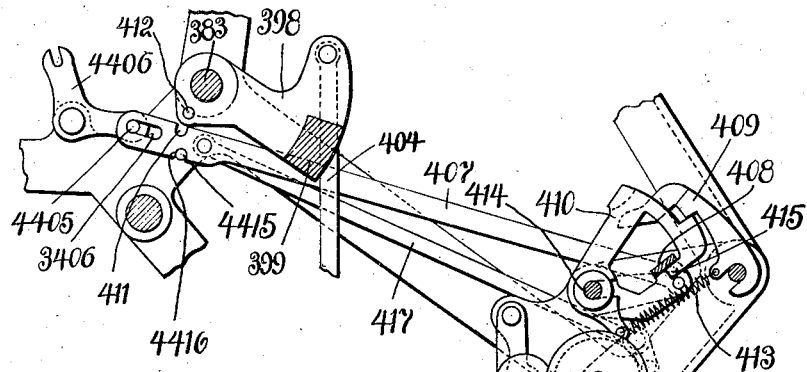
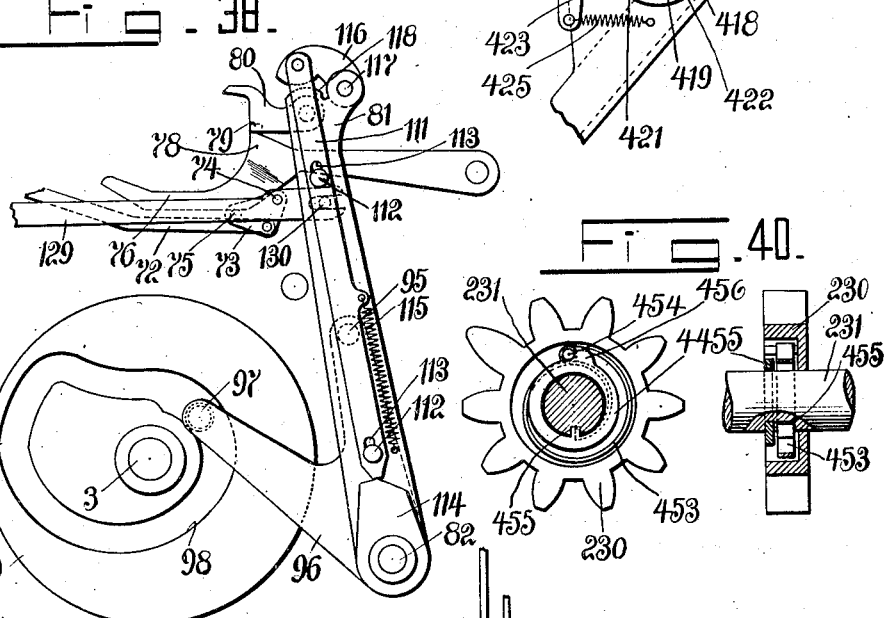
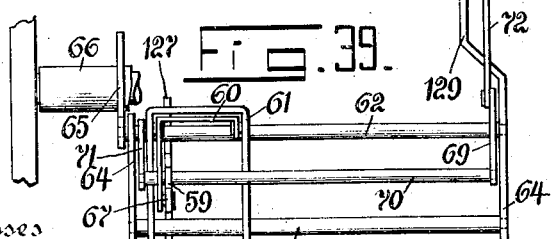
Witnesses
Inventor
Fred M. Carroll
Attorneys

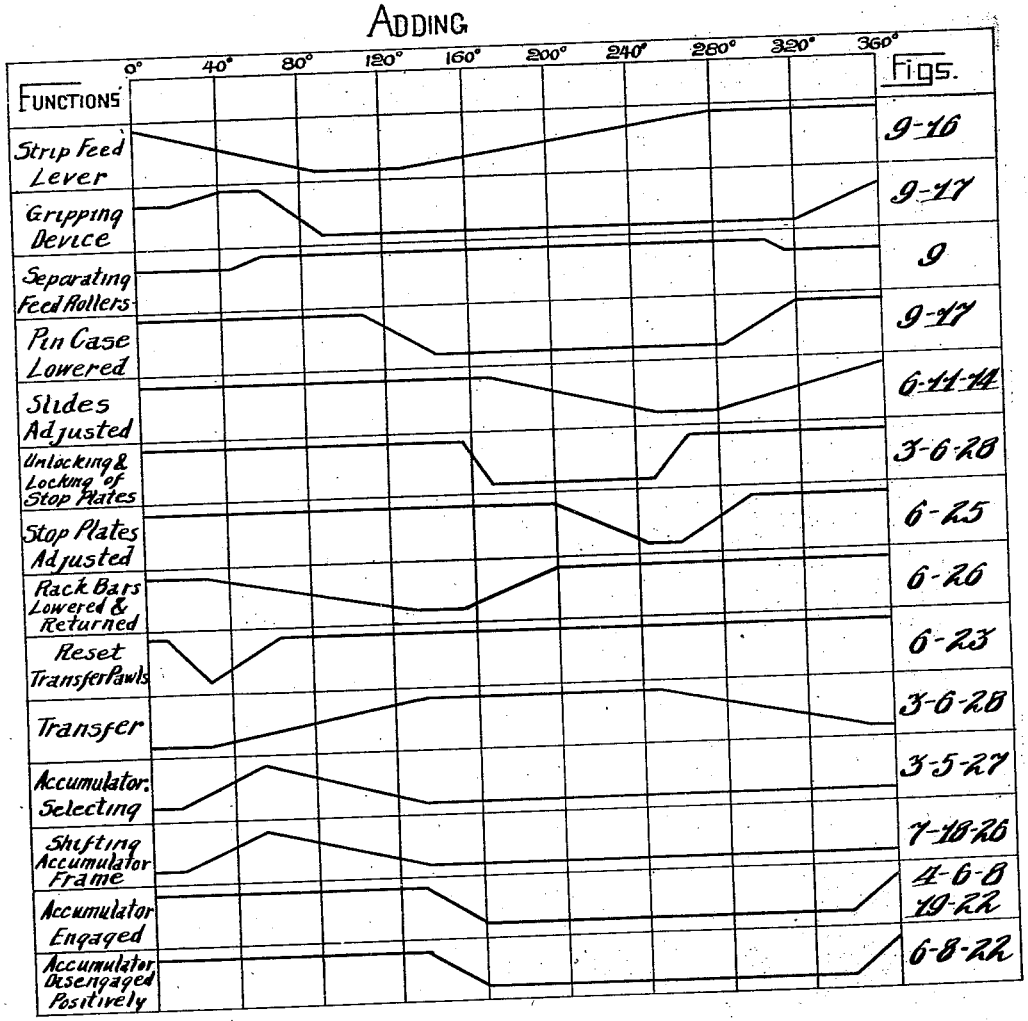

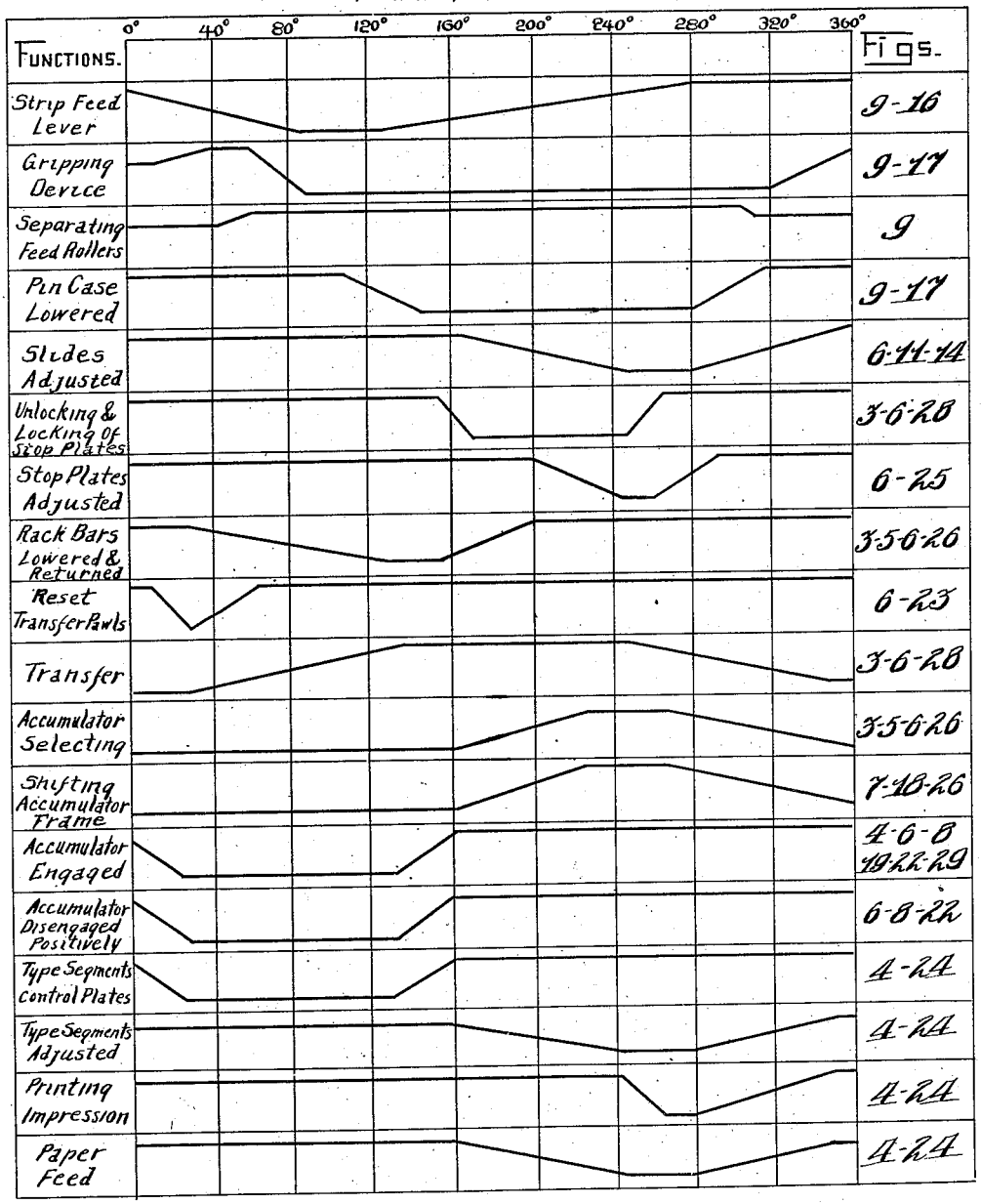

Patented June 2, 1925.

1,540,162

UNITED STATES PATENT OFFICE.

FRED M. CARROLL, OF BINGHAMTON, NEW YORK, ASSIGNOR TO THE NATIONAL CASH REGISTER COMPANY, OF DAYTON, OHIO, A CORPORATION OF OHIO (INCORPORATED IN 1906).

AUDITING MACHINE.

Application filed September 30, 1912, Serial No. 723,205. Renewed July 28, 1924.

*To all whom it may concern:*

Be it known that I, FRED M. CARROLL, a citizen of the United States, residing at Binghampton, in the county of Broome and State of New York, have invented certain new and useful Improvements in Auditing Machines, of which I declare the following to be a full, clear, and exact description.

The great desideratum in large commercial establishments having a number of departments with a number of clerks in each department is to be able quickly to ascertain the amount of business done by each clerk and in each department. At the present time, in large commercial establishments, such as department stores, where duplicate sales slips are made out for each purchase, a part of each slip being given to the customer as the receipt for the amount of purchase, while the duplicate portion thereof is retained in the store, these clerks and departmental totals are ascertained by the auditing force checking over the duplicates. By this method of ascertaining the sales of each clerk and of the various departments it will be obvious that a considerable force is required for the auditing of these slips, and it is the principal object of this invention to provide means upon which a record is made at the time of the sale, which means afterwards is used for controlling the entry of the amounts of the various sales upon a plurality of accumulators representing the various departments of the establishment and the clerks assigned to the different departments.

Another object of this invention is to provide record controlling means for clearing any one of a plurality of accumulators and for recording the amount cleared from said accumulator.

Another important feature of this invention is to provide means for determining the amount to be entered upon the accumultor and to provide actuating means for entering the amount upon said accumulator, the relation between the determining means and the actuating means being such that the amount is not accumulated until a succeeding cycle of operation of the machine from that in which the determining means is set up.

Another object of this invention is to provide duplex feeding means for the record controlled strip whereby one of said means is normally in operative position continuously to feed the record controlled strip, which means is automatically disabled and the other means brought into operative position when a transaction is to be entered upon any one of the accumulators.

A further object of this invention is to provide driving mechanism for the feeding means for the record controlled strip and for the operating mechanism of the machine proper, which driving mechanism is normally in operative relation with the feeding means and is controlled by the strip for the purpose of establishing operative relation between said driving mechanism and the operating mechanism of the machine proper.

A still further object of this invention is to provide a plurality of series of accumulators with record controlled means for entering an amount upon one of each series of said accumulators.

With these and incidental objects in view, the invention consists in certain novel features of construction and combination of parts, the essential elements of which are set forth in appended claims, and a preferred form of embodiment of which is hereinafter described with reference to the drawings which accompany and form part of this specification.

Of said drawings;

Fig. 1 is a front elevation of the improved machine showing in outline the driving mechanism for actuating the feeding means and the operating mechanism of the machine.

Fig. 2 is an end elevation of the machine.

Fig. 3 is an enlarged view of the upper portion of Fig. 2 with the cabinet removed.

Fig. 4 is an enlarged vertical sectional view of the upper portion of Fig. 3.

Fig. 5 is a detail view of a portion of the selecting mechanism of the accumulators.

Fig. 6 is an enlarged vertical sectional view of the lower portion of Fig. 3.

Fig. 7 is a front elevation of most of the mechanism shown in Fig. 4.

Fig. 8 is a front elevation of the mechanism shown in Fig. 6.

Fig. 10 is a partial top plan view of the machine, showing principally the total manipulative device and co-operating parts.

Fig. 11 is a top plan view partly broken away of the casing carrying the slides which form a part of the determining mechanism.

Fig. 12 is a transverse sectional view of the mechanism shown in Fig. 11.

Fig. 13 is a top plan view of a guide plate for the adjustable stops which control the movement of the slides shown in Figs. 11 and 12.

Fig. 14 is an enlarged end elevation of the mechanism controlling the adjustment of the differentially movable slides.

Fig. 15 is a view similar to Fig. 14 looking in the opposite direction.

Fig. 16 is a detail view of the cam for operating one of the feeding devices for the record controlled strips.

Fig. 17 is a detail view showing the cams for operating the gripping devices for the record controlled strips and for operating the case carrying the adjustable pins for controlling the differentially movable slides.

Fig. 18 is a perspective view of the part of the mechanism for shifting the frame carrying the clerks' accumulators.

Fig. 19 is a perspective view of the mechanism for rocking the selected accumulator into engagement with its actuators.

Fig. 20 is a perspective view of several of the actuating racks and bars carried thereby for effecting transfers.

Fig. 21 is a perspective view of a portion of the accumulator selecting means and its co-operating control plate.

Fig. 22 is a detail side elevation of the cam and co-operating mechanism for shifting the selective mechanism so as to bring the selected accumulator and the actuators into operative relation.

Fig. 23 is a detail view of the cam and co-operating mechanism for recocking the transfer device.

Fig. 24 is a detail view of the cams for operating the mechanism controlling the type carriers.

Fig. 25 is a detail view of the cams for restoring the differential slides to normal position and for adjusting the graduated stop plates controlled by said slides.

Fig. 26 is a detail view of the cams and co-operating mechanism for shifting the accumulator frame in the total taking operation and for restoring the actuators to normal position.

Fig. 27 is a detail view of the cam and connections for shifting the accumulator frame in the adding operation.

Fig. 30 is an enlarged end elevation partly in section of the retarding device for preventing a rapid operation of the driving mechanism.

Fig. 31 is a top plan view of a portion of the mechanism shown in Fig. 30.

Fig. 32 is a vertical section taken on line 32—32 of Fig. 30.

Fig. 33 is a top plan view of a portion of the record strip for controlling the recording of the clerks' totals.

Fig. 34 is a plan view of the strip upon which is listed the clerks' totals.

Fig. 35 is a top plan view of the record strip for controlling the recording of the departmental totals.

Fig. 36 is a plan view of the strip upon which is listed the departmental totals.

Fig. 37 is a detail view of the mechanism controlling the operation of the printing hammers and also the mechanism for feeding the strip upon which is listed the clerks and departmental totals.

Fig. 38 is a detail view of one of the feeding devices for the record strips.

Fig. 39 is a top plan view of the frame carrying the transaction plunger.

Fig. 40 illustrates different views of one of the wheels controlling the printing of identifying characters for the clerks and departmental accumulators.

Fig. 41 is a plot showing the time at which the various functions performed take place during the adding operation.

Fig. 42 is a view similar to Fig. 41, showing the time at which various functions are performed in the clearing and total printing operation.

Figure 9:
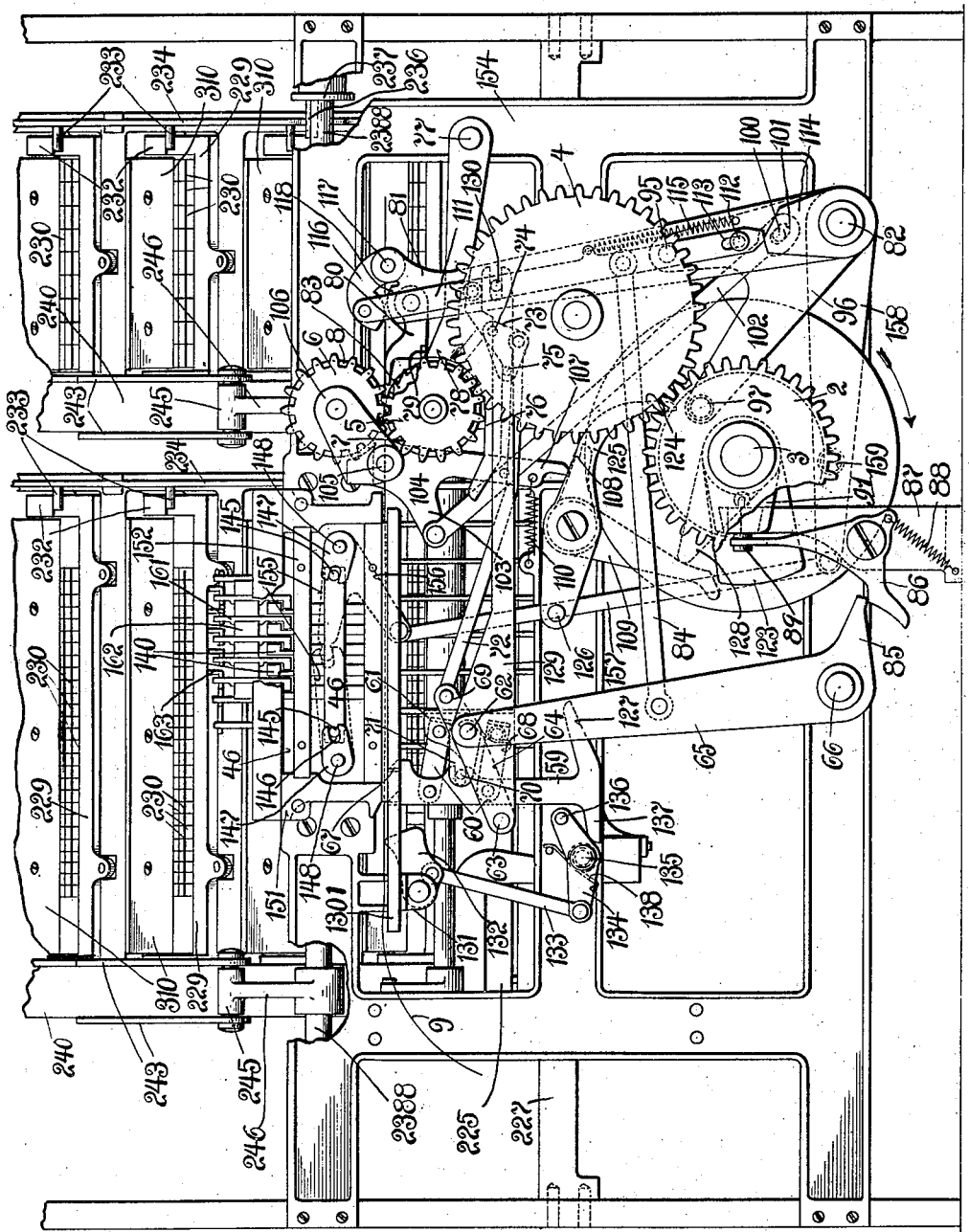
Fig. 9 is a front elevation of the driving mechanism, showing its connection with the feeding means for the record controlled strips.

In order that the detail description may be followed to better advantage, a general statement will be herein given of the operation of the specific embodiment of the invention shown, and the system will be described as being applied to department stores, but it is to be understood that the invention about to be described may, with equal facility, be used in any other large commercial establishment and in many other relations.

At the present time a great many of the large department stores have employed cashier-inspectors each having several departments assigned to them. As each sale is made, the clerk forwards the goods and the sales slips to the cashier-inspector who is conveniently located, and it is the duty of said cashier-inspector to compare the goods with the entries made on the sales slip. If they correspond, one portion of the sales slip is wrapped with the goods and returned to the clerk, who hands them to the customer.

while the other portion of said slip, having thereon a duplicate of the data entered upon the sales slip wrapped with the goods, is retained by the cashier-inspector, who, at the end of the day, turns them into the auditing department so that they may be audited in order to ascertain the totals of the department and clerks' sales. In a great many instances these cashiers are provided with machines which record the total of the purchase upon the original and duplicate portion of the sales slips and thereby prevent any possibility of altering the different portions of said slips, which is frequently done when the amounts are not printed upon the sales slip, that portion of the slip going to the customer having thereon a higher amount than the duplicate retained in the department, in which event the clerk or cashier-inspector keeps the difference.

This system where the herein mentioned recording machines are employed as far as it goes is very good for department stores, as it combines quick service which the customer demands, and protection which the proprietor desires. The serious objection to this system however is that it requires a large auditing force to total the sales slips in order to find out the clerks' totals and the departmental totals, which objection is entirely eliminated by the invention about to be described.

With the present system a record controlling strip is used, which strip is perforated by any suitable mechanism at the time of making the sale or any other desired time with characters for identifying the clerk making the sale, the department to which the clerk belongs, the kind of transaction, whether it is cash or charge and the amount of the transaction. The perforations in the strip representing the clerks operating under any one cashier-inspector are suitably differentiated so as to avoid any possible confusion, which is also true of the perforations representing the departments. Each sale thus handled by the cashier-inspector will be entered upon this strip which at the close of the day's business, is taken to the auditors' department and run through the machine of the present invention which is equipped with a plurality of accumulators representing the maximum number of clerks and departments under any one cashier-inspector. As previously stated the strip is perforated with characters representing different classes of transactions and as said strip is placed in the auditing machine, a selecting device is adjusted so as to cooperate with the transaction perforations of one class only as the strip is fed through the machine and thereby accumulate the clerks' and departmental totals of this particular class of transactions, whether it is cash or charge. When it is desired to accumulate the clerks' and department totals of a different class of transaction, the selecting mechanism is again adjusted and the strip run through the machine a second time, during which time the totals of a different class of transaction will be accumulated, this operation being continued until all of the different classes of transactions are entered upon the accumulators, it being understood that the accumulators are cleared after the totals of one class of transactions are accumulated before the strip is again run through the machine to obtain the totals of another class of transactions.

When the strip is fed into such a position that the selecting device engages with the transaction perforations in the said strip, the driving mechanism will for a short time continue to operate the feeding means for said strip, but upon the continued operation of said driving mechanism, the feeding means for said strip will be disabled and a second feeding means brought into operative relation with said strip and feed the latter into position to have the amount perforations in the strip brought beneath a plurality of series of denominational stop pins which are then lowered, some of said pins entering the perforations and forming stops for adjustable slides, which are released and spring drawn into contact with the pins cooperating with the perforations in said strip. These differentially adjustable slides control the adjustment of corresponding graduated stop plates which in turn determine the movement of actuating rack bars. During the time that the actuating rack bars are being positioned under control of the graduated stop plates, mechanism is also positioned for establishing operative relation between any one of the accumulators and the rack bars, after which the rack bars are returned to normal position thereby actuating the selected accumulator. Simultaneously with the selection of the above mentioned accumulator which represents one of the clerk's accumulators, a departmental accumulator is selected and an operative relation is established between said departmental accumulator and a second set of actuating rack bars arranged so as to move with the previously mentioned rack bars. The selection of the accumulators to be actuated is controlled by perforations in the record strip in a manner similar to the control of the adjustment of the actuating rack bars. A novel form of transfer mechanism is provided whereby the actuating rack bars will be moved an additional step when a transfer is to be effected.

In the clearing and total printing operation a manipulative device is adjusted so that the accumulator that is to be cleared and which controls the recording of the total is connected to the rack bars previous to the lowering of said bars, so that as said bars are lowered, the elements of the accumulator will be rotated in an opposite direction from that in which they are rotated when an amount is added thereon. When the accumulator elements reach normal or zero position, they are arrested and consequently arrest the rack bars, which bars, during the backward rotation of the accumulator elements, will move distances corresponding to the distances the accumulator elements are from zero position. During the lowering of these rack bars they control the adjustment of type carriers for listing upon a strip the amount cleared from the accumulator, this listing mechanism being brought into operative condition by the adjustment of the previously mentioned manipulative device.

In the listing of totals suitable characters are recorded in juxtaposition to the totals for the purpose of identifying the accumulators from which the totals are listed.

The detail description which follows will be divided into two main divisions, namely, adding operation and clearing and total printing operation, in which named divisions there will be a number of sub-divisions and under these sub-divisions the description will be further divided.

Adding operation.

Under this heading will be described mechanism for feeding the record strip containing the various transactions handled by one of the cashier-inspectors, and the mechanism controlled by said strip for establishing operative relation between the actuating means and the various clerks' and departmental accumulators so that when the strip has been completely fed through the machine there will be entered upon the various clerks' and departmental accumulators, the sales totals of a certain class of transaction handled by each department operating under the cashier-inspector whose strip is run through the machine, and also the total amount of sales made by each clerk under the several departments. To obtain the totals of sales made in the various departments and also the clerks' totals of a different class of transactions, the strip is run through the machine a second time after the accumulators have been cleared. This operation is repeated as many times as there are different classes of transaction handled by the various departments which classes of transaction may be such as "Cash," "Charge" and "C. O. D."

Driving mechanism.

This mechanism is arranged to actuate the feeding means for the record control strip, also the main operating mechanism of the machine proper, the said driving mechanism being normally in operative relation with one of the strip feeding means.

The driving mechanism herein shown is manually operated, but it is to be understood that any suitable power driven device well known in the art may be used instead. For the manually operated driving mechanism herein shown a suitable crank handle 1 is provided, Figs. 1 and 2, which is secured to a gear 2 loosely mounted upon a shaft 3, Figs. 9 and 13. The gear 2 meshes with a gear 4 which, in turn, engages gear 5, the latter meshing with similar gear 6. The two last mentioned gears 5 and 6 are secured to rollers 7 and 8 respectively which form a part of the feeding mechanism for the record strip 9 as hereinafter more fully described. The gear 2, Figs. 1 and 30, through suitable intervening gearing 10 rotates a shaft 11. Secured to the shaft 11 near its rear end is a collar 12 to which is pinned a disk 13. Threaded upon the collar 12 is a disk 14 similar to the disk 13. A drum 15 is supported by flanges of the disks 13 and 14 and is held frictionally in engagement with said disks by a corrugated leaf spring 16 which bears against one side of the drum 15 and the inner surface of the flange of the disk 14. The tension on the leaf spring 16 may be increased or diminished by the rotation of the disk 14 upon the threaded portion of the collar 12. The disk 14 is prevented from turning relative to the disk 13 by the screw stud 17 as clearly shown in Fig. 30 which stud has to be removed in order to turn the disk 14 independently of the disk 13. The drum 15, Fig. 30, 31 and 32 has two cutaway portions 18 wherein are pivotally mounted two controlling blades 19. Extending rearwardly from each of these blades 19 is a stud 20 which projects through an opening 21 in the drum 15, Fig. 31. These studs 20 carry cork or leather inserts 22 which lie adjacent to the inner surface of a flange 23, forming part of a disk 24 loosely mounted upon the shaft 11. The blades 19 form a part of a centrifugal governing device and said blades are normally held in the position shown in Fig. 32 by springs 25. When an abnormal speed is attained by the driving mechanism, the blades 19 will swing outwardly about their pivots carrying the frictional inserts 22 into contact with the inner surface of the flange 23 of the disk 24 and rotate said disk. This disk has secured thereto a pinion 26, which meshes with a segmental lever 27 pivotally mounted upon a supporting arm 28 extending downwardly from a portion of the frame work of the machine. As the disk 24 rotates the segmental arm 27 will be rocked in an anticlockwise direction (Fig. 32) against the tension of a spring 29. As the arm 27 is rocked it will, through link 30, rock arm 31, pivotally mounted upon the frame work of the machine. This arm 31 is connected by a sleeve 32 to a downwardly extending arm 33, which at its lower end carries a brake shoe 34 adjacent to a flange 35 of the disk 15. From this description it will be seen that as the arm 27 is rocked when the driving device attains an abnormal speed, the arm 33 will also be rocked carrying the brake shoe 34 into engagement with the outer surface of the flange 35 of the drum 15 and thereby retard the movement of said driving mechanism. When the driving mechanism is retarded the blades 19 of the governing device are returned to their normal position as shown in Fig. 32 by the springs 25, thereby permitting the driving device to be actuated without any retarding influences.

Additional mechanism is provided for notifying the operator when an abnormal speed is attained which mechanism comprises an alarm that is operated in the following manner.

The disk 24, Figs. 31 and 32, has secured thereto a ratchet plate 600, which is engaged by a pawl 601 pivotally mounted upon a plate 602, the latter being pivoted as at 603 upon the framework. The plate 602 carries a hammer 604 for ringing a bell 605 when said plate is vibrated against the tension of a suitable spring (not shown) by the rotation of the disk 24, which occurs only when an abnormal speed is attained as previously described.

Record strip feeding devices.

There are provided two feeding means for the record strip one of which is normally in operative relation with the driving mechanism and is so controlled by said strip that when an item is to be entered in one of the accumulators, the said feeding means is disabled and an auxiliary feeding means is enabled, the latter then bringing the strip to a position whereby the perforations therein control the selection of the clerks' accumulator and the departmental accumulator and also control the entering of an amount upon the selected accumulators.

Under this heading will be described first the construction of the record strip and then the different feeding devices therefor and the control of said devices by the strip.

Item record strip.

In Fig. 3 a portion of the item record strip 9 is shown. The perforations therein between any two broken lines represent the amount and kind of transaction, the department in which it is made and the clerk handling it. The amount of the transaction is represented by the perforations 36. The horizontal lines represent the various denominations, beginning with the upper one as units of cents, the second one tens and so on down, while the vertical lines represent the different units of the various denominations. Such being the case, the perforations shown in the upper portion of the strip represent five dollars and twenty-five cents, while the middle perforations represent seventy-five cents and the lower set of perforations represent three dollars and eighty-five cents. The two lower rows of perforations 37 to the left hand portion of the strip between each dotted line section are used for controlling the selection of the clerk's accumulator, the lower row of each section representing the units while the upper row represents tens. The perforation 38 in each section of the strip controls the selection of the departmental accumulator, there being ten of said departmental accumulators, while there are 30 of the clerks' accumulators. The perforations 39 in each section of the strip determine the class of transaction. It will be noted that the perforations 39 are in different vertical columns which indicate that there are different classes of transactions. An adjustable device is arranged to co-operate with the transaction perforations so as to control the accumulations of the clerks' and departmental totals of a particular class of transactions represented by the perforations with which the adjustable device is in co-operative relation.

Feed rollers for item record strip.

As previously mentioned, the rollers 7 and 8 for feeding the record strip 9, Fig. 9, are normally in operative relation with the driving mechanism and remain so until an entry on the strip is to be transferred to the proper departmental and clerk's total accumulators when they are automatically disabled as about to be described.

It is to be understood that there is one of these item record strips 9 used in each cashier-inspector's station of the establishment and as the total of each sale is recorded upon the sales slip, the strip is perforated with characters corresponding to the amount recorded on the sales slip and is also perforated with characters identifying the clerk making the sale, the department in which it is made and the class of transaction to which the sale belongs. At the end the day's business these various item record strips are taken to the auditing department and run through the auditing machine. While the strips are being perforated at the cashier-inspector's station they are preferably wound from one roll to another. These storage rolls for the perforated strip may be conveniently transferred to the auditing machine, one of these rolls being shown in Fig. 1, properly positioned in the auditing machine and identified by the reference numeral 40 which is suitably supported upon the shaft 41 mounted in the base of the machine. The end of the strip 9 passes up through an opening in the base of the machine and around a roller 42 and thence through an opening 43, Fig. 2, formed in the table like portion 44 of the casing 45 of the auditing machine. The strip is then led across the lower part of the table like portion 44 of the casing 45, through an opening formed in the portion 44 of the casing and thence over a roller 47, Fig. 1, suitably supported by a bracket 48, projecting from the side of the case, and then to a storage roll 49 located in the lower portion of the casing and loosely mounted upon a shaft 50 suitably supported within the casing 45.

The shaft 11, Figures 1 and 30, which is driven by the rotation of the crank handle 1 through the gearing 10, has secured thereto near its inner end, a pinion 55, which meshes with a gear 56 that has secured thereto a smaller gear 57, which in turn engages a gear 58. This gear 58, Fig. 2, is supported upon the flanges of disks 659 and 660 and is frictionally held in engagement with said disks by a corrugated leaf spring 61. The disk 659 is provided with a threaded hub 62 upon which is mounted the disk 660, the disk 659 being supported by the shaft 50. If it is desired to increase or diminish the tension of the spring 61 a screw stud 63 connecting the disks 659 or 660 is first removed and the disk 660 is then rotated upon the threaded hub 62 in the proper direction to increase or diminish the tension of the spring as may be desired after which the stud 63 is again inserted to prevent relative movement of the disks 659 and 660. In Fig. 1 the pitch lines only are shown of the gearing for transmitting a movement of the operating handle 1 to the storage roll 49, but it is thought this method of showing said gearing is just as satisfactory as if the teeth of various gears were illustrated and also avoids any possible confusion in the reading of said figure.

From the above description it will be seen that as the rollers 7 and 8 driven by the rotation of the operating handle 1 feed the strip from the receiving roller 40, Fig. 1, the storage roll 49 will be rotated to wind thereon the amount of strip fed from the receiving roll 40. As previously mentioned the strip 9 is temporarily arrested when an item is to be transferred to one of the accumulators and for this reason the frictional driving device for the storage roll 49, as shown in Fig. 2, is provided. With this frictional driving device gear 58, which is geared to the operating handle 1, may be rotated independently of the roll 49, but when there is no resistance to the feed of the strip, the roll 49 will rotate with the gear 58.

As shown in Fig. 3, the perforations 39, representing different classes of transactions, are located in different vertical columns on said strip, and as the auditing machine is so constructed as to accumulate the clerks' and departmental totals of one class of transaction only as the strip is fed through the machine, a device is provided which may be so adjusted as to co-operate with the perforations 39 of that particular class of transaction, which it is desired to accumulate the totals. As this adjustable device enters the transaction perforations 39, the feed rollers 7 and 8 are automatically disabled as will now be described.

This adjustable device, which co-operates with the transaction perforations 39 of the record strip, is fully shown in Figures 9, 14 and 39 of the drawings and is shown as a plunger or plate 59, which is supported by parallel links 60, which in turn are supported by a yoke shaped frame 61, that is guided and laterally adjustable upon cross rods 62 and 63. The cross rod 63 connects arms 64 which are pivotally mounted upon the cross rod 62, the latter being supported in the upper ends of arms 65 which are loosely mounted at the lower ends upon a cross rod 66 supported in the frame work of the machine.

When a set of the transaction perforations 39 with which the plate 59 is in alignment is presented to said plate, fingers 67 thereof will be forced into said perforations by a coil spring 68, which engages with one of the parallel links 60 supporting the plate 59 and tends normally to force said plate upwardly, but is prevented from so doing by the strip until a set of the transaction perforations 39 are presented to said fingers. Supported upon the cross rod 62 is a centrally pivoted lever 69, the forward end of which, Fig. 9, has projecting therefrom a rod 70 which is supported at its opposite end by an arm 71 which is also supported by the cross rod 62. The rod 70 passes through a slot formed in the plate 59. The rear end of the lever 69, Fig. 9, has connected thereto, the forward end of a link 72, the rearward end of which is connected to a triangular shaped plate 73, the latter being pivotally supported as at 74 by a plate 129 (Figs. 9 and 38) hereinafter described. A pin 75 projects laterally from the plate 73 and supports the forward end of a lever 76, which is pivotally mounted, as at 77, to the frame work. The upper surface of a portion 78 of this lever 76 engages the under side of an offset 79 of a pawl 80, which is pivotally mounted to the upper end of an arm 81, the latter being pivotally mounted at its lower end upon a cross rod 82 supported by the frame work.

From the above description it will be seen that as the plate 59 moves upwardly under the tension of the spring 68 so as to project the fingers 67 of said plate into a set of transaction perforations 39 of the strip 9, the said plate will rock the centrally pivoted lever 69 in a clockwise direction, Fig. 9, which movement will convey an anti-clockwise movement to the triangular shaped plate 73 through the link 72. As the plate 73 is thus rocked the pin 75 projecting from said plate will be lowered, consequently permitting the lever 76 to rock in an anti-clockwise direction. This rocking of the lever 76 permits the free end of the pawl 80 to engage with a tooth of a ratchet wheel 83 secured to the feed roller 7 for the record strip, and thus as this roller continues to rotate by the operation of the driving mechanism with the pawl 80 in engagement with the ratchet 83, the arm 81 carrying said pawl will be moved in a clockwise direction about the supporting rod 82. This rocking of the arm 81 will, through a link 84, rock the arms 65, by which movement the plunger plate 59 is carried with the strip as the latter continues to be fed by the rollers 7 and 8, thereby preventing the sudden engagement of the fingers 67 with the ends of the perforations 39, it being noted that the upper ends of the fingers 67 are formed so as to permit said fingers to gradually enter the perforations in the record strip during which time the pawl 80 is being lowered into engagement with the ratchet 83 of the feed roller 7.

As shown in Fig. 9, one of the arms 65 is provided with an offset 85 which normally engages with one arm of a bell crank lever 86 pivoted to an upright 87, the lever 86 being held in engagement with the offset 85 by a spring 88. The other arm of the bell crank lever 86 normally engages with a roller 89 (Fig. 14) projecting from a spring drawn slide 90 that is suitably carried by a collar 91 secured to the shaft 3 of the main operating mechanism. This slide 90 as shown in Fig. 14 normally engages with an offset 92 of the upright 87 and thereby prevents accidental movement of the shaft 3. As the arms 65 are rocked by the mechanism above described, the offset 85, Fig. 9, will rock the bell crank lever 86 in an anti clockwise direction thus carrying the vertical arm of said bell crank out of engagement with the roller 89 at which time a tooth 93 of the slide 90 will be drawn into engagement with a tooth of a ratchet wheel 94 secured to the gear 2, which is fast to the operating handle of the driving mechanism, thereby connecting the shaft 3 of the operating mechanism of the machine proper with the driving mechanism. By this movement the slide 90 is freed of the offset 92 of the standard 87 so that, as the crank handle 1 continues to rotate, the shaft 3 will also be rotated.

The arm 81 carrying the pawl 80 which engages the ratchet 83 of the feed roller 7 is connected to a similar arm by a cross rod 95, Fig. 15. Pivotally mounted upon the shaft 82, Figs. 9, 15 and 16, is a double prong lever 96, one prong of which encircles the rod 95, which connects the arms 81, while the other prong of said lever is provided with an anti-friction roller 97 that plays in a cam groove 98 (Figs. 16 and 38) formed in a disk 99 secured to the shaft 3. That portion of the cam groove 98 in which the roller 97 rests, while the disk 99 is in normal position, is larger than the diameter of the roller so that when the arm 81 is given its initial clock-wise movement by the pawl 80, engaging with the ratchet 83 of the feed roller 7, the double prong lever 96 will also be rocked without interfering with the cam disk 99, owing to the enlargement of that portion of the cam groove in which the roller, projecting from said arm, normally plays. It is by this initial movement of the arm 81 that the operating shaft 3 of the machine proper is connected to the driving mechanism. As the latter continues to operate after the connection of the shaft 3 therewith, the cam disk 99 will be rotated, by which rotation the double pronged lever 96 and the arm 81 will be given an oscillatory movement, first in a clock-wise direction, Fig. 16, and then back to their normal position. During this clock-wise movement of one of the levers 81, a pin 100, projecting therefrom, Fig. 9, will engage with the end of an elongated slot 101 formed in the lower end of a link 102 and moves said link downwardly. The upper end of this link 102 is connected to a prong 103 of a multi-prong frame 104 which is pivoted as at 105 to the frame work. The feed roller 8 for the record strip is supported in arms 106 of the frame 104 and as the link 102 is moved downwardly, as previously described, the frame 104 will be rocked about its pivot in an anti-clockwise direction, carrying the roller 8 out of engagement with the lower feed roller 7, but not far enough to disengage the gears 5 and 6. In this position of the frame 104, a downwardly extending prong 107 of said frame will be engaged by a shoulder 108 formed in the horizontal arm of a bell crank lever 109 and thereby hold said frame in its adjusted position against the tension of a spring 110.

Slidingly mounted upon each one of the arms 81 is a link 111, Figs. 9 and 15, which is guided by pins 112, projecting from the arm 81 through elongated slots 113 formed in the link. The lower ends of these links 111 are held into engagement with the upper surfaces of cam plates 114 by springs 115, while the upper ends of said links are connected to a clamping bar 116 which is pivotally supported as at 117 to the arms 81. The initial movement of the frame composed of the arms 81 will carry the links 111 off of the upper surfaces of the cam plates 114 on to inclined portions of said plates thereby permitting the springs 115 to draw the links downwardly and rock the clamping bar in an anti-clockwise direction, Fig. 9, thereby gripping the record strip between said bar 116 and offsets 118, projecting from the upper ends of the arms 81, Figs. 15 and 38. With the above described gripping device in operative position, it will be obvious that the movement of the frame comprising the arms 81, in a clockwise direction by its cam disk 99, will cause the record strip 9 to be fed in the same direction in which it is originally fed by the rollers 7 and 8 after the latter rollers have been disabled as previously described. This enabling of the auxiliary feeding device comprising the clamping bar 116 and the arms 81 and the operation thereof brings the perforations in the record strip in position to register with the stop pins carried by the movable pin case 46, because of the fact that the throw of the arms 81 of the auxiliary feeding device is a constant one and sufficient to bring the field of perforations which the plunger 59 engages and which controls the enabling of the auxiliary feeding device in position to register with the stop pins of the movable pin case 46.

As seen from Fig. 16 the arm 81, forming a part of the auxiliary feeding device, is given an oscillatory movement and in order to prevent the buckling of the record strip as the arms 81 are returned to normal position, the cam plates 114, Figs. 15 and 17, are operated so as to release the clamping plate 116, as the arms 81 are started in an anti-clockwise direction, Fig. 9, toward home position. The hubs of the cam plates 114, Fig. 15, are secured to the shaft 82 upon which are mounted the arms 81. The innermost one of these cam plates 114, Fig. 17, is provided with an extension 119 which has an anti friction roller 120 projecting therefrom into a cam groove 121 formed in a disk 122 secured to the shaft 3. The shape of the cam groove 121 is such that, as the arms 81 of the auxiliary feeding device, are rocked in a clockwise direction by the cam disk 99, the cam plates 114 will be rocked in a similar direction by the cam groove in the disk 122, but first plates 114 are rocked slightly in the opposite direction. During the rocking of the arms 81 and the cam plates 114, the lower ends of the slides or links 111 rest upon the inclined portion of the cam plates 114 thereby keeping effective the clamping bar 116 of the auxiliary feeding device. As the auxiliary feeding device starts to return to its normal position, the cam plates 114 will be held in their advanced positions so that the slides 111 will ride up the inclined portion of the cam plates 114 thereby rendering inoperative the clamping bar 116, thus as the auxiliary feeding device is returned to normal position it will not cause the record strip 9 to buckle. After the auxiliary feeding device reaches home position, the cam plates 114 are restored to their normal position as shown in Figs. 9 and 17 by the cam disk 122.

After the adjoining field of perforations has been brought in position to register with the stop pins of the pin case 46 by the auxiliary feeding device, a cam plate 123, Fig. 9, secured to the shaft 3 will contact with the downwardly extending portion 124 of a lever 125 and rock said lever in an anti-clockwise direction. This lever is approximately centrally pivoted upon a portion of the frame work of the machine and the other end of said lever is provided with a rod 126, which at the time of engagement between the cam plate 123 and portion 124 of lever 125, is above an offset 127 of the transaction selecting plunger or plate 59 and as lever 125 is rocked in an anti-clockwise direction, the rod 126 will engage offset 127 and lower the plunger 59 so as to withdraw the finger 67 of the plunger from the transaction perforations 39 and hold it free of the record strip during the return movement to normal position of the feeding device. As the auxiliary feeding device reaches its home position, which position is shown in Fig. 9 of the drawing, the offset 85, of the arm 65, connected to this feeding device will rise to such a position that the bell crank 86 cooperating with the offset 85 will be rocked to the position shown in Fig. 9, of the drawing by its spring 88, in which position the vertical arm of the bell crank will engage with the roller 89, Figs. 9 and 14, projecting from the slide 91 and cam this slide inwardly so as to disengage the tooth 93 from the ratchet 94 secured to the driving gear 2. This movement of the slide 90 will cause it to be positioned to engage with the offset 92 of the upright 87 and thereby arrest the shaft 3. Near the end of the rotation of shaft 3 an arm 128 secured thereto will engage with the downwardly extending arm of the bell crank 109, Fig. 9, and rock it in a clockwise direction, thereby withdrawing the shoulder 108 from engagement with the prong 107 of the frame 104 carrying the feed roller 8, so as to permit the roller to be drawn into contact with the feed roller 7 by the spring 110.

Integral with one of the arms 64, supporting the rod 63 upon which is slidingly mounted the frame carrying the transaction selecting plunger 59, is the plate 129, the extreme end of which is forked, Fig. 9, and into which forked portion extends a pin 130 projecting from one of the arms 81 of the auxiliary feeding device, this plate 129 of the arm 64 being simply for the purpose of keeping the plunger frame is a horizontal plane during the operation of the auxiliary feeding device.

In case the driving mechanism is actuated when no record strip is in the machine, the following mechanism is provided for preventing the establishment of operative relation between the driving mechanism and the main operating mechanism of the machine proper.

A plate 1301, Figs. 9 and 14, over which the record strip 9 passes has projecting downwardly therefrom an ear 131 to which is pivotally mounted a pawl 132. This pawl is connected by a link 133 to a lever 134 which is centrally pivoted upon a stud 135 projecting from the frame work. The other end of the lever 134 carries a rod 136 which extends over an offset 137 of the transaction selecting plunger 59. A spring 138 is coiled about the stud 135 and normally tends to rock the lever in a clockwise direction, but is restrained by the pawl 132 connected to this lever, engaging with the record strip 9. If no record strip is in the machine, the pawl 132 passes through the plate 1301 thereby permitting the spring 138 to rock the lever 134 until the rod 136, carried thereby contacts with the offset 137 of the transaction selecting plunger 59 and holds it below the normal plane of travel of the record strip 9, the spring 138 over-balancing the power of the spring 68 which normally holds the plate 59 elevated. By thus holding the transaction selecting plunger, neither the auxiliary feeding device nor the main operating mechanism is brought into operative relation with the driving mechanism. To accomplish this function of holding the transaction selecting plunger in an inoperative position when there is no strip in the machine, the spring 138 of necessity is much stronger than the spring 68 which normally forces the plunger upwardly through the transaction perforations of the record strip.

Main operating mechanism.

The disabling of the feed rollers 7 and 8 and the enabling of the auxiliary feeding device and the operation thereof is performed by the main operating mechanism. The mechanism for performing these functions has been described under the head of the strip feeding device as it forms a part of the mechanism for feeding the record strip, and it is thought unnecessary to repeat the description of the operation of that mechanism under the present heading, but all of the other functions performed by the main operating mechanism will be described under sub-divisions coming under the head of the main operating mechanism.

Lowering of pin case.

The pin case 46, as shown particularly in Figs. 9, 11 and 12, is nothing more than a plate in which are movably mounted three sets of stop pins, one set, 140, representing amounts, the second set 141, Fig. 14, representing clerks' numbers and the third set 142, Fig. 15, representing departments. These stop pins or plungers are supported by keys 143 inserted in the recesses through which the stops extend. Each of the stops has an elongated cut-away portion 144 through which the keys 143 pass, which keys also prevent the rotation of the stops while permitting an independent vertical movement thereof. The pin case or plate 46 has projecting from each corner thereof a pin 145, Figs. 9 and 11, each of which extends into a recess 146 of an arm 147. Extending horizontally with the sides of the pin case 46 are rods 148 to each of which are secured two of the arms 147 as plainly shown in Fig. 11. The rods 148 are supported by plates 149 which in turn are fastened to the side walls 150 of a casing 151 within which the pin plate 46 is carried. This casing 151 is provided with two horizontal partitions 152 and 153, Fig. 12, through which the various sets of stop pins or plungers extend. The side walls 150 of this casing are suitably supported by the frames 154 of the previously mentioned table-like portion 44 of the cabinet 45. The rods 148, Fig. 11, extend through the inner plate 149 and each of said rods has attached to its inner end an arm 155. These arms 155, Fig. 9, extend toward each other and one of them at its inner end is forked, into which extends a reduced portion of the other arm. The arm 155 with the reduced portion, has an extension 156, connected by the upper end of a link 157, to an arm 158, which is loosely mounted upon the shaft 82. The arm 158, Fig. 17, is provided with a roller 159, which extends into a cam groove 160 formed in a disk secured to the shaft 3. The shape of the groove 160 is such that when the auxiliary feeding device has brought a field of perforations of the record strip is position to register with the stop pins of plungers in the pin case 146, the latter is lowered through the arms 155, 156 and 158 and the link 157. As the pin case is lowered, the plunger pins therein will drop by gravity, some of them passing through the perforations in the record strip, while the remainder of said plungers or stop pins will be held elevated by coming in contact with the strip. The pins that have passed through perforations in the record will control the adjustment of certain differentially movable slides in a manner now to be described.

Adjustment of differentially movable slides.

The differential slides and certain graduated stop plates co-operating therewith, as herein after described, form means for determining the extent of movement imparted to the selected accumulator by the actuating means.

These slides 161, Figs. 3, 9, 11, 12, 14 and 15 are mounted between channel bars 162 which are supported by the frames 154. These slides are arranged in three groups corresponding to the different groups of plunger pins. The group of slides 161 co-operating with the amount plunger pins 140 consists of five slides which represent a registering capacity of $999.99. Co-operating with the clerk's number pins 141 are two slides 161ª while co-operating with the pins 142 representing the departments is a single slide 161ᵇ. The clerk's and departmental slides are supported by the channel bars 162 in the rear of the amount slides, the two clerk's slides being supported by the same channel bars that support the two highest amount slides while the departmental slide is supported by the channel bars which support the tens of cents amount slide.

Connected to each of the slides 161 by a rod 163 is a lever 164, Figs. 3, 6, 11 and 14, which levers are journalled on rod 165, which in turn is supported by a frame 166 secured to one of the frames 154. Each of the levers 164 has connected thereto one end of a spring 167, Fig. 6, the other end of which is connected to a rod 168 supported by the framework. A rod 169 normally rests against the rear edges of all of the levers 164, and holds them in the position shown in the figures of the drawings, against the tension of their springs 167. This rod 169 is supported by arms 170 which are secured to the shaft 165, Figs. 6, 8 and 25. This shaft 165, near its left hand end, Figs. 3 and 8, has secured thereto an arm 171, which arm is connected by a link 172 to an arm 173 loosely mounted upon a shaft 174 supported in the lower end of the frame 166. The arm 173 at its free end is provided with a roller 175, Fig. 25, which plays in a cam groove 176 formed in a disk 177 secured to a shaft 178, which is one of the main operating shafts of the machine and which shaft runs at right angles to the previously described shaft 3, the latter shaft driving the shaft 178 through beveled gears 179 and 180, Figs. 8 and 14.

After the pin case has been lowered by the cam disk shown in Fig. 17, the cam disk 177, Fig. 25, will withdraw the rod 169 from engagement with the rear edges of the levers 164, which levers will immediately be rocked in an anti-clockwise direction by their springs 167, Figs. 3, 6 and 25, the extent of movement of said levers being determined by the pins that have passed through the perforations in the record strip. The plunger pins have recesses 181, Fig. 12, which normally are in horizontal alignment with offsets 182 of downward extensions 183¹ of the slides 161, but when the pin case is lowered as previously described the heads of the pins that pass through perforations in the record strip move in the path of the offsets 182, while the heads of the other pins remain out of the path of said offsets, which permits the slides to pass through recesses 181 until arrested by the pins that have passed through the perforations in the strip.

Adjustment of graduated stop plates.

As previously stated a series of graduated stop plates co-operate with the above described levers 164 in such a manner that these plates are adjusted in accordance with the adjustment of the levers 164, which stop plates and levers comprise the means for determining the extent of movement of the actuators for the accumulators.

These graduated stop plates 183, Figs. 3 and 6, are journalled upon a transverse shaft 184 and are connected by links 185 to plates 186, which are pivotally connected to the levers 164 by pins 186¹. As the levers 164 are rotated about the shaft 165 by their springs 167, a rod 187 will engage with the lower edges of the plates 186 and move said plates in a clock wise direction about their pivotal connections 186¹ with the levers 164, until the upper edges of said plates contact with offsets 188 of the levers 164. With the upper edges of plates 186 in contact with the offsets 188, the lower edges of said plates will describe an arc of a circle struck from the shafts 165. At this time the rod 187 which elevates the plates 186 is at rest so that if the levers 164 continue to rotate in an anti-clockwise direction after the engagement of the upper edges of the plates 186 with the offsets 187, said plates will move as if they are extensions of the levers 164. This movement of the plates 186 will, through links 185, position the graduated stop plates 183.

When the operating shaft 3 is connected to the driving mechanism and no amount is to be registered, the amount plunger pins 140, Fig. 12, will all be held in their upper positions by the record strip 9, in which position the plunger recesses 181 will all be in alignment with the offsets 182 of the extensions 183¹ of the slides 161 so that when the frame comprising the rod 169 and arms 170, Figs. 6 and 25, is rocked in an anti clockwise direction, the slides 161 will be drawn through the recesses 181 by the rocking of the levers 164 through springs 167. When the machine is thus operated the slides 161 and levers 164 connected thereto receive their greatest movement, and through the plates 186 and links 185 set the graduated stop plates 183 in the position shown in Fig. 6.

The amount registered is in inverse proportion to the extent of travel of the slides 161. When said slides are arrested by the right hand stop pins of the group 140, Fig. 14, the graduated plates will be set so that a series of 9's will be registered upon one of the accumulators. If the slides are stopped by the second pins from the right, 8 will be registered, and so on, decreasing by one unit for each stop pin of the group 140.

The rod 187 which engages the lower edges of the plates 186 is supported by arms 189 which are secured to the shaft 174, which is supported by the frame 166. This shaft has secured thereto an arm 190, Figs. 8 and 25, which is provided at its free end with a roller 191, playing in a cam groove 192 of a disk 193 secured to the shaft 178. The shape of the cam groove 192 is such that the rod 187 is rocked in a clockwise direction, to carry the previously adjusted plates 186 into contact with the offsets 188 of the levers 164, simultaneously with the release of the levers 164 by the cross rod 169.

After the graduated stop plates 183 are adjusted, an aligning frame 194 engages with V shaped notches 195 formed in the plates 183, and locks them in their adjusted positions, after which the rods 169 and 187 are returned to their normal positions as shown in Figs. 6 and 25 by the respective cam disks 177 and 193. The return of the rod 169 to its normal position will carry the levers 164 and slides 161 connected thereto to their normal positions against the tension of springs 167.

Figure 28:
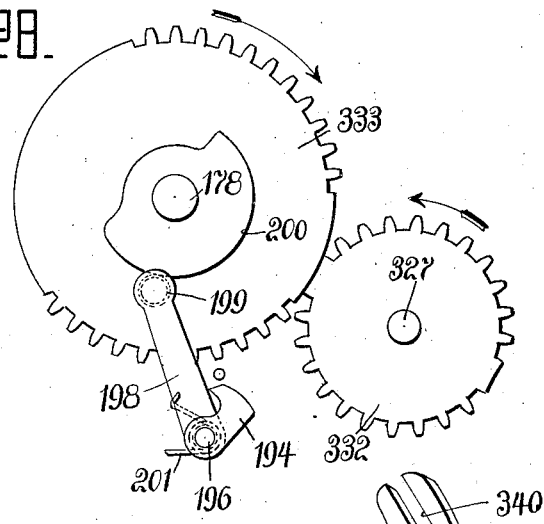
Fig. 28 is a detail view of a part of the gearing for actuating the transfer shaft and also of the cam for aligning the graduated plates which control the adjustment of the actuators.

The aligning plate 194 is of a yoke shape formation, Figs. 6, 8 and 28 and is supported by studs 196 projecting from uprights 197. One end of this aligning frame has secured thereto an arm 198 the upper end of which is provided with a roller 199, which is held in contact with the periphery of a cam disk 200 secured to the shaft 178, by a spring 201 coiled about one of the studs 196. Just previous to the adjustment of the graduated stop plates 183, the aligning frame 194 is rocked out of engagement with the stop plates 183 by its spring 201. After the plates have been adjusted the cam disk 200 rocks the plate 199 back into engagement with the notches 195 of the stop plates 183.

The two clerk's slides 161ª (Fig. 11) control mechanism for selecting the accumulator that is to be actuated. One of these slides is connected to a graduated stop 183, while the other is connected to a plate 202 (Fig. 6) which is loosely mounted upon the shaft 184 adjacent to the graduated stop plates 183. The departmental slide 161ᵇ is also connected to one of the graduated stop plates 183, which stop plate controls the selection of the departmental accumulator. The differentially adjusted stop plates 183 are arranged in two groups, one group of which controls the selection of any one of a plurality of clerk's accumulators and determines the amount to be entered upon the selected accumulator, while the other set of stop plates 183 is used for the purpose of controlling the selection and actuation of any one of a plurality of departmental accumulators. The operation of the selecting mechanism for the clerk's and the departmental accumulators will hereinafter be more fully described.

The graduated plates 183 shown in Fig. 6 are for the clerk's section of the machine and are connected by links 203 to arms 204 which are secured to transverse shafts 205. These shafts have arms similar to arms 204, which are connected to a similar set of graduated stop plates 183 in the departmental section of the machine by links 203.

*Actuating mechanism for the accumulators*

The actuating mechanism herein shown for the clerk's and the departmental accumulators comprises two sets of rack bars 206, (Figs. 6, 7 and 8) the first five of each set being controlled by their respective graduated plates 183, while the remaining bars of each set are used merely for transfer purposes and consequently do not need to be controlled by graduated plates 183. The first five rack bars of each set have extending forwardly from the lower ends thereof projections 207, Figs. 3 and 6, which have lateral offsets 208 arranged to contact with the graduated stops of the plates 183.

Pivotally mounted upon the lower end of each rack bar is a bell crank lever 209 the movement of which is limited in one direction by a pin 210 extending from each rack bar. The horizontal arm 211 of each bell crank normally rests upon a cross rod 212, which is supported by arms 213 secured to a transverse shaft 214. This shaft 214, Figs. 8 and 26, has secured thereto a forwardly extending arm 215 which is connected by a link 216 to a bell crank 217 pivotally mounted on a transverse shaft 218. This bell crank lever 217 has a roller 219 projecting from one arm thereof into a cam groove 220 of a cam disk 221 secured to the shaft 178. At the beginning of rotation of the shaft 178, the frame comprising the roller 212 and arms 213 is rocked in a clockwise direction, thereby permitting the rack bars 206 to be lowered until arrested by the graduated stop plates 183 which have been previously adjusted. After the rack bars have been adjusted, the frame comprising the roller 212 and the arms 213 is restored to its normal position, thereby carrying the rack bars also to their normal positions, which restoration of the rack bars actuates the accumulator which has been previously selected.

It may be well here to state that the actuation of the selected accumulator in accordance with the adjustment of the graduated stop plates 183 does not take place during the cycle of operation at which the plates are adjusted, but upon the succeeding cycle of operation. When the record strip 9 is placed in the machine the stop plates 183 are in the position shown in Fig. 6, and in this position it will be obvious that the rack bars 206 will be held in their uppermost positions although the frame comprising the roller 212 and 213 is oscillated. The oscillation of this frame takes place previous to the adjustment of the stop plates 183, so that when said stop plates are being adjusted upon the first cycle of operation, the roller 212 is then in position to hold the rack bars 206 elevated. After the stop plates 183 have been adjusted they are locked in their adjusted positions by the aligning plate 194 and remain so locked at the end of the first cycle. Upon the beginning of the second cycle and while the graduated plates 183 are locked in their previously adjusted positions, the frame comprising the rod 212 and the arms 213 is oscillated, permitting the rack bars 206 to drop until arrested by the previously adjusted stop plates 183. During the lowering of the rack bars upon the second cycle of operation, the accumulator selecting mechanism is brought into play, so that previous to the restoration of the rack bars an accumulator is engaged therewith, so that as the rack bars are restored to their normal position, the amount determined by the stop plates 183 during the first cycle of operation of the machine will be entered upon the selected accumulator. After the entering of the amount upon the accumulator in the second cycle of operation, the stop plates 183 will be adjusted for controlling the entering of a second amount, which will take place upon the third cycle of operation. This dividing of the functions necessary for the entering of a transaction upon an accumulator among a plurality of cycles of operations of the machine is considered a very valuable feature of this invention, as it enables the movement of the various parts that take part in the entering of a transaction to occur at a greatly reduced rate of speed, and thereby prevents any possibility of overthrow or misoperation of the different parts.

The higher amount racks 206 of each set, which are used exclusively in the transferring operation, have projecting therefrom pins 222, Figs. 4 and 10, which are engaged by arms 223, projecting upwardly from a rock shaft 224, and thus prevent the lowering of these particular rack bars when the frame comprising the roll 212 and arms 213 is oscillated. Suitable mechanism is provided for rocking the arms 223 out of engagement with the pins 222 in the total taking operation, as will hereinafter more fully appear.

*Accumulators and selecting mechanisms therefor.*

As herein shown there are two groups of total accumulators, one for clerks and the other for the departments. The clerks' group consists of thirty accumulators arranged in ten rows of three each, while in the departmental group there are ten accumulators, one in horizontal alignment with each row of clerk's accumulators. The frame in which the clerk's accumulators are mounted is laterally movable, so as to bring any of the accumulators of the different rows in position to be engaged with the actuating racks. In addition to the mechanism for shifting the clerk's accumulator frame, a vertical selecting device is provided for rocking any one of the ten accumulators that are in position, into engagement with the actuating racks. The departmental group of accumulators is provided with a similar selecting device for rocking any one of these accumulators into engagement with the set of actuating racks common thereto.

A movable frame 225, Figs. 3, 4 and 6 is supported at the bottom and guided at the top and bottom by ball bearings 226 in the horizontal bars 227 of an auxiliary frame carried by the frame work of the machine. Pivotally mounted upon cross rods 228 which extend through the movable frame 225 into the vertical bars 2272 (Fig. 3) connecting the horizontal bars 227 of the auxiliary frame are a plurality of frames carrying the clerk's accumulators 229, the elements of which are in the form of pinions 230, which in turn are carried by rods 231 forming part of the accumulator frame. The department accumulators are mounted in the stationary frame 2251 (Figs. 7 and 8) which is similar to the clerk's accumulators frame 225 except that it is rigidly mounted at the top and bottom to the horizontal bars 227 of the auxiliary frame as shown in these figures. The department accumulator carrying frames 229, there being one for each accumulator, are similar to those of the clerk's accumulators, and are loosely mounted upon cross rods 228, which are rigidly mounted in the side bars 2252 of the stationary frame 2251. The frame for each group of accumulators is provided with a forward extension 232, which rests upon a pin 233 projecting from a vertically movable bar 234 for each group of accumulators, Figs. 4, 6, 7 and 8, by which pins the accumulators are positively held out of engagement with the actuator racks 206. This bar 234 has a slot 235, Fig. 6, in which plays a pin 236 projecting from an arm 237 secured to and extending rearwardly from a shaft 238. This shaft is rocked, as hereinafter described, to permit the rocking of one of the accumulators into engagement with the actuating racks 206, and as this shaft is rocked the bar 234 is lowered, so that the pin 233 projecting therefrom and which co-operates with the pivoted frame carrying the selected accumulator, will not interfere with the movement of the accumulator into engagement with the actuating racks. This lowering of the bar 234 will also carry the pins 233 of the remaining accumulators out of engagement therewith, and by so doing, if some means were not provided, the remaining accumulators would rock by gravity into engagement with the racks, but in order to prevent this springs 239 are suitably mounted in the framework so as to hold the accumulators that are not to be engaged with the actuators, out of operative relation therewith.

It was previously stated that one of the clerk's slides 161ª is connected to one of the graduated stop plates 183 in a manner similar to the amount slides, which stop plate is used for controlling the differential adjustment of a selecting bar or frame 240. This selecting frame, at its lower end, has connected thereto a plate 241, Figs. 6, 8 and 21, which plate is provided with a spring operated finger 242, co-operating with the graduations of the stop plate 183. The purpose of the spring operated finger 242 is to permit the rearward movement of the frame 240 and the rocking of the desired accumulator into engagement with the actuating racks.

The frame 240 is further provided with plates 243, Figs. 3, 4, 6, 7 and 8, having elongated slots 244, into which project pins 245 extending from arms 246 secured to the rock shaft 238 and a similar rock shaft 2388. These pins 245 act as guides for the vertical movement of the selecting frame 240.

An arm 247, Fig. 19, is secured to and extends forwardly from the shaft 238 and at its forward end has projecting laterally therefrom a pin 248, which enters a recess 249 in the forward end of an arm 250 loosely mounted upon shaft 238. The arm 250 is laterally movable upon the shaft 238 and is arranged to co-operate with two arms 251 and 252 by entering recess 253 formed in the upper ends of said arms. These arms 251 and 252 are guided at their upper ends by a rod 254 which passes through elongated slots 255 formed in said arms, the rod 254 being supported by a yoke shaped frame 256 secured to the frame 227 which supports the accumulator frames 225 and 2251. At their lower ends, Figs. 8 and 22, the arms 251 and 252 are connected to arms 257 and 258 respectively, which arms are loosely mounted upon a cross rod 259 suitably mounted in the framework of the machine. The arms 257 and 258 extend rearwardly and have projecting from their rearward ends rollers 260 which extend into cam slots 261 and 262 formed in cam disks 263 and 264 respectively, which disks are secured to the operating shaft 178. The cam disk 264 and intermediate connections are used for rocking the shaft 238 during the total taking operation, which will hereinafter be described, and therefore no further reference need be made to said cam disk at present.

The shape of the cam groove 261 formed in the disk 263 is such that after the selecting frame 240 has been positioned by its stop plate 183, the arm 257 will be rocked in a clockwise direction and through the arms 250, 251 and 247 rock the shaft 238 in an anti-clockwise direction, Figs. 6, 19 and 22. This shaft 238 is connected to shaft 2388 by arms 265 and 266 and link 267, Figs. 3, 4, 7 and 8, so that when the shaft 238 is rocked, as above described, the shaft 2388 will also be rocked. The rocking of these two shafts will, through arms 246 and pins 245, projecting from said arms, move the selecting frame 240 rearwardly. This selecting frame has a series of flanges 268, Fig. 3, one for each row of clerks' accumulators. Plunger pins 269 are guided by offsets 270 of the clerk's accumulator frame 225 and the inner ends of these pins contact with flanges 271 projecting from the frame of each row of clerks' accumulators. The flanges 268 of the differentially adjustable selecting frame 240 are differentially spaced apart, by which means there will be only one flange at a time in operative relation with these pins 269, and therefore when the selecting frame 240 is moved rearwardly, as above described, only one row of clerks' accumulators will be rocked, carrying one of said accumulators into operative relation with the actuating racks 206. The selecting mechanism so far described only selects the row in which one of a plurality of accumulators is to be brought into operative relation with the actuators, and now will be described the mechanism for selecting the particular accumulator of that row which is to be actuated.

As previously stated, the clerks' accumulators are arranged in rows in a movable frame, and in each row there are three accumulators, the denominational elements 230 of which are grouped together. By thus grouping the denominational elements, the lateral movement of the frame 225 to bring any one of the accumulators into co-operative relation with the set of actuating racks common to all accumulators, is reduced to a minimum.

With the parts in normal position, as shown in Figs. 7 and 8, the actuating racks 206 are in position to engage with the first denominational elements 230 of every group of three, when any one of the rows of accumulators is rocked by the selecting frame 240. If it is desired to bring one of the other accumulators of any row opposite the actuators, the frame 225 is shifted in the following manner.

Fastened to the forward edge of the frame 225, carrying the clerks' accumulators, is a plate 273, Figs. 4, 7 and 18, which has projecting upwardly therefrom a stud 274. This stud projects through recesses 275 formed in the rear ends of levers 276 and 277, which levers have fulcrum points 278 and 279 respectively. The forward ends of the levers 276 and 277 have recesses 280, into which a projection 281 extending from a block 282 is arranged to be moved. This block 282 is slidingly mounted in a plate 283 secured to a frame comprising a cross bar 284 and side arms 285. The side arms 285 of said frame are slidingly mounted upon the shaft 2388 and a rock shaft 286. The block 282, Figs. 4, 6, 7, 8 and 18, is connected by a rod 287 to the upper end of link 185, which is connected to the plate 202 controlled by one of the clerk's slides 161ª. This plate 202, has only three positions and consequently the block 282 connected to said plate, has the same number of positions, in the lower-most one of which, the lug 281, projecting from said block, is below the levers 276 and 277, in which position the block is shown in the drawings. The block assumes this position when there is no perforation of the record strip with which the clerk's plungers 141 engage.

As the frame carrying the accumulators is arranged to be shifted one or two spaces only and as this shifting is controlled by the tens column of pin plungers 141 of the clerk's set of plungers, it is therefore unnecessary to provide more than two of said plungers in the tens column. When the strip is perforated so that the units plunger of the tens column of the clerk's set of plungers passes there through, the plate 202 controlled by the slide 161 co-operating with this column of plungers is rocked one step in an anti-clockwise direction, Fig. 6, and through the above described intermediate connections, moves the block 282 upwardly a corresponding distance, by which movement the lug 281 will enter the recess 280 of the lever 277. After the block 282 has been thus positioned, the frame comprising the cross rod 284 and the side arms 285 is shifted laterally, by which movement the lever 277 is rocked about its fulcrum 279, and thereby shifts the accumulator frame 225 to bring the second set of accumulators into a position in which they may be rocked into engagement with the actuating racks 206. When the second plunger of the tens column of the clerk's plungers 141 passes through a perforation 37 in the record strip, the plate 202 will be given two degrees of movement in an anti-clockwise direction in Fig. 6, and through the above described intermediate mechanism raise the block 282 so that its lug 281 will pass through the recess 280 of the lever 277 and into the recess of the lever 276, Fig. 18. When this block is shifted laterally with its carrying frame, the lever 276 will be rocked about its fulcrum 278 and move the frame 225 two steps towards the right, bringing the third set of accumulators of the clerk's section into position to be engaged with the actuating racks 206. The shifting movement of the block 282 is the same whether it engages the lever 276 or lever 277, but owing to the different fulcra of said levers, a differential movement is imparted to the accumulator carrying frame 225. An elongated slot 288 is formed in the lever 277, through which the fulcrum pin 278 of the upper lever 276 passes.

The shifting of the frame carrying the block 282 is accomplished in the following manner.

Projecting downwardly from the cross bar 284 of the frame carrying the block 282, is a plate 289, Fig. 7, in which is formed a cam slot 290. Projecting in this cam slot is a roller 291 mounted upon the outer end of an arm 292, Figs. 3, 5 and 7, secured to the rock shaft 286. This rock shaft 286, Fig. 3, has extending rearwardly therefrom an arm 293, which is connected by a link 294 to a bell crank lever 295 journalled upon the shaft 218, which is suitably supported in the frame work of the machine. This bell crank 295 is provided with a roller 296, Fig. 27, which projects into a cam groove 297 formed in a disk 298 secured to the shaft 178. The shape of the cam groove 297 is such that upon the beginning of rotation of the disk 298, the bell crank 295 will be rocked in a clockwise direction, and through the link 294 rock the arm 293 and shaft 286 in a similar direction. This rocking of the shaft 286 will cause the roller 291 to pass down the slot 290 of the plate 289, and thereby shift said plate and the frame to which it is secured, to the right, Fig. 7. This shifting of the frame and the block 282 will restore the accumulator frame 225 to its normal position with the right hand accumulator of each row in position to be engaged with the actuating racks 206, after which the determining plate 202 is adjusted. This restoration of the accumulator frame 225 occurs upon the same cycle of operation as that at which the determining plate 202 is adjusted, as may be seen by reference to the plot shown in Fig. 41. Upon the succeeding cycle of operation of the machine, the accumulator frame 225 will be adjusted in accordance with the previous setting of the determining plate 202. This movement of the frame 225 occurs while the determining plate 202 is locked by the aligning plate 194.

In Fig. 41 there is shown a plot of the timing of the operation of the various parts that perform the different functions in the entering of a transaction upon any one of the accumulators, under the control of the perforations in the record strip. In this plot each function performed during the adding operation is listed and also the figures in which the different parts for performing these various functions are best shown. It is thought that this plot will be of considerable assistance in the understanding of the operation of the machine. A similar plot illustrating the timing of the various parts in the operation of the machine for clearing and listing the totals is shown in Fig. 42.

As will be seen each function is given a horizontal space on the plots and the vertical spaces indicate periods of the operation, one rotation of the main shaft or 360° being indicated. The lines indicating functions are horizontal when no movement of the elements performing the functions take place, and are inclined at parts of the operation where movement occurs. Thus, the strip feed lever, which is indicated in the uppermost spaces of these plots, starts to move as soon as the main shaft begins to rotate and continues through about 90° of the main shaft rotation. It then remains stationary through about 40°, returns during the next 150° and remains in its normal position for the remaining 80° of the rotation of the main shaft. The movements of the other function performing elements will be understood from the example given, and those functions which have their timing changed for total printing, may be readily seen by a comparison of the two plots or diagrams.

The departmental accumulators are similar to the clerks' accumulators with the exception that they are mounted in a stationary frame instead of a movable frame as are the clerks' accumulators. The selection of the departmental accumulator is controlled by a selecting bar similar to the bar 240 of the clerk's section of the machine, the differential movement of which is controlled by a graduated stop plate 183, which in turn is controlled by the single row of departmental pin plungers 142, co-operating with the perforations 38 of the record strip 9. This selecting mechanism of the departmental accumulators being identical with the selecting frame 240 of the clerk's accumulator, it is thought no further description of it need be given.

After the selected accumulator has been actuated by the restoration of the racks 206—it being understood that during the downward movement of said racks, the accumulators are free thereof—the selecting frame 240 is moved forwardly by the arms 246 secured to the rock shafts 238 and 2388, thereby permitting the spring 239 of the actuated accumulator to withdraw it from engagement with the actuating racks 206. If the spring should for any reason fail to perform this function the accumulator will be positively disengaged from the racks by one of the pins 233 projecting from the slide 234, engaging with the extension 232 of the accumulator, which slide is supported and operated by the previously described arms 237 projecting from the rock shafts 238 and 2388.

A vertical shaft 299, Figs. 4, 6, 7 and 8, supported by flanges 300 extending from the forward edge of the frame 225, is provided at each end with a pinion 301, each of which meshes with a rack plate 302 secured to the frame work 227 in which the shifting accumulator frame 225 is mounted. The purpose of this pinion and rack connection is to prevent the possibility of the frame 225 binding, caused by the upper or lower portion of said frame being started in advance of the other portion of said frame.

It has been stated that the selecting bars or frames 240 for the clerks' and departmental accumulators are controlled by graduated stop plates 183 similar to the ones controlling the actuating racks 206, but owing to the fact that the selecting parts hold the departmental and clerks' accumulators in engagement with the actuating racks during restoration of the latter, it is necessary to provide restoring means for these differentially movable selecting frames which is operated independently of the restoring means for the actuating racks. This independent restoring means will now be described.

Each of the frames 240 is provided with a forward extension 303, Figs. 3, 4 and 5 which is engaged by a roller 304 projecting from an arm 305 secured to the previously described rock shaft 286. The arm 305 is shown in normal position, Fig. 3, and in operated position, Fig. 5. By reference to the plot shown in Fig. 41 it will be seen that the selecting frames are restored to normal position by the rollers 304 projecting from the arms 305 at the beginning of each cycle of operation, and immediately lowered to engage with the previously graduated stop plates 183 controlled by the departmental stop pins 142 (Fig. 15) and one series of the clerk's stop pins. After the adjustment of the frames 240 the selected accumulators are engaged and the actuating racks restored to normal position, during which restoration the selecting frames 240 remain in their adjusted position. As previously stated, during the restoration of the rack bars, the determining plates 183 and 202 are readjusted to positions determining the accumulators to have entered thereon the amount of the next transaction and for this reason the finger 242, Fig. 21, of each selecting frame 240 is made flexible so that even if either of the fingers 242 should be in engagement with one of the lower steps of its graduated plate 183, the said plate may nevertheless be readjusted for the purpose of having its finger 242 co-operate with one of the higher steps. If these fingers 242 were rigid with the selecting frames 240 it would be impossible to readjust the plates 183, owing to the fact that the selecting frames are not restored until the beginning of the next cycle of operation, as will be understood by reference to the plot shown in Fig. 41.

The arm 305, Figs. 3 and 5, has projecting therefrom two rollers 306, one of which rollers at the end of the rocking of the shaft 286, carrying the arm 305, in either direction, will engage with the forward edge of a pawl 307 which is pivotally mounted on a cross bar 308 of the frame work, and rock said pawl in a clockwise direction, so that the rear end thereof will enter into one of the notches 309 formed in the lower end of the plate 273 secured to the accumulator frame 225, Fig. 18, and thus align the frame so that the proper accumulator may be accurately engaged with the actuating racks.

*Transfer mechanism.*

The transfer mechanism herein shown is of that type wherein the actuators for the accumulators are moved an additional step to effect the transfer.

In normal position the accumulating elements 230 of all of the accumulators are prevented from accidental displacement by plates 310, suitably secured in the movable frame 225 of the clerk's section and the stationary frame 2251 of the departmental section, which plates pass between two of the teeth of the accumulator elements or pinions 230. Each of the pinions is provided with an elongated tooth 311, which as said pinion rotates ten steps from zero position after being engaged with its actuating rack, will rock a lever 312 in a clock-wise direction. This lever, of which there is one for each rack bar 206 except the rack bar of the highest denomination, is mounted adjacent to its companion rack bar upon one of the cross rods 228 and at its rearward end is forked and straddles a rod 313. As this lever is rocked in a clockwise direction by the enlarged tooth 311, the forked portion of said lever will engage with a collar 314 secured to the rod 313 and elevate said rod, which elevation will rock a bell crank lever 315 in an anti-clockwise direction against the tension of a spring 316, Fig. 6, the lower end of the rod 313 being secured to a stud 317 projecting from said bell crank. The lower edge of the vertical arm of the bell crank 315 is provided with a notch 318 in which a pawl 319 is drawn by the spring 316, when said bell crank is rocked as above described, and thereby latches the bell crank in its adjusted position. The ball crank 315 and pawl 319 are mounted upon rods 320 and 321 respectively. Pivotally mounted to each of the horizontal arms 315 is a downwardly extending arm 322, which is provided at its lower end with a notch 323. The forward edge of this arm 322 abuts against the rearward edge of one of the downwardly extending arms of the previously described bell crank 209 which is pivotally mounted at the lower end of one of the rack bars 206.

A plurality of slides 324, one for each of the arms 322 are mounted in the lower portion of the casing and are guided at their rearward ends by a yoke shaped plate 325, and at their forward ends by collars 326, mounted upon a shaft 327. Each of these slides 324, near its rearward end, is provided with an offset 328 and at its forward end with rollers 329 and 330, with which rollers a cam 331, secured to the shaft 327, co-operates. It is to be understood that there is one of the cams 331 for each of the slides 324 and these cams are spirally arranged about the shaft 327, so that a successive movement will be imparted to the slides 324. With the parts in the position shown in Fig. 6 of the drawings, the slides 324 will be moved rearwardly upon the beginning of the rotation of the shaft 327 thereby carrying the offsets 328 out of the recesses of the arms 322, these slides being held in rearward position until after the restoration of the rack bars 206. If, during the restoration of one of the rack bars, the bell crank 315 is rocked by one of the accumulator pinions, having received ten steps of movement from zero position the lower rearward edge of the arm 322 will be brought into the path of the offset 328 of its companion slide 324 and latched therein by the pawl 319. After the restoration of the rack bars 206, the slides 324 are cammed forwardly successively by the cams 331, and as the offset 328 engages with the rearward edge of the elevated arm 322 it will rock said arm in a counter clockwise direction. This movement of the arm 322, as it contacts with the rearward edge of the downwardly extending arm of the bell crank 209, will rock said bell crank, which movement will be conveyed to the rack bar 206 of the next higher denomination to effect the transfer, owing to the fact that the horizontal arm 211 of the bell crank 209 at this time is supported by the restoring roller 212, which roller acts as a fulcrum for said bell crank 209.

The shaft 327, carrying the cams 331 has secured thereto a mutilated gear 332, Figs. 8 and 28, which is arranged to engage with a mutilated gear 333, secured to the shaft 178. At the beginning of rotation of the shaft 178, the shaft 327 will be given a half rotation during which time the slides 324 will be moved rearwardly. Near the end of rotation of the shaft 178, shaft 327 will be given its last half of rotation during which time the transfer will be effected.

In the entering of an item upon any one of the accumulators, the selected accumulator is not actuated by the racks 206 until the succeeding cycle of operation, near the end of which cycle the transfer slides are operated to effect the transfer.

At the beginning of each cycle of operation a frame comprising side arms 650 and a cross rod 651, Figs. 6 and 23, is rocked first in a clockwise direction and then back to normal position. If a transfer has taken place at a previous cycle of operation the cross rod 651 will engage the rear ends of the latch pawls 319 that are in operative relation with the bell cranks 315, and rock said pawls out of engagement with the bell cranks, thereby permitting said bell cranks to return to their normal position through aid of springs 316. The side arms 650 of the above mentioned frame are secured to a rock shaft 652, which has extending upwardly therefrom, Fig. 23, an arm 653, that is connected to the rearward end of a link 654, the forward end of the latter being connected to the vertical arm of a bell crank lever 655. The horizontal arm of said bell crank is provided with a roller 656 that plays in a cam groove 657 in a disk 658 secured to the shaft 178. The shape of the cam groove is such that the frame comprising the side arms 650 and cross rod 651 is oscillated at the beginning of each cycle of operation to restore to normal position the latch pawls of the transfer mechanism as previously described.

General operation.

The description of the adding operation of the machine is now completed and the total printing and clearing operation may next be taken up. It may be of advantage, however, to make a brief statement as to the general operation of the mechanism which has been described. The machine has nothing to do with the perforating of the item record strips 9. These may be perforated by any desired machines, and at the close of the day, or other desired time the item strips 9 from each department are taken by some one authorized to the auditing department. There they are run through the machine of the present invention in succession, and in fact each strip is run through the machine three times in the ordinary use of the strip. In the class of establishments for which this machine is primarily designed, there are three main classes of transactions, namely "Cash," "Charge" and "C. O. D." sales. The present machine is adapted to handle one only of these kinds of classes of transactions at a time, and to pick out from the item strips all of the transactions of that particular class, rejecting all transactions of the other two classes. For example, by setting the machine to pick out the "Cash" transactions, the item strip will, when run through the machine, cause all "Cash" transactions only to be added on the various accumulators, thus segregating all the cash sales of each clerk, and all the cash sales of each department. The item strip 9 may then be removed from the machine and a separate total controlling strip inserted in place of the item strip, and the totals of the accumulators then automatically printed on a record strip as will be hereafter described. Such automatic total printing also clears all the accumulators, and the same item strip 9 will then be again run through the machine, but the machine is this time set to pick out and accumulate "Charge" transactions only. After these have been cleared and printed by the use of the total strip, the item strip is run a third time through the machine, and the machine adjusted to accumulate C. O. D. sales. After totaling these C. O. D. sales the item strip 9 from some other machine is handled in the same manner, thus at length accumulating and printing the totals of all the sales in the store. Thus, a record of all sales, classified by clerks and by departments, is provided on a single record strip which is easily adapted for any desired computations.

Total printing and clearing operation.

It would be, of course, possible to read the accumulations entered on the various accumulators, but as this would provide many chances for mistakes and would also be tedious, the machine is designed to clear the accumulators and print their totals automatically. As is usual, only one accumulator may be cleared at a time, as only one set of total printing type carriers is provided. It is therefore necessary to provide mechanism for determining which accumulator shall control the total printing, and to provide devices for identifying each total accumulation printed on the record strip with the accumulator from which it was obtained. In many machines this is done by providing keys which determine on which accumulator amounts shall be added and from which accumulator totals shall be printed. This machine, however, is not provided with any keys, as the accumulators on which amounts are to be added are determined by the perforations in the item record strip 9. Therefore, to control the printing of totals separate strips one for clerks and the other for departments, shown in Figures 33 and 35 respectively, are provided. Each of these strips is provided with as many fields of perforations as there are totalizers. These strips are permanent devices, that is they are used at the close of every day and no perforations are made in it after it is first completed. Each field is provided with perforations controlling the total printing from a predetermined accumulator, and is also provided with amount perforations for permitting the proper amount racks to operate. Therefore, on the total record strip the totals from the various accumulators will be printed in an invariable order, determined by the different perforations on the total controlling strips shown in Figs. 33 and 35.

In clearing the various accumulators and recording the totals thereof a manipulative device is employed which when adjusted, determines whether the accumulators of the clerk's or the departmental sections are to be cleared and their totals recorded, the selection of the particular accumulator to be cleared being controlled by perforations in a total strip in a manner similar to the selection of the accumulators when amounts are entered thereon. By the adjustment of the aforesaid manipulative device, the timing of the occurrence of several of the functions to be performed, is somewhat changed from the timing of these functions in the adding operation hereinbefore described, which change of timing will be particularly pointed out in the detailed description which follows.

Total record strips.

The clerk's total strip 334 and departmental total strip 335 as shown respectively in Figs. 33 and 35, are identical with the exception that the clerk's strip 334 has no departmental perforations 38, while the department total strip 335 has no clerk's perforations 37, thereby preventing the possibility of selecting both clerk's and departmental accumulators where only the selection of one is intended. In the amount field of each section of each of these strips 334 and 335 a series of perforations 36 representing the highest amount are provided, by which the determining means is set to permit the greatest movement of the actuating racks. Each of these strips have transaction perforations 39, all of which are in alignment, the only need of said transaction perforations being for the purpose of controlling the connection between the driving mechanism and the main operating mechanism of the machine. As before stated, the total strips are permanent devices each being used repeatedly, and having for their sole purpose to determine which of the accumulators shall have its total printed.

Total manipulative device.

Upon the operation of the total manipulative device, the timing of the operation of different parts for performing various functions is altered, and also the listing mechanism for recording the totals is brought into operative condition.

Alteration of the timing adjustments.

A total manipulative device in the form of a lever 336 is splined upon a shaft 337, Figs. 3 and 10, so that the lever and shaft may be rocked together, while permitting an independent lateral movement of the lever upon said shaft. This lever 336 is capable of being adjutsed laterally into three positions. With the lever in the left hand position shown in Fig. 10, the various devices controlled by said lever, are in a position to enter an amount upon any of the accumulators. With the lever in a central position, the mechanism controlled thereby for clearing the accumulators of the clerk's section and recording the totals thereof is in operative condition; while with the lever in the extreme right hand slot, the mechanism for controlling the clearing and listing of the departmental totals is in operative condition. Upon moving the lever from the position shown in Fig. 10, to the central position and moving the forward end of said lever upwardly, the shaft 337 will be rocked in an anti-clockwise direction. This shaft has secured thereto a forwardly extending arm 338, having projecting therefrom a pin 339 which extends into a cam slot 340, Fig. 7, of a centrally pivoted lever 341, which lever has connected to its lower end one end of a rod 342, Fig. 8, the other end of the latter being connected to the arm 250, Figs. 8 and 19. From this it will be seen that as the shaft 337 is rocked, the lever 341, Figs. 7 and 8 will be rocked in an anti-clockwise direction, by which movement the arm 250 will be shifted from the recess 253 of arm 251, Fig. 19, into a similar recess formed in the arm 252. This latter arm, at its lower end, as before stated, is connected to a rearwardly extending arm 258, Fig. 8, which is provided with a roller 260 that plays in a cam groove 262 of the disk 264, Fig. 22. By reference to this figure it will be seen that upon the beginning of rotation of the shaft 178 the disk 264 will elevate the arm 252 and rock shaft 238 and thereby rock the selected accumulator into engagement with the actuating racks before said racks are lowered, it being understood that the selecting mechanism was positioned upon the preceding cycle of operation.

Figure 29:
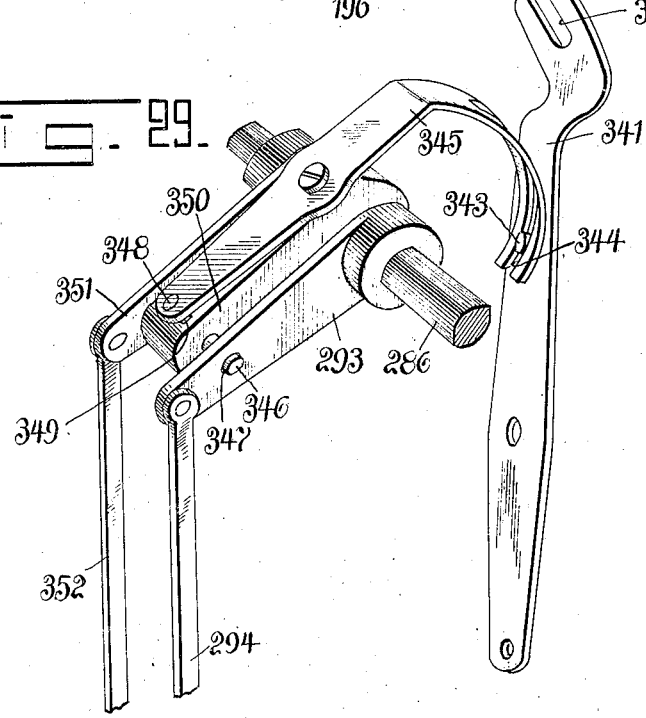
Fig. 29 is a perspective view of a part of the mechanism which controls the shifting of the frame carrying the clerks accumulators.

When the lever 341, Figs. 7 and 8, is rocked by the above described manipulation of the total lever 336, a pin 343 projecting inwardly from said lever, Figs. 3 and 29, and which plays in a slot 344 formed in a curved extension of a lever 345, will so rock said lever that a stud 346 secured to the rear end of the lever 345 will be withdrawn from recess 347 formed in the previously described arm 293, which is loosely mounted upon the shaft 286. The stud 346 is secured to the lever by a pin 348 extending downwardly from said lever through a recess 349 formed in the rear end of an arm 350 secured to the rock shaft 286. When the lever 345 is rocked as above described, thereby withdrawing the stud 346 out of the recess 347 of the arm 293, the other end of said stud, which extends through the arm 350, will pass into a recess in an arm 351, which recess is similar to the recess 347 formed in the arm 293. The arm 351 is loosely mounted upon the shaft 286 and when the stud passes into the recess of said arm, it thus connects the arm with the shaft 286 through the arm 350 secured to the shaft. The arm 351 has extending downwardly therefrom a link 352, Figs. 26 and 29, which link is connected to the end of the horizontal arm of a bell crank 353 which is loosely mounted upon the shaft 218. The vertical arm of the bell crank 353 is provided with a roller 354, which projects into a cam groove 355 formed in a disk 356 secured to the shaft 178. The shape of the groove 356 is such that the bell crank 353 will be rocked near the end of the rotation of the shaft 178, and through the intermediate connection just described, rock the shaft 286 at the same time, whereas said shaft, when connected to the arm 293, will be rocked at the beginning of the rotation of the shaft 178 as described in an adding operation of the machine and as fully shown in Figs. 27 and 29. As the rocking of the shaft 286 controls the adjustment of the selecting frame 240 through the arm 305, Figs. 3 and 5, and as the time of operation of the shaft is changed, as above described, it is obvious that the timing of the operation of the selecting frame 240 is also changed. The rocking of the shaft 286 under the control of the cam disk 356 and intermediate connections, Figs. 26 and 29, will, through the arm 292, Figs. 5 and 7, shift the frame composed of the cross rod 284 and the side arms 285 at a different time from that at which it is shifted during the adding operation.

This change of timing for the selection and engagement of the accumulators is fully shown in the plots shown in Figs. 41 and 42, and it is thought that a careful study of these plots will make clear the operation of the machine during either an adding or total printing operation.

*Inter-locking mechanism between the clerk's and departmental section.*

In the taking of the totals, if some mechanism were not provided for preventing the dropping of both sets of rack bars when it is desired to list the totals of either the clerk's or the departmental section, it is obvious that the printing mechanism hereafter described, which is under the control of the rack bars, would cause the erroneous listing of totals. For this reason the rack bars of one section are held locked in their uppermost position while the rack bars of the other section are free to be lowered. The mechanism for accomplishing this function is as follows:

Upon shifting the total manipulative device 336 to its central position in which position it controls the listing of the clerk's totals, and rocking said lever in an anti-clockwise direction, a portion 357, Figs. 3 and 10, of the extension of said lever will contact with a pin 358 extending forwardly from a yoke shaped plate 359, which is loosely mounted upon the shaft 337 and rock said frame 359 in a similar direction. One of the arms to the frame 359 is connected by a link 360 to an arm 361 secured to a rock shaft 362. This shaft 362 has secured thereto a yoke frame 363, the cross bar 364 of which is arranged to enter into the notches 365, Figs. 4 and 10, of the rack bars 206 of the departmental section of the machine and thereby hold said rack bars in their elevated position while the rack bars of the clerk's section are free to be lowered. When the lever 336 is moved to the right hand slot shown in Fig. 10 and rocked in an anti-clockwise direction, Fig. 3, the extension 357 will engage with a pin 367, projecting rearwardly from a yoke shaped frame 368 loosely mounted upon the shaft 337, Figs. 3 and 10. This anti-clockwise movement of the lever 336 will thus be conveyed to the yoke frame 368 and through a link 369 connected to one of the arms of the frame 368, rock an arm 370 loosely mounted upon the shaft 362. This arm 370 is secured to a sleeve 371 surrounding the shaft 362 and which sleeve is provided with a yoke shaped frame 372, the cross bar 373 of the latter being arranged to engage with notches formed in the rack bars 206 of the clerk's section, which notches are similar to the notches 365 of the rack bars of the departmental section as shown in Fig. 4. With this construction it is obvious that when either the clerk's or departmental totals are to be listed, the rack bars of the section which are not to be used will be locked in their uppermost positions, and thereby prevent any erroneous listing of totals.

*Disabling of holding means for higher rack bars.*

It was previously stated that the rack bars of higher denomination of each section were used for transferring purposes only, during the adding operation, and as said bars are only moved upwardly to effect a transfer means for preventing the lowering of said bars were provided, but as it is essential in the total taking operation to permit the lowering of these bars, it is necessary to provide mechanism for disabling this holding means. This mechanism will now be described.

When the total manipulative device 336 is rocked while in either the clerks' or departmental position, the shaft 337 will be rocked owing to said manipulative device being splined thereon. This shaft 337 has an arm 374 extending rearwardly therefrom, which arm is connected by a link 375, Figs. 3 and 10, to an arm 376 secured to the rock shaft 224. From this description it will be seen that as the shaft 337 is rocked by the operation of the total manipulative device, the shaft 224 also will be rocked. This shaft 224, Figs. 4 and 10, has extending upwardly therefrom arms 223 which engage with rollers 222 projecting from the racks of higher denomination of the clerks' and departmental sections. This rocking of the shaft 224 will thus withdraw the arms 223 from engagement with the rollers 222, thereby leaving all said racks free to descend.

*Total listing or recording mechanism.*

The recording or listing mechanism is designed to be enabled only when the totals are to be listed, owing to the fact that it would be a mere duplication of work to list the items, as these items have already been listed in the making out of the item record strips. This total listing mechanism is therefore normally disabled, but is enabled by the operation of the total manipulative device.

The rocking of the total manipulative lever 336 will, as previously described, rock shaft 224, Figs. 3 and 4. This shaft has extending upwardly therefrom an arm 377, which is connected by a link 378 to a yoke shaped frame 379 pivotally mounted upon a rod 380. The cross bar of this yoke shaped frame 379 normally reaches under extensions 381 of type carriers 382, which are pivotally mounted upon a cross rod 383. When the rock shaft 224 is rocked the cross bar of the yoke shaped frame 379 will be withdrawn from the extensions 381, thus permitting said type carriers 382 to be lowered by springs 384 upon the operation of the machine.

The type carriers 382 are controlled by plates 385, which have offsets 386 extending beneath forward projections 387 of the rack bars 206. At their rearward edges the plates 385 are provided with V shaped notches 388, which are engaged by a locking frame 389 pivoted upon a rod 390, suitably secured in the frame work of the machine. The frame 389 has projecting rearwardly therefrom an ear 391 to which is connected the upper end of a link 392, the lower end of this link 392, Fig. 24, being connected to an arm 393, which arm is pivoted upon the shaft 259. The rearward end of the arm 393 is provided with a roller 394, which plays in a cam groove 395 formed in a disk 396 secured to the shaft 178. The shape of the cam groove 395 is such that upon the beginning of the rotation of the shaft 178, the frame 389, Fig. 4, will be rocked in a clockwise direction, thereby freeing the plates 385, which will then move with the rack bars 206. The rack bars are lowered in accordance with the amount on the accumulator engaged therewith, it being understood that in the total listing operation, the accumulator is engaged with the rack bars, previously to the lowering of said bars. When the accumulator elements 230 reach their zero positions, the enlarged tooth 311 of each element will engage shoulders 397 of pawls 312, which shoulders arrest said accumulator elements from further rotation. This downward movement of the rack bars will, through the projections 387 and the offsets 386, Fig. 4, of the plates 385 rock said plates in an anti-clockwise direction, extents commensurate with the movement of said bars, after which the cam disk 396, Fig. 24, will rock the locking plate 389 into engagement with the notches 388 of said plates 385, thereby locking the latter in their adjusted positions. After the plates 385 have been locked, a restoring frame for the type carriers 382, comprising side arms 398 and a cross rod 399, Fig. 4, will be rocked in a clockwise direction. This rocking of the restoring frame is caused by a cam groove 400 formed in a disk 401 secured to shaft 178, Fig. 24, in which cam groove plays a roller 402 projecting from an arm 403, loosely mounted at its forward end upon the shaft 259. A link 404, Figs. 4 and 24 connects the restoring frame for the type carriers and the arm 403. By this mechanism the restoring frame for the type carriers is first rocked in a clockwise direction and then back to normal position. Near the end of rotation of the shaft 178, as said restoring frame is rocked in a clockwise direction, springs 384 move the type carriers in a similar direction until said type carriers are arrested by offsets 405 of the rearward extension of said type carriers contacting with the lower edges of the plates 385. After the type carriers have been positioned and an impression taken therefrom, the cross rod 399 of the restoring frame engages with the lower edges of the type carriers and restores them to normal position against the tension of their springs 384.

When the shaft 224, Fig. 4, is rocked, as previously described, by the operation of the total manipulative device, the link 378 connected to said rock shaft, will be moved rearwardly. Projecting from this link is a pin 405a which enters into a recess formed in the vertical arm of a bell crank lever 4406 which is suitably pivoted upon a part of the machine frame. The horizontal arm of this bell crank is provided with a pin 4405, Figs. 4 and 37, which enters a slot 3406 formed in the rearward end of a link 407, which link at its forward end is connected to a frame 408 for tripping the latch pawls 409 of the type hammers 410. When the bell crank 4406 is rocked by the rearward movement of the link 378 a notch 411 formed in the upper edge of link 407 will engage with a pin 412 projecting from one of the side arms 398 of the restoring frame for the type carriers. With the link 407 in this position the restoring frame for the type carriers will move the link rearwardly as the frame is rocked in a clockwise direction, and near the end of the rearward movement of the link 407, the frame 408 will engage with the latch pawls 409 and rock them in a clockwise direction, thus freeing the hammers 410, which will be drawn into contact with the previously adjusted type carriers 382 by their springs 413, the ends of which springs are connected to the hammers 410 and to the latch pawls 409. As the restoring frame for the type carriers is returned to normal position the link 407 will move forwardly and rock the frame 408 in a clockwise direction about its supporting rod 414. As the frame is thus rocked its cross rod will engage with extensions 415 of the hammers 410 and restore them to their normal position, in which position they are latched by the pawls 409. While items are being entered upon the accumulators the link 407 is in the position shown in Figs. 4 and 37 in which position it is latched from movement by the pin 4415, which projects from a portion of the frame work into a notch 4416 formed in the lower edge of said link.

Connected to the link 407 is another link 417, the forward end of which is connected to a rock frame 418 pivoted upon a rod 419. The frame 418 is provided with a pawl 420 which engages with a ratchet 421 secured to a feed roller 422, which roller is mounted upon the rod 419, and contacts with a roller 423 mounted upon a pivoted frame 424, which roller is held in contact with the roller 422 by a spring 425. From this description it will be seen that as the link 407 is operated to trip the type hammers, the link 417 will also be operated, which through the pawl 420 will rotate the feed rollers 422 and 423 so as to feed a strip 426 upon which the totals are listed.

The previously adjusted plates 385, Fig. 4, are restored to their normal position by springs 427 when the lock frame 389 is withdrawn from the notches 388 of said plates. To retard the return movement of the plates 385, they have fastened thereon plates 428, having eccentrically curved outer edges, which are engaged by spring operated pawls 429 mounted upon the rod 390 supporting the locking frame 389. The plates 428 are so placed upon the plates 385 that as the latter near normal position the spring tension of the pawls 429 engaging the plates 428 is increased thereby retarding the plates 385 and consequently preventing rebound of the latter plates.

As there are two sets of actuating rack bars 206 there are also two sets of determining plates 385 for the one set of type carriers 382, the said type carriers being connected by links 430, arms 431, rock shafts 432 to levers 433, the rearward portions of which are identical with the rearward portions of type carriers 382. These levers 433 are controlled by the set of plates 385, Figs. 4 and 10, that co-operate with the rack bars 206 of the clerk's section. The type carriers 382 and the levers 433 have upward extensions 434, which in connection with pawls 435, control the adjustment of the type carriers 382. When one of the plates 385 of either the clerks or the departmental section is rocked by its co-operating rack bar 206, a pin 436 projecting from said plate, will cam the co-operating pawl 435 out of locking position relative to the extension 434 of either the lever 433 or the type carrier 382 depending in which section the operating rack bar is located. These pawls 435 are connected with pawls of lower denomination by overlapping flanges 437 which construction is well known in the art and it is thought needs no further description.

As the type carriers 382 and the levers 433 move in unison under the control of either set of plates 385, which sets are operated independently, it becomes necessary to rock the pawls 435, co-operating with the unoperated set of plates out of locking engagement with the extensions 434, as otherwise the type carriers 382 would be held from adjustment. The mechanism for accomplishing this function is as follows:

Extending through elongated slots 438, Fig. 4, of each set of rack bars 206, is a rod 439 which is supported by arms 440 loosely mounted upon a shaft 441, suitably mounted in the machine frame. The slots 438 formed in the rack bars 206 have camming shoulders 442 which are located just above the rod 439 when said rack bars are in normal position. Upon the lowering of any of the rack bars the shoulder 442 formed therein will engage the rod 439 and rock said rod and the arms supporting it in a clockwise direction, Fig. 4. Extending forwardly from one of the arms 440 supporting the cross rod 439 co-operating with each set of rack bars, is an arm 443, Figs. 4 and 10, which arms are bifurcated at their forward ends to engage with pins 444, projecting from links 445. The forward end of each link 445 is connected to a yoke frame composed of a cross rod 446 and arms 447 which frame is loosely mounted upon a rod 448 upon which are pivoted the two sets of pawls 435. These pawls have upward extensions 449 which normally engage with the rods 446 of each frame. Each link 445 has formed near the center of its upper edge a shoulder 450, with which a pin 451 projecting from the side of the locking frame 389 is arranged to co-operate. When one of the rack bars 206 is lowered it will rock the arms 440 supporting the rod 439, co-operating with the lowered rack bar and through the arm 443 lower the link 445, so that when the locking frame 389 is oscillated, the pin 451 will pass beyond the shoulder 450 of said link. In the section in which no rack bar is lowered, the pin 451, projecting from the other side of the locking frame 389, Fig. 10, will engage with the shoulder 350 of the other link 445, when the locking frame 389 is restored to its normal position and thus move the link 445 forwardly. By this movement of the link, the frame to which it is secured at its forward end will be rocked in a clockwise direction, Fig. 4, and through the cross rod 446 of said frame, rock the pawls 435 so as to clear the extensions 434 of either the type carriers 382 or the levers 433, thereby permitting said type carriers to be adjusted in accordance with the movement of the rack bars.

*Means for identifying the listed totals.*

It is necessary to provide some means for identifying the clerks' and departmental totals listed upon the strip 426, which means will now be described.

It will be remembered that the total strips are provided with perforations, which determine which of the accumulators shall be cleared and have its total printed. These strip perforations are positioned in the same places on the total strips as are the perforations on the item record strips, which determine the accumulators into which amounts shall be entered. In the total printing operation the total strip perforations for clerks and departments determine which accumulator shall be cleared. In the adding operation there is no printing of the amounts as they have already been listed in some other way, and therefore the clerks' and department perforations in the item strip do not control any printing devices. Thus in total printing operations there would be no mechanism for identifying on the total strip the accumulators from which the totals have been cleared. To give this information, which is, of course, necessary, elements are provided in connection with each accumulator, which at total printing operations do determine the movement of certain type carriers. These elements are permanently set differently for each accumulator and thus they will provide for giving different movements to their controlled type carriers, whereby a record may be printed on the total record strip indicative of the accumulator from which the totals are printed.

The first seven rack bars 206, counting from the right, Fig. 10, of the clerk's section, are used for entering items upon the various clerk's accumulators while the last two rack bars are used for the purpose of controlling two of a set of three type carriers 452, Figs. 7 and 10, and are positioned under the control of the determining plates 385, co-operating with the two highest rack bars 206 of the clerk's section in a manner similar to the controlling of the amount type carriers 382 by the remainder of the plates 385 of the clerk's section. These two type carriers are used for listing the clerk's numbers opposite the totals as shown in Fig. 34 of the drawings, while the third type carrier 452, which is positioned under control of the highest rack bar of the departmental section, is used in connection with the other two type carriers for listing numbers in hundreds for identifying the various departments as shown in Fig. 36. The strip 426 shown in the last mentioned figures is a continuous strip, and is shown separated merely to illustrate the printed matter recorded thereon under the control of the total strips 334 and 335 shown in Figs. 33 and 35.

The two highest rack bars 206 of the clerk's section shown in Figs. 7 and 8 co-operate with the last six of the accumulator elements 230 of each row of clerks' accumulators, which elements are properly positioned upon the various accumulator shafts, 231 so as to control the movement of the rack bars in the total taking operation, in order to set the type carriers 452 in positions for listing the number identifying the accumulator from which the total is recorded. Each of these six accumulator elements 230 of each row of clerks' accumulators is held at a fixed point upon the supporting shaft 231 by a light coiled spring 453, Fig. 40. This spring is secured at one end to a pin 454, projecting laterally from the accumulator element 230, while the other end of said spring is secured to a disk 4455 splined to the shaft 231. This disk 4455 is seated in the cut out portion of the accumulator element 230 and is provided with a tooth 456, with which the pin 454 is held in contact. Each of these accumulator elements 230, co-operating with the two highest rack bars of the clerk's section, is provided with an enlarged tooth similar to the tooth 311 of the remainder of the clerks' accumulator elements and these teeth 311 are located different distances from the stop shoulders 397, Figs. 4 and 6, of the trip pawls 312.

As previously stated and as shown in the drawings, there are ten rows of clerk's accumulators, three to each row, nine of which rows are selected to engage with the actuating racks under the control of the nine stop pins of the units column of the clerk's set of stop pins 141, the remaining row being selected by the selecting frame 240 when the latter is not moved from normal position, which occurs when there is no perforation in the units column of the clerk's division of the record strip.

With the clerk's accumulators of the lower row in position to engage with the actuating rack bars as shown in Fig. 8, which occurs when there is no perforation in the clerk's field of the total strip, the accumulator elements co-operating with the two highest rack bars will have their enlarged teeth 311 in contact with the shoulders 397, Fig. 4, thereby preventing movement of those rack bars which control the setting of the clerk's numbers with the result that zeros will be printed, as shown opposite the fourth total listed on the strip 426 in Fig. 34. When the next to the bottom row of clerk's accumulators are rocked, with the accumulators in the position shown in Fig. 8, the units rack bar of the two highest rack bars will drop one step before the enlarged tooth of the accumulator pinion 230 contacts with the stop shoulder 397 while the highest rack bar will be held in its elevated position, owing to the fact that the enlarged tooth of the pinion co-operating therewith is normally in position to contact with the shoulder 397. If the third set of accumulators were rocked into engagement, the units rack bar would be permitted to drop two steps while the tens rack bar will be held in its normal position. For each higher set of accumulators engaged with the rack bars, the units rack bar controlling the units numbering type carrier 452 will drop one additional step, while the tens rack bar in none of these examples would be lowered, owing to the fact that the various pinions of the different rows of the accumulators co-operating with said rack bar have their enlarged teeth in position to engage with the stop shoulder 397.

When the clerk's accumulator frame is shifted one space to bring any of the second column of accumulators of the different rows into position to engage with the actuating rack bars, the numbering pinions of the different rows of accumulators will also be shifted, thereby bringing into position to co-operate with the two highest rack bars 206 the second and fifth pinions 230 from the left as shown in Figs. 7 and 8. In this position of the accumulator frame the pinions 230, co-operating with the tens numbering rack bar, are permitted to rotate backwardly against the tension of their springs 453 one step before the enlarged tooth of any of said pinions contacts with its stop shoulder 397, thereby permitting the setting up of the numeral 1 on the tens type carrier 452, the setting up of which type carriers would control the latch pawl 435 co-operating with the units type carrier so as to permit the adjustment of the latter in order that the digit 0 may be listed in connection with the 1 of the tens type carrier. The column of number pinions 230 co-operating with the units rack bar in this position of the accumulator frame are permitted to be reversely rotated when engaged with the rack bar, the same distances as described in connection with the vertical column of number pinions that engage with the units rack bar when the accumulator frame is in the position shown in Figs. 7 and 8. It may be well to state that the third set of vertical number pinions which is arranged to be brought into co-operative relation with the units numbering rack bar when the accumulator frame is shifted two steps to the right also have the same degrees of movement before their enlarged teeth contact with the stop shoulders 397, as above described in connection with the first two vertical columns of number pinions. All of the vertical column of number pinions that are brought into operative relation with the tens numbering rack bar 206 when the frame is shifted one step to the right, control the lowering of the said rack bar one step, which in connection with the movement of the units rack bar permits identifying numerals from 10 to 19 inclusive to be recorded in alignment with the totals listed from the corresponding clerk's accumulators. When the accumulator frame is shifted two steps to bring the left hand column of number pinions 230, Fig. 8, into co-operative relation with the tens rack bar 206, the said rack bar is permitted to be lowered two steps, when any one of said pinions is engaged with said rack bar, before the enlarged tooth of the engaged pinion contacts with the stop 397, which adjustment of the rack bar permits the numeral 2 of the tens type carrier to be brought into printing position. In connection with the adjustment of the units type carrier this permits the listing of the identifying numerals from 20 to 29 inclusive in alignment with the totals recorded from the corresponding clerk's accumulator.

The highest rack bar 206 of the departmental section co-operates with the left hand pinions of the various departmental accumulators, and is moved differentially under the control of said pinions in the same manner as the units bar of the clerk's section, in order to print characters from 0 to 9 inclusive in the hundreds denomination, depending upon the accumulator rocked into engagement with the actuating racks.

With the exception of the change of timing for the operation of the accumulator selecting mechanism, the operation of the mechanism for performing the other functions of the machine, such as, the operation of the feed devices for the total strip, the connecting of the main operating mechanism with the driving mechanism, the adjustment of the determining means, and the falling and restoring of the rack bars; is identical with the performance of these various functions described in the adding operation of the machine, and therefore it is not thought necessary to repeat the description of the operation of the various parts for performing these functions.

It will thus be seen that the printing of the totals of the various accumulators will take place automatically on running the total strip of Figures 33 and 35 through the machine. The transaction perforations 39 of these strips cause release of the machine and connection to the main operating handle. The clerk's perforations 37 and the department perforations 38 determine which accumulator shall have its total printed by controlling the engagement of the totalizers with the actuating rack. The identification of each total with its corresponding accumulator is made automatically by the gear pinions associated with each of the accumulators, whereby a number is printed on the record strip indicative of the clerk and the department to whom the total is to be credited.

Recapitulation.

In order that the complete operation of the machine may be better understood, a resumé of the different functions performed by the machine in both the adding and total printing operations will now be given.

In the adding operation, after the item record strip 9 has been attached to the storage roll 49, Fig. 1, and the transaction selecting plunger 59 has been positioned to co-operate with one class of transaction perforations 39, the handle 1 is rotated and through the gears 2, 4, 5 and 6, Fig. 9, feeds the strip, which is stored on the roller 49 by the intervening gearing 10, Figs. 1 and 30, and the gears 55, 56, 57 and 58. When a set of transaction perforations 39 present themselves to finger 67 of the transaction selecting plunger 59, the said plunger will move upwardly, due to the tension of spring 68, Fig. 9, which movement will rock lever 69 in a clockwise direction and through link 72 rock the triangular plate 73 about its pivot 74, thus withdrawing the pin 75, projecting from said plate so as to permit the rocking of lever 76 in an anti-clockwise direction. This rocking of the lever 76 permits the pawl 80 to rock in a similar direction, so that the free end thereof will engage with a tooth of the ratchet 83 secured between the gear 5 and the feed roller 7. The continued movement of the gear 5 by driving handle 1 will cause arm 81, carrying the pawl 80 to rock in a clockwise direction, which movement will be imparted to arm 65 carrying the frame supporting the transaction selecting plunger, by link 84. This movement of the arms 65 will cause the extension 85 of one of said arms to rock the bell crank 86 against the tension of its spring 88 so that the upper end of the vertical arm of said bell crank will be withdrawn from engagement with roller 89, projecting from slide 90, Figs. 9 and 14, carried by the collar 91 secured to one of the main operating shafts 3. When the bell crank 86 is thus rocked a tooth 93 of the slide 90 will be moved into engagement with a tooth of the ratchet wheel 94 secured to the gear 2, which is fast with the driving handle 1, Fig. 14. The continued rotation of the handle 1 will cause the shaft 3 to rotate and by cam groove 98, Fig. 16, formed in disk 99, secured to said shaft 3, cause the further rocking of the arms 81 and the arms 65 connected therewith. The initial movement imparted to the arm 81 by the ratchet 83 as above described will cause slides 111, Figs. 9 and 15, supported by the arms 81, to be moved downwardly by the springs 115, by which movement the clamping plate 116, connected to the upper ends of said slides 111, will grip the item record strip 9, so that the continued movement of the arms 81 by the cam disk 99 will cause said strip to be fed forwardly to bring the amount perforations 36, Fig. 3, in position to co-operate with the amount pin plungers 140 carried by the pin case 46, Figs. 3, 9, 12, 14 and 15. This movement of the strip will also bring the clerk's perforations 37 and the department perforations 38 into position to co-operate with the clerk's pin plungers 141 and the departmental pin plungers 142 respectively. This feeding of the item record strip by the clamping plate 116 supported by the arms 81, will cause the pin 100, Fig. 9, to contact with the end of a slot 101, formed in the lower end of the link 102 and move said link downwardly, which link being fastened at its upper end to the arm 103 of the frame 104, will rock said frame in an anti-clockwise direction about its pivotal point 105, and thereby carry the upper feed roller 8, which is supported by arms 106, out of engagement with the feed roller 7, in which position the said roller will be latched by the shoulder 108 engaging with the end of the arm 107 projecting downwardly from the frame 104. This disabling of the feed rollers 7 and 8 will prevent the feeding of the strip 9 by said rollers, while the strip is being fed by the clamping plate 116, supported by the arms 81. From the shape of the cam groove 98, Fig. 16, it will be seen that the arms 81 are momentarily held in their advanced position and consequently the feed of the strip 9 is temporarily arrested. During this lull in the feeding of the item record strip the pin casing is lowered by cam groove 160, Fig. 17, rocking the arm 158 in an anti-clockwise direction, this arm being connected by a link 157 to an extension 156 of one of two arms 155, which arms are fast upon rock shafts 148, Figs. 9, 11 and 12. Each of these rock shafts are provided with two arms 147 secured thereto, the free ends of said arms being bifurcated so as to straddle pins 145 projecting from the pin case 46. As the arm 158 is rocked by the cam groove 160, Fig. 17, the shafts 148 will also be rocked and the pin case thus lowered. The lowering of the pin case will cause the plunger pins carried thereby, co-operating with the perforations in that portion of the strip in operative relation therewith, to pass through said perforations, while the remainder of the pin plungers will be held in their elevated positions. Immediately after the lowering of the pin case 46 the slides 161 will be drawn rearwardly, until arrested by the plungers that have passed through the perforations in the item record strip. This rearward movement of the slides 161 is caused by springs 167, which are connected to levers 164, Figs. 3, 6, and 14, the said levers being connected by rods 163 to the slides 161, 161ª and 161ᵇ. Simultaneously with the adjustment of the slides 161, plates 186, Figs. 3, 6 and 25, will be elevated until the upper edges thereof contact with off-sets 188 of the levers 164, by which elevation the graduated stop plates 183 will be differentially adjusted through the link connections 185 with said plates. The elevation of the plates 186 is caused by the rod 187 supported by arms 189 secured to the shaft 174. This rod is given a constant movement by cam groove 192 formed in the disk 193, Fig. 25, in which groove projects the roller 191 extending from the arm 190 secured to the shaft 174. While this rod 187 is given a constant movement at each operation, a variable movement is imparted to the plates 186 and thereby to the graduated stop plates 183, due to the fact that the distance between the cross rod 187 and the fulcrum point of the plates 186 varies in accordance with the throw of the levers 164.

After the various amounts are entered upon the item record strip 9, perforations 39 representing the different classes of transactions are also entered thereon, so that when the strip is fed through the auditing machine, the transaction plunger 59 will co-operate with the set of perforations 39 with which it is in alignment, and thereby control the connection of the operating shaft 3 to the driving mechanism, upon the operation of which shaft the slides 161 will receive their greatest throw owing to the fact that there are no amount perforations in the strip through which the plungers 140 can pass. This movement of the slides 161 will cause the graduated stop plates to be adjusted into the position shown in Fig. 6, in which position of the graduated stop plates the actuating racks 206 are held elevated.

Upon running the strip through the auditing machine a second time to obtain the totals of a different class of transactions, or upon running a new strip through the machine, the first cycle of operation of the machine will cause the operation of the restoring mechanism for the rack bars, but the graduated stop plates 183 being in the position shown in Fig. 6 the rack bars 206 will not be permitted to drop. After the restoring bar 212 engages the horizontal arms 211 of bell cranks 209 secured to the rack bars 206, and thereby holds the latter elevated, which occurs at about 200 degrees of the first cycle, Fig. 41, the graduated stop plates 183 will be adjusted and held in their adjusted position until the amount represented by the adjustment of said plates is entered upon the selected accumulator at the next cycle of operation.

The restoring frame for the rack bars, comprising the roller 212 and the side arms 213, is oscillated by the mechanism shown in Fig. 26, this mechanism comprising a disk 221, having therein a cam groove 220 in which plays a roller 219 projecting from one arm of a bell crank 217, the other arm of said bell crank being connected by link 216 to an arm 215 secured to the shaft 214, to which shaft are fastened the side arms 213 of the restoring frame.

The slide 161ª, Fig. 11, co-operating with the units row of the clerk's pin plungers 141, is connected to one of the stop plates 183 similar to that above described in connection with the slides co-operating with the amount plungers 140, while the slide co-operating with the tens row of the clerk's pin plungers 141 is connected to a plate 202, Fig. 6, which plate has no graduated portion. Co-operating with the graduated plate 183 controlled by the units clerk's slide, is a spring operated finger 242, Fig. 21, which is carried by the plate 241 secured to the selecting frame 240, which frame is guided in its vertical movement by pins 245, projecting from arms 246 through elongated slots 244 formed in plates 243 secured to the frame 240, Figs. 4 and 6. This selecting plate 240 has a series of flanges 268, Fig. 3, so set apart that one of said flanges, no matter in what position the frame 240 is adjusted, will be in position to contact with one of a series of pins 269, slidingly mounted in bosses 270 of the frame 225 carrying the clerk's accumulators, which pins engage with off-sets 271 of the clerk's accumulators 229.

The frame 240 selects the row of clerk's accumulators that is to be rocked to bring one of the accumulators of that particular row into engagement with the actuating racks, while the plate 202 is connected to mechanism for determining which one of the clerk's accumulators of a selected row is to be brought into engagement with the racks.

The link 185, Fig. 6, connecting the plates 186 and 202 has extending upwardly therefrom a rod, which at its upper end is connected to the block 282 (Fig. 18), slidingly mounted upon the plate 283 supported by the frame composed of the cross rod 284 and side arms 285, which frame is slidingly mounted upon shafts 2388 and 286, Figs. 4 and 7. This block 282 is moved to three positions under the control of the clerk's determining means co-operating with the tens row of the clerk's pin plungers, in the lower position of which the lug 281 projecting from said block rests below levers 276 and 277, Fig. 18, while in its two upper positions, the lug 281 enters the recesses 280 of the levers 276 and 277 respectively. These levers at their rearward ends are bifurcated as at 275, and straddle a stud 274, projecting upwardly from a plate 273 attached to the clerk's accumulator frame 225. These levers 276 and 277 are fulcrumed at 278 and 279 respectively, and when the lug 281 is in either of the notches 280 formed in the forward ends of said levers, and the block 282 carrying the lug is shifted laterally, a differential movement will be imparted to the accumulator frame 225, owing to the different fulcra of said levers. The frame carrying the block 285, is shifted laterally by roller 291, Fig. 7, projecting from an arm 292 secured to the rock shaft 286, which roller plays in a cam slot 290, of the plate 289 projecting downwardly from the cross rod 284 of the shifting frame. The shaft 286 is rocked by a disk 298, Fig. 27, secured to the shaft 178 in which disk is formed a cam groove 297. A roller 296 projecting from the bell crank 295 extends into the cam groove, and the other arm of bell crank is connected by a link 294 to an arm 293 loosely mounted upon the shaft 286, Fig. 3. Projecting into a recess 347, Fig. 29, formed in the arm 293 is a pin 346 carried by an arm 349 secured to the rock shaft 286.

After the adjustment of the accumulator frame 225 to bring the proper vertical series of the accumulators into position to be engaged by the actuators and the positioning of the selecting frame 240, the latter frame is rocked to carry one of the selected vertical series of accumulators into engagement with the actuators, by the rocking of shafts 238 and 2388, Figs. 4 and 6, which shafts carry the arms 246. These shafts have arms 265 and 266 respectively projecting forwardly therefrom which arms are connected by the link 267, Figs. 3, 4 and 6. The shaft 238 has secured thereto a forwardly extending arm 247, Fig. 19, from which projects the stud 248 that extends through the recess 249 in arm 250 loosely mounted upon a shaft 238. The forward end of the arm 250 normally rests in a recess 253 formed in the upper end of the link 251, which is connected at its lower end to an arm 257, Fig. 22, loosely mounted upon a shaft 259, and which is provided at its rearward end with a roller 260 that plays in a cam slot 261 of the cam disk 263, secured to the shaft 178. As this shaft 178 is rotated the link 251 will be elevated, and through the above connection rock the shafts 238 and 2388 so as to move the frame rearwardly, and thereby rock the selected accumulator into engagement with the actuating racks, after which the racks are restored to their normal position by the mechanism previously described.

These operations are continued during the time that the strip is being fed through the machine, it being understood that the entering of the amounts upon the accumulators takes place upon the cycle of operation succeeding the adjustment of the means for determining the amount to be entered. After the last amount upon the record strip has been entered in the proper accumulator by the actuating racks 206, the graduated stop plates 183 of the amount determining means are restored to their zero position as shown in Fig. 6, so as to prevent the falling of the rack bars, upon the first cycle of operation when a new strip is started through the machine or when the same strip is run through the machine for the purpose of separating by clerks and departments the sales of a different class of transactions.

The slide 161ᵇ co-operating with the department set of pin plungers 142 controls the adjustment of a graduated stop plate 183 in a manner similar to the adjustment of the graduated stop plate controlled by the slide co-operating with the units of clerk's plungers 141, which graduated stop plate controls the selection of the departmental accumulators in identically the same manner as the selecting frame 240 controls the selection of the clerk's accumulators, and therefore it is thought no further description of the manner of selecting the departmental accumulators need be given.

In order to permit the selecting mechanism to remain in its adjusted position while the rack bars are being restored to their normal position, the mechanism shown in Figs. 3 and 5, is provided. Each of the selecting frames 240 for the clerk's and the departmental accumulators has extending forwardly therefrom an arm 303, which is engaged at the beginning of a cycle of operation by a roller 304 projecting from the arm 305 secured to the rock shaft 286, and thereby restores the selecting frame immediately upon the beginning of a cycle of operation. After the restoration of said frame the arm 305 is rocked in an anti-clockwise direction, Fig. 5, and thereby permits the re-adjustment of the selecting frame 240, which occurs at the same time as the racks 206 are being lowered. This shaft 286 is rocked by the mechanism shown in Figs. 3 and 27, which mechanism has previously been described.

In the total taking operation the timing of the operation of the accumulator selecting and engaging mechanism is changed, so that the selected accumulator is engaged with the actuators during the downward movement of said actuators, which causes the acumulator elements to be reversely rotated. When these elements reach their zero position they are arrested, and thereby determine the movement of the actuating racks. These racks control the positioning of the type carriers, from which an impression is taken upon the strip for listing the totals. A number of functions performed in the total taking operation are timed to occur at the same period of the operation as they occur during the adding operation, and these functions in the description will be merely stated at the time they occur without going into a detailed description of the mechanism performing these various functions.

In taking the totals of the clerk's section of the machine the total manipulative device 336 is adjusted to the central slot 501 of the plate 502, Figs. 7 and 10, and then rocked in an anti-clockwise direction, Fig. 3. This movement of the lever 336 will cause the rocking of the yoke frame 359, and through link 360 cause the rocking of arm 361 secured to the shaft 362, which shaft at its right hand end, Figs. 4 and 10, has secured thereto a frame composed of side arms 363 and a rod 364. As the shaft 362 is rocked as above described, the rod 364 will pass in the notches formed in the rearward edges of the rack bars 206 of the departmental section, and thereby prevent them from being lowered while the rack bars 206, co-operating with the accumulators of the clerk's section, are free to be lowered.

As the lever 336 is rocked while in the slot 501, the shaft 337 upon which said lever is mounted will also be rocked, and, through a pin 339, projecting from arm 338, secured to said shaft, the lever 541 will be rocked, Figs. 7 and 8, in an anti-clockwise direction by said pin playing in a cam slot 340 formed in the upper end of the lever 341. This lever 341 at its lower end is connected by a rod 342 to the arm 250, Figs. 8 and 19, and as said lever is rocked as just described, the arm 250 will be shifted upon the shaft 238 so that the forward end of said arm will pass into a recess in link 252, which recess is similar to the recess 253 formed in the upper end of the link 251. This link 252 at its lower end is connected to an arm 258, Fig. 8, which at its rearward end is provided with a roller similar to the roller 260 projecting from the arm 257, Fig. 22, which roller plays in a cam groove 262, formed in a disk 264. The shape of this groove 262 is such that upon the very beginning of rotation of the shaft 178, which occurs at the beginning of the cycle of operation, the link 252 will be elevated and thereby rock the shaft 238, which shaft, as previously described, is connected to the shaft 2388. The rocking of these shafts will cause the accumulator frame 240 to rock the accumulator which has been selected upon the previous cycle of operation into engagement with the actuating racks 206. Immediately after the engagement of the selected accumulator with the racks, the latter will be permitted to be lowered until the enlarged teeth 311 of the selected accumulator encounter stops 397.

Previous to the lowering of the rack bars, locking frame 389, Fig. 4, will be rocked out of the notches 388 formed in the determining plates 385 for the type carriers 382 by link 392, which is connected at its lower end, Fig. 24, to arm 393, which arm is provided with a roller that plays in a cam slot 395 formed in a disk 396 secured to the shaft 178. As the racks are lowered, the determining plates 385 will be rocked about the supporting shaft 383 against the tension of springs 427, after which the plates will be locked in their adjusted positions by the frame 389, which permits the restoration of the rack bars independently of said plates. After the plates 385 are locked, a restoring frame comprising arms 398 and a cross bar 399 is rocked in an anti-clockwise direction by cam groove 400, Fig. 24, formed in a disk 401, into which groove plays a roller 402 extending from an arm 403, which arm is connected to a restoring frame by a link 404. As this restoring frame is rocked in a clockwise direction, the type levers being arrested in their movement by lugs 405 contacting with the lower edges of the previously adjusted determining plates 385, it being understood that the pawls 435, Fig. 4, prevent movement of those type carriers that are not to be used in the listing of the totals. During the adding operation these type carriers 382 are prevented from moving by a yoke shaped frame 379, the cross bar of which extends under rearward projections 381 of said type carriers. This frame 379 is connected by link 378 to an arm 377 secured to the rock shaft 224, which in turn is connected by link 375 to an arm secured to the rock shaft 337 carrying the total lever 336, Fig. 3. From this it will be seen that as the shaft 337 is rocked by the movement of the total manipulative device, the shaft 224 will also be rocked and, through the link connection 378, will withdraw the cross bar of the frame 379 from beneath the extensions 381 of the type carriers 382, thereby permitting said type carriers to be adjusted in accordance with the positioning of the plates 385. This withdrawal of the frame 379 from the type carriers, causes connection of the link 407 to pin 412, projecting from one of the arms 398 of the restoring frame of the type carriers, as shown in Fig. 4 and as said restoring frame is rocked in a clockwise direction, the link 407 will be moved rearwardly. At the end of the clockwise movement of this restoring frame, a cross rod 408 of a frame connected to the forward end of the link 407 will trip latches 409 for the type hammers 410, and permit them to spring forward and record the total upon the strip 426. As the restoring frame for the type carriers is returned to normal position, the link 407 will move forwardly, and, through the cross rod 408 engaging with the extensions 415 of the type hammers, will cause said hammers to be restored to their normal positions, where they are latched by the pawls 409.

The adjustment of the differentially movable slides 161, 161ª and 161ᵇ and the graduated stop plates 183, which form part of the determining means, occurs in the total taking operation at the same time that it occurs in the adding operation, and as this determining means is positioned during the first cycle of operation, and as the selected accumulator is engaged at the beginning of the second cycle, it becomes necessary to adjust the selecting mechanism at the end of the first cycle of operation during the total taking operation, whereas in the adding operation, the selecting mechanism is adjusted at the beginning of the second cycle, owing to the fact that the accumulator is not engaged during the adding operation until the racks have been lowered.

The rocking of the lever 341, Figs. 7 and 8, in an anti-clockwise direction by the manipulation of the total lever 336, causes lever 345, Figs. 3 and 29, carried by the arm 350, to be rocked so that the plunger 346 connected to the rear end of said lever by a pin 348, is withdrawn from the recess 347 formed in the arm 293 and projected into a recess of an arm 351, which recess is similar to the recess 347 formed in the arm 293. This arm 351 is loosely mounted upon a shaft 286, but when said pin 346 is projected into said arm any movement thereof will be imparted to the shaft 286 through the arm 350 secured to said shaft. The arm 351 is connected by the link 352 to a bell crank 353, Fig. 26, which bell crank is provided with a roller 354 that plays in a cam groove 355 formed in the disk 356. From the shape of the cam groove it will be seen that the bell crank 353 and consequently the shaft 286 are not rocked until the last half of the rotation of the disk 356, which causes the frame carrying the clerk's accumulators to be shifted, and also permits the adjustment of the selecting frame 240.

When the total manipulative device is shifted so as to bring it into position to cooperate with the departmental slot 503 formed in the plate 502, Figs. 7 and 10, and then rocked in an anti-clockwise direction, the yoke shaped frame 368 will be rocked, and, through the link 369, rock an arm 370, which is secured to sleeve 371 loosely mounted upon the shaft 362. The rocking of this sleeve will cause the cross rod 373 supported by arms 372 secured to the sleeve 371, to enter notches in the actuating rack bars 206 of the clerk's section, which notches are similar to the notches 365 formed in the departmental rack bars shown in Fig. 4, and thereby hold said rack bars in their elevated position while the departmental rack bars may be adjusted under the control of the departmental accumulators. These rack bars of the departmental section control the position of the type carriers 382 in the same manner as that described in connection with the clerk's section.

The rocking of the shaft 224 by the manipulation of the total lever 336 when the latter is in either the clerk's notch 501 of the plate 502, Figs. 7 and 10, or the departmental notch 503, will cause the arms 223, Figs. 4 and 10, to be withdrawn from engagement with the pins 222 projecting from transfer bars 206 of the accumulators, and also from engagement with the pins projecting from the two numbering rack bars of the clerk's section and the numbering rack bar of the departmental section, so that said rack bars may be lowered under the control of the pinions brought into engagement therewith, it being understood that the pinions co-operating with the numbering rack bars are never altered after being properly positioned upon their respective supporting shafts 231. That is, while they are permitted to rotate reversely as their respective rack bars are lowered distances depending upon the location of the enlarged teeth 311 of said numbering pinions away from the stop shoulders 397, yet, when the selected accumulator is disengaged from the racks, the numbering pinions are returned to their normal positions by the coil springs 453, shown in Fig. 40.

It is to be understood that when the total manipulative device 336 is adjusted to the clerk's slot 501 in the plate 502, Figs. 7 and 10, the clerk's total strip 334, Fig. 33, is to be used for the purpose of recording the totals of the various clerk's accumulators. It will be noticed by reference to the last mentioned figure that the highest amounts are perforated in every amount field of the strip. This is done for the purpose of controlling the adjustment of the amount stop plates 183 so as to bring the lowest step of the graduations of said plates into vertical alignment with the offsets 208 of the rack bars 206 and thereby permit said rack bars to have their greatest movements if necessary. The clerk's perforations 37 of the clerk's total strip control the adjustment of the mechanism for selecting the various clerk's accumulators in identically the same way as the selection of the clerk's accumulators is controlled by the perforations 37 of the item strip 9. The departmental strip 335, shown in Fig. 35, also has the highest amount perforated in the various amount fields on the strip for the same purpose as the perforations carried in the clerk's total strip. With this departmental strip in use, the totals from the various departmental accumulators only are listed, and therefore the single row of departmental perforations is needed for controlling this selection of the various departmental accumulators. The transaction perforations 39 shown upon the strips 334 and 335 are used merely for the purpose of controlling the connection of the main operating mechanism with the driving mechanism. These total strips need to have no more fields of perforations for controlling the selection of the various accumulators than there are accumulators in the machine, that is, the clerk's strip need have only thirty fields of perforations, one for each accumulator in the clerk's section, while the departmental strip need have only ten fields of perforations, one for each accumulator in the departmental section.

While the enlarged teeth of the accumulator pinions 230, in the total printing operation, control the differential adjustments of the actuating rack bars 206, which in turn control the adjustment of the type carriers 382 for the purpose of listing the totals, these teeth in the adding operation are used for the purpose of tripping the arms 312 upon which the stop shoulders 397 are located, so as to adjust the links 322 in such positions that they will rock the bell cranks 209 when the transfer slides are moved forwardly. This rocking of the bell cranks takes place after the rack bars are restored to their normal position, which rocking imparts an additional movement to said rack bars to effect the transfer. The transfer operation is fully described under the heading of the transfer mechanism in the description of the adding operation and is fully shown in Figs. 4 and 6.

While the form of mechanism herein shown and described is admirably adapted to fulfill the objects primarily stated it is to be understood that it is not intended to confine the invention to the one form of embodiment herein shown and described as it is susceptible of embodiment in various forms all coming within the scope of the claims which follow.

What is claimed is:—

1. In a machine of the class described, the combination with a plurality of accumulators, of a set of differentially movable actuators common thereto, a frame carrying said accumulators, and record controlled means for moving said frame to bring any one of said accumulators into cooperative relation with the actuators.

2. In a machine of the class described, the combination with a plurality of accumulators, of a set of differentially movable actuators common thereto, a frame carrying said accumulators, a selecting device and record controlled means for moving the frame and operating the selecting device for the purpose of establishing operative relation between one of the accumulators and the actuators.

3. In a machine of the class described, the combination with a movable frame of a plurality of accumulators pivotally mounted therein, a set of differentially movable actuators common to said accumulators, and record controlled means for moving the frame and for rocking one of the accumulators mounted therein into engagement with the actuators.

4. In a machine of the class described, the combination with a plurality of accumulators, of a set of differentially movable actuators common thereto, a frame carrying said accumulators, a selecting device and record controlled means for moving the frame and selecting device at right angles for the purpose of establishing operative relation between one of the accumulators and the actuators.

5. In a machine of the class described, the combination with a plurality of accumulators, of a set of differentially movable actuators common thereto, a frame carrying said accumulators, a selecting device, and record controlled means for moving the frame horizontally and the selecting device vertically for the purpose of establishing operative relation between one of the accumulators and the actuators.

6. In a machine of the class described, the combination with a plurality of groups of accumulators, of record controlled means for selecting an accumulator of each group and for actuating the selected accumulators.

7. In a machine of the class described, the combination with two groups of accumulators, one for clerks and the other for departments, of record controlled means for selecting an accumulator of each group and for acuating the selected accumulators.

8. In a machine of the class described, the combination with a plurality of groups of accumulators, of a set of actuators common to each group, and record controlled means for establishing operative relation between any accumulator of each group and the cooperating sets of actuators.

9. In a machine of the class described, the combination with a plurality of groups of accumulators, of a set of actuators common to each group, a selecting device for each group for establishing operative relation between any one of the accumulators of each group and its respective set of actuators, and record controlled means for controlling operation of the selecting devices.

10. In a machine of the class described, the combination with a movable frame, of a group of accumulators mounted therein, a stationary frame, a second group of accumulators mounted therein, a set of actuators common to each group of accumulators, and record controlled means for moving the first mentioned frame to establish operative relation between any accumulator therein and the set of actuators common thereto and for establishing operative relation between any accumulator of the second group and the other set of actuators.

11. In a machine of the class described, the combination with a movable frame and a stationary frame of a group of accumulators pivotally mounted in each of said frames, a set of actuators and a selecting device common to each group of accumulators, and record controlled means for shifting the movable frame and operating the selecting device common to the accumulators carried by said frame for the purpose of establishing operative relation between any one of said accumulators and its set of cooperative actuators, and for operating the selecting device common to the accumulators carried by the stationary frame for establishing operative relation between any one of the latter accumulators and its set of actuators.

12. In a machine of the class described, the combination with three or more accumulators, of a set of actuators common thereto, and record controlled means for bodily shifting the accumulators laterally relative to the actuators for the purpose of establishing operative relation between the actuators and any one of the accumulators.

13. In a machine of the class described, the combination with three or more accumulators, of a set of actuators common thereto, and record controlled means for bodily shifting the accumulators laterally relative to the actuators for the purpose of establishing operative relation between the actuators and any one of the accumulators and for controlling the movement of said actuators.

14. In a machine of the class described, the combination with a plurality of accumulators arranged in a series of groups, of a set of actuators common to all of said accumulators, and record controlled means for imparting a relative movement between the accumulators and the actuators for the purpose of bringing a group of the accumulators and actuators into juxtaposition and for establishing operative relation between any accumulator of the selected group and the actuators.

15. In a machine of the class described, the combination with a plurality of accumulators arranged in a series of groups, of a set of actuators common to all of said accumulators, and record controlled means for bodily shifting the accumulators for the purpose of bringing a group of the accumulators and the actuators into juxtaposition and for establishing operative relation between any accumulator of the selected group and the actuators.

16. In a machine of the class described, the combination with a plurality of groups of accumulators, of a set of actuators for each group, means for establishing operative relation between any desired accumulator of each group and its respective set of actuators, graduated elements determining the movement of said actuators, and a record strip controlling the aforesaid establishing means and the graduated elements.

17. In a machine of the class described, the combination with a plurality of groups of accumulators, of a set of actuators for each group, means for moving any desired accumulator of each group into engagement with its respective set of actuators graduated elements determining the movement of said actuators, and a record strip controlling the aforesaid moving means and the graduated elements.

18. In a machine of the class described, the combination with a plurality of groups of accumulators, of a set of actuators for each group, means for establishing operative relation between any desired accumulator of each group and its respective set of actuators, graduated elements determining the movement of said actuators, a pin case controlling said elements, and a record strip controlling the aforesaid establishing means and the pin case.

19. In a machine of the class described, the combination with a plurality of groups of accumulators, of a set of actuators for each group, means for moving any desired accumulator of each group into engagement with its respective set of actuators, graduated elements determining the movement of said actuators, a pin case controlling said elements, and a record strip controlling the aforesaid moving means and the pin case.

20. In a machine of the class described, the combintion with a movable frame, of a plurality of accumulators mounted therein, a set of actuators common to said accumulators, and record controlled means for first shifting the frame to bring a desired accumulator into position to be engaged with the actuators and then moving the selected accumulator into engagement with said actuators.

21. In a machine of the class described, the combination with a movable frame, of a plurality of accumulators mounted therein, a set of actuators common to said accumulators, and record controlled means for differentially moving said frame for the purpose of bringing any desired accumulator into co-operative relation with the actuators.

22. In a machine of the class described, the combination with a movable frame, of a plurality of accumulators mounted therein, a set of actuators common to said accumulators, means for differentially moving said frame for the purpose of bringing any desired accumulators into position to be engaged with the actuators, a device movable at right angles to the direction of movement of the frame for moving the desired accumulator into engagement with the actuators, and a record strip controlling the aforesaid means for moving the frame and for moving the accumulator.

23. In a machine of the class described, the combination with a movable frame of a plurality of accumulators mounted therein, a set of actuators common to said accumulators, a perforated record strip, and pins cooperating with the perforations in said strip for controlling the selection of the accumulator to be actuated and for determining the extent of movement to be imparted to the selected accumulator by the actuators.

24. In a machine of the class described, the combination with a movable frame, of a plurality of accumulators mounted therein, a set of actuators common to said accumulators, a perforated record strip, pins cooperating with the perforations in said strip, and devices controlled by the pins for selecting the accumulator to be actuated and for determining the extent of movement to be imparted to the selected accumulator by the actuators.

25. In a machine of the class described, the combination with a plurality of accumulators, of actuating means therefor normally disengaged therefrom, a perforated record strip, pins cooperating with the perforations in said strip, and devices controlled by the pins for positively engaging the actuating means and any desired accumulator and for determining the extent of movement to be imparted to the engaged accumulator by said actuating means.

26. In a machine of the class described, the combination with a plurality of groups of accumulators, of a set of actuators common thereto, a perforated record strip, and means cooperative with the perforations in said strip for positively establishing operative relation between any one of said accumulators and the actuators and for determining the extent of movement imparted to the selected accumulator by the actuators.

27. In a machine of the class described, the combination with a plurality of groups of accumulators, of actuating means therefor normally disengaged therefrom, a perforated record strip, independent sets of pins cooperating with the perforations in said strip, means controlled by one set of said pins for determining the accumulator to be actuated, and means controlled by another set of said pins for determining the amount entered upon the selected accumulator.

28. In a machine of the class described, the combination with a plurality of groups of accumulators, of actuating means therefor, a perforated record strip, independent sets of pins cooperating with the perforations in said strip, means controlled by one set of said pins for determining the accumulator to be actuated, and graduated elements adjusted under the control of another set of pins for determining the amount entered upon the selected accumulator.

29. In a machine of the class described, the combination with a plurality of groups of accumulators, of a set of actuators common thereto, a perforated record strip, independent sets of pins cooperating with the perforations in said strip, means controlled by one set of said pins for establishing operative relation between the actuators and any desired accumulator, and means controlled by another set of said pins for determining the amount entered upon the accumulator in operative relation with the actuators.

30. In a machine of the class described, the combination with a plurality of groups of accumulators, of a set of actuators common thereto, a perforated record strip, independent sets of pins cooperating with the perforations in said strip, means controlled by one set of said pins for establishing operative relation between the actuators and any desired accumulators, and graduated elements adjusted under the control of another set of said pins for determining the amount to be entered upon the accumulator in operative relation with the actuators.

31. In a machine of the class described, the combination with a plurality of accumulators, of a set of actuators common thereto, a perforated record strip, independent sets of pins cooperating with the perforations in said strip, a differentially movable selecting device controlled by one set of said pins for establishing operative relation between the actuators and any desired accumulator, and graduated elements adjusted under the control of another set of said pins for determining the amount to be entered upon the selected accumulator by said actuators.

32. In a machine of the class described, the combination with a plurality of accumulators, of a set of actuators common thereto, a perforated record strip, independent sets of pins cooperating with the perforations in said strip, means controlled by one set of said pins for imparting a relative movement between the accumulators and the actuators for the purpose of establishing operative relation between any desired accumulator and said actuators, and graduated elements adjusted under the control of another set of said pins for determining the amount to be entered upon the accumulator in operative relation with the actuators.

33. In a machine of the class described, the combination with a plurality of accumulators, of a set of actuators common thereto, a perforated record strip, independent sets of pins cooperating with the perforations in said strip, means controlled by one set of said pins for bodily moving the accumulators for the purpose of bringing any desired accumulator into operative relation with the actuators, and graduated elements adjusted under the control of another set of said pins for determining the amount to be entered upon the accumulator in operative relation with the actuators.

34. In a machine of the class described, the combination with a movable frame, of a plurality of groups of accumulators pivotally mounted therein, a perforated record strip, independent sets of pins cooperating with the perforations in said strip, means controlled by one set of said pins for moving the frame to bring any one of said groups of accumulators in juxtaposition to the actuators, a differentially movable device controlled by another set of said pins for selecting and rocking into engagement with the actuators any one of the accumulators of the group in juxtaposition to said actuators, and graduated elements adjusted under the control of a third set of said pins for controlling the movement of the actuators.

35. In a machine of the class described, the combination with a plurality of groups of accumulators, of a set of actuators for each group of accumulators, a perforated record strip, and independent sets of pins cooperating with the perforations in said strip for controlling the establishment of operative relation between an accumulator of each group and its set of actuators.

36. In a machine of the class described, the combination with a plurality of groups of accumulators, of a set of actuators for each group of accumulators, a perforated record strip, and independent sets of pins cooperating with the perforations in said strip for controlling the establishment of operative relation between an accumulator of each group and its set of actuators and for controlling the movement of said actuators.

37. In a machine of the class described, the combination with a plurality of groups of accumulators, of a set of actuators for each group of accumulators, a perforated record strip, a plurality of sets of pins cooperating with the perforations in said strip, means controlled by certain sets of said pins for establishing operative relation between an accumulator of each group and its set of actuators, and means controlled by another set of said pins for determining the extent of movement of said actuators.

38. In a machine of the class described, the combination with a plurality of groups of accumulators, of a set of actuators for each group of accumulators, a perforated record strip, a plurality of sets of pins cooperating with the perforations in said strip, means controlled by certain sets of said pins for establishing operative relation between an accumulator of each group and its set of actuators, and graduated elements controlled by another set of said pins for determining the extent of movement of said actuators.

39. In a machine of the class described, the combination with a plurality of groups of accumulators, of a set of actuators for each group of accumulators, a perforated record strip, a plurality of sets of pins cooperating with the perforations in said strip, differentially movable devices controlled by certain sets of said pins for establishing operative relation between an accumulator of each group and its set of actuators, and graduated elements controlled by another set of said pins for determining the extent of movement of said actuators.

40. In a machine of the class described, the combination with a plurality of accumulators, of a set of actuators common thereto, a perforated record strip, a plurality of sets of pins cooperating with the perforations in said strip, differentially movable slides controlled by said pins, means for establishing operative relation between any one of the accumulators and the actuators, and graduated elements connected to said slides for controlling said establishing means and for determining the extent of movement of said actuators.

41. In a machine of the class described, the combination with a plurality of accumulators, of a set of actuators common thereto, a perforated record strip, a case having a plurality of sets of pins mounted therein, means for moving the case and projecting some of the pins through the perforations in the record strip, differentially movable slides controlled by said pins, and means connected to said slides for controlling the selection of any one of said accumulators to be actuated by the actuators and for determining the extent of movement of said actuators.

42. In a machine of the class described, the combination with a plurality of accumulators, of a set of actuators common thereto, a perforated record strip, a case having a plurality of sets of pins mounted therein, means for moving the case and projecting some of the pins through the perforations in the record strip, differentially movable slides controlled by said pins, and graduated elements connected to said slides for controlling the selection of the accumulator to be actuated and for determining the extent of movement of said actuators.

43. In a machine of the class described, the combination with a plurality of accumulators, of a set of actuating racks common thereto, a perforated record strip, a case having a plurality of sets of pins mounted therein, means for moving the case and projecting some of the pins through the perforations in the record strip, differentially movable slides controlled by said pins, graduated elements connected to said slides for controlling the selection of the accumulator to be actuated and for determining the extent of movement of said actuators from normal position, and means for restoring the actuators to normal position, thereby actuating the selected accumulator.

44. In a macine of the class described, the combination with an accumulator, of actuators therefor, a perforated record strip, a set of pins cooperating with the perforations in said strip, differentially movable slides controlled by said pins, and means connected with the slides and positioned independently of the actuators for controlling the movement of the actuators.

45. In a machine of the class described, the combination with an accumulator, of actuating racks therefor, a perforated record strip, a set of pins cooperating with the perforations in said strip, differentially movable slides controlled by said pins, and graduated elements connected with the slides for controlling the movement of the actuators.

46. In a machine of the class described, the combination with an accumulator, of actuating racks therefor, a perforated record strip, a case having a set of pins mounted therein, means for moving the case and projecting some of the pins through the perforations in the strips, differentially movable slides controlled by said pins, and means connected with the slides and positioned independently of the actuating racks for controlling the movement of the actuating racks.

47. In a machine of the class described, the combination with an accumulator, of actuating racks therefor, a perforated record strip, a case having a set of pins mounted therein, means for moving the case and projecting some of the pins through the perforations in said strip, differentially movable slides controlled by said pins, graduated elements connected to the slides for controlling the movement of the actuating racks from normal position, and means for restoring the racks to normal position and thereby actuating the accumulator.

48. In a machine of the class described, the combination with a plurality of accumulators, of a record strip having perforations therein representing the accumlators of various classes of transactions and the amount of each transaction; feeding means for the strip, and means controlled by the perforations in said strip for selecting any one of the accumulators and registering thereon an amount.

49. In a machine of the class described, the combination with a plurality of accumulators, of a set of actuators common thereto, a record strip having perforations therein, feeding means for the strip, and means controlled by the perforations therein for establishing operative relation between any one of the accumulators and the actuators and determining the extent of movement of said actuators.

50. In a machine of the class described, the combination with a plurality of accumulators, of a record strip having perforations therein representing; the various accumulators, different classes of transactions and the amount of each transaction; feeding means for the strip, and means controlling the entering upon the accumulators of one class of transactions only as the strip is fed through the machine.

51. In a machine of the class described, the combination with a plurality of accumulators, of a record strip having perforations therein representing; the various accumulators, the different classes of transactions and the amount of each transaction; feeding means for the strip, and an adjustable device controlling the entering upon the accumulators of the transactions of one class only as the strip is fed through the machine.

52. In a machine of the class described, the combination with a plurality of accumulators representing clerks and departments, of a record strip having perforations therein representing various classes of transactions and the amount of each transaction made by the several clerks of the different departments, feeding means for said strip, means controlled by the perforations in the strip for entering upon each clerk's accumulator and the accumulator of the department in which the clerk is operating the sales made by said clerk, and means controlling the entering of one class of transactions only as the strip is fed through the machine.

53. In a machine of the class described, the combination with a plurality of accumulators representing clerks and departments, of a record strip having perforations therein representing various classes of transactions and the amount of each transaction made by the several clerks of the different departments, feeding means for said strip, means controlled by the perforations in the strip for entering upon each clerk's accumulator and the accumulators of the department in which the clerk is operating the sales made by the said clerk, and an adjustable device arranged to cooperate with the transaction perforations of one class only as the strip is fed through the machine so as to accumulate the departmental and clerks' totals of that particularly class of transaction.

54. In a machine of the class described, the combination with a plurality of departmental accumulators, of a record strip having perforations therein representing various classes of transactions and the amount of each transaction made by the several clerks of the different departments, feeding means for said strip, means controlled by the perforations in the strip for entering upon the various accumulators the sales made in their respective departments, and means controlling the entering upon the various accumulators of the transactions of one class only as the strip is fed through the machine.

55. In a machine of the class described, the combination with a plurality of departmental accumulators, of a record strip having perforations therein representing various classes of transactions and the amount of each transaction made by the several clerks of the different departments, feeding means for said strip, means controlled by the perforations in the strip for entering upon the various accumulators the sales made in their respective departments, and an adjustable device arranged to cooperate with the transaction perforations of any class as the strip is fed through the machine so as to accumulate the departmental totals of that particular class of transactions.

56. In machine of the class described, the combination with an accumulator, of actuating means therefor, normally inoperative, a record strip, feeding means therefor, and mechanism controlled by said strip for disabling the feeding means and enabling the actuating means for the accumulator.

57. In a machine of the class described, the combination with an accumulator, of actuating means therefor, normally inoperative a record strip, feeding means for said strip, driving mechanism for the feeding means, and means controlled by the record strip for disabling the feeding means and for establishing operative relation between the driving mechanism and the accumulator actuating means.

58. In a machine of the class described, the combination with an accumulator, of actuating means, therefor, operating mechanism for said actuating means, normally inoperative, a record strip, feeding means therefor, driving mechanism for the latter means, and devices controlled by the record strip for disabling the feeding means and for connecting the driving mechanism and the operating mechanism for the accumulator actuating means.

59. In a machine of the class described, the combination with an accumulator, of actuating means therefor, a record strip controlling said actuating means, feed devices for said strip, and means controlled by the strip for intermittently rendering said feed devices inoperative.

60. In a machine of the class described, the combination with an accumulator, of actuating means therefor, a record strip controlling said actuating means, feed rollers for said strip, and means controlled by the strip for intermittently separating said rollers for the purpose described.

61. In a machine of the class described, the combination with an accumulator, of actuating means therefor, a record strip controlling said actuating means, feed rollers for said strip, means controlled by the strip for intermittently separating said rollers, and devices for latching the rollers in their separated positions.

62. In a machine of the class described, the combination with an accumulator, of actuating means therefor, a record strip controlling said actuating means, feed devices for said strip, and means cooperating with perforations in said strip for intermittently rendering said feed devices inoperative.

63. In a machine of the class described, the combination with an accumulator, of actuating means therefor, a record strip controlling said actuating means, feed rollers for said strip, and means cooperating with perforations in said strip for intermittently separating said rollers for the purpose described.

64. In a machine of the class described, the combination with an accumulator, of actuating means therefor, a record strip controlling said actuating means, feed devices for said strip, and a spring operated plunger cooperating with perforations in said strip for intermittently rendering said feed devices inoperative.

65. In a machine of the class described, the combination with an accumulator, of actuating means therefor, a record strip controlling said actuating means, independent feeding means for said strip, and means controlled by the strip for disabling one of said feeding means and for enabling another of said feeding means.

66. In a machine of the class described, the combination with an accumulator, of actuating means therefor, a record strip controlling said actuating means, independent feeding means for said strip, a spring operated member controlled by said strip, and means controlled by the spring operated member for disabling one of the feeding means for the strip and for enabling the other of said feeding means.

67. In a machine of the class described, the combination with an accumulator, of acutating means therefor, a record strip controlling said actuating means two independent feeding means for said strip, driving mechanism common to both of said feeding means, and means controlled by the strip for disabling one of said feeding means and for enabling the other of said means.

68. In a machine of the class described, the combination with an accumulator, of actuating means therefor, a record strip controlling said actuating means two independent feeding means for said strip, driving mechanism common to both of said feeding means, and a spring operating member cooperating with perforations in the strip for controlling the disabling of one of the feeding means and enabling the other of said feeding means.

69. In a machine of the class described, the combination with an accumulator, of actuating means therefor, a record strip controlling said actuating means, feed rollers for said strip, a reciprocatory member for also feeding said strip, and means controlled by the strip for disabling one of the feeding mechanisms and enabling the other of said mechanisms.

70. In a machine of the class described, the combination with an accumulator, of actuating means therefor, a record strip controlling said actuating means, normally operating feed rollers for said strip, a normally inoperative reciprocatory member for also feeding said strip, and means controlled by the strip for disabling the feed rollers and enabling the reciprocatory member.

71. In a machine of the class described, the combination with an accumulator, of actuating means therefor, a record strip controlling said actuating means, normally operative feed rollers for said strip, a normally inoperative reciprocatory member for also feeding said strip, and a spring operated member cooperating with perforations in the strip for controlling the disabling of the feed rollers and the enabling of the reciprocatory member.

72. In a machine of the class described, the combination with a plurality of accumulators, of normally inoperative actuating means therefor, a record strip, feeding means therefor, and mechanism controlled by said strip for disabling the feeding means and for establishing operative relation between any one of said accumulators and the actuating means therefor.

73. In a machine of the class described, the combination with a plurality of accumulators, of a set of actuators common thereto, a record strip, feeding means therefor, and mechanism controlled by said strip for disabling the feeding means and for establishing operative relation between any one of said accumulators and the actuators.

74. In a machine of the class described, the combination with a plurality of accumulators, of actuating means therefor, a record strip, feeding means therefor, and mechanism controlled by said strip for disabling the feeding means and selecting the accumulator to be actuated and for determining the amount entered upon the selected accumulator by the actuating means.

75. In a machine of the class described, the combination with a plurality of accumulators, of actuating means therefor, a perforated record strip, feeding means therefor, and mechanism controlled by the perforations in said strip for disabling the feeding means and for establishing operative relation between any one of said accumulators and the actuating means.

76. In a machine of the class described, the combination with a plurality of accumulators, of actuating means therefor, a perforated record strip, feeding means therefor, and mechanism controlled by the perforations in said strip for disabling the feeding means and establishing operative relation between any desired accumulator and the actuating means, and for determining the amount to be entered upon the accumulator by the actuating means.

77. In a machine of the class described, the combination with a plurality of accumulators, of actuating means therefor, a perforated record strip, feeding means therefor, and mechanism controlled by the perforations in said strip for selecting one of the accumulators to be actuated and for temporarily disabling the feeding means whereby the selected accumulator may be operated by the actuating means to an extent determined also by the perforations in said strip.

78. In a machine of the class described, the combination with a plurality of accumulators, of actuating means therefor, a perforated record strip, means controlled by the perforations therein for selecting one of the accumulators to be actuated and for determining the extent of movement imparted to the selected accumulator by the actuating means, two independent feed devices for the strip, and means controlled by the strip for disabling one of the feed devices and enabling the other of said devices.

79. In a machine of the class described, the combination with a plurality of accumulators, of actuating means therefor, a perforated record strip, two independent feed devices for said strip, mechanism cooperating with certain perforations in the strip for controlling the selection of any desired accumulator and for determining the movement to be imparted to the selected accumulator by the actuating means and means cooperating with other perforations in said strip for controlling the disabling of one of the feed devices and the enabling of the other of said devices whereby the strip is positioned to have the above mentioned mechanism cooperate with its perforations.

80. In a machine of the class described, the combination with a plurality of accumulators, of actuating means therefor, a perforated record strip, a normally operative pair of feed rollers for said strip, a normally inoperative reciprocatory member for feeding said strip, mechanism cooperating with certain perforations in the strip for controlling the selection of any desired accumulator and for determining the movement to be imparted to the selected accumulator by the actuating means, and means cooperating with other perforations in said strip for controlling the disabling of the feed rollers and the enabling of the reciprocatory member whereby the strip is positioned to have the above mentioned mechanism cooperate with its perforations.

81. In a machine of the class described, the combination with a plurality of independent means each capable of accumulating the total of a series of items, and record controlled means for clearing any one of said accumulating means.

82. In a machine of the class described, the combination with a plurality of independent means each capable of accumulating the total of a series of items, of a perforated record strip, and means controlled by the perforations therein for clearing any one of said accumulating means.

83. In a machine of the class described, the combination with a plurality of accumulators, of a set of reciprocatory and differentially movable actuators therefor, normally disengaged therefrom, and record controlled means for so timing the engagement of any one of said accumulators and the actuators as to clear the accumulator by reversely rotating it by the actuators.

84. In a machine of the class described, the combination with an accumulator, of a set of reciprocatory and differentially movable actuators therefor, means for establishing operative relation between the accumulator and actuators for the purpose of entering items upon said accumulator, and record controlled means for establishing operative relation between the accumulator and actuators at a different time then when items are entered upon the accumulator, for the purpose of clearing the accumulator.

85. In a machine of the class described, the combination with an accumulator and means for entering items thereon, of a normally inoperative mechanism for recording the total amount accumulated, a manipulative device for placing said mechanism in operative condition, and record controlled means governing the operation of the recording mechanism.

86. In a machine of the class described, the combination with an accumulator, of actuators for entering items thereon by moving the accumulator in one direction and for clearing said accumulator by moving it in the opposite direction, a normally inoperative mechanism for recording the amount cleared from the accumulator, a manipulative device for placing said mechanism in operative condition and record controlled means governing the operation of the recording mechanism.

87. In a machine of the class described, the combination with a plurality of accumulators, of actuators for entering items thereon by moving the accumulators in one direction and for clearing said accumulators by moving them in the opposite direction, a set of type carriers controlled by the actuators for recording the amount cleared from an accumulator, and record controlled means governing the operation of the actuators in both item entering and total taking operations.

88. In a machine of the class described, the combination with an accumulator, of actuators for entering items thereon by moving the accumulator in one direction and for clearing said accumulator by moving it in the opposite direction, a set of normally inoperative type carriers controlled by the actuators for recording the amount cleared from the accumulator, a manipulative device for rendering said type carriers operative, and record controlled means governing the operation of the actuators.

89. In a machine of the class described, the combination with a plurality of accumulators and actuating means therefor, of record controlled means for recording the total accumulated on any desired accumulator.

90. In a machine of the class described, the combination with a plurality of accumulators and actuating means therefor, of record controlled means for recording the total accumulated on any desired accumulator and for clearing the accumulator from which the total is recorded.

91. In a machine of the class described, the combination with a plurality of accumulators, of a set of actuators common thereto, mechanism controlled by the actuators for recording the total of any desired accumulator, and record controlled means for determining the accumulator from which the total is to be recorded.

92. In a machine of the class described, the combination with a plurality of accumulators, of a set of actuators common thereto, mechanism for recording the total of any desired accumulator, and record controlled means for determining the accumulator from which the total is to be recorded.

93. In a machine of the class described, the combination with a plurality of accumulators, of actuating means therefor, a strip, feeding means therefor, and mechanism controlled by the strip for recording the total of each one of said accumulators as the strip is fed through the machine.

94. In a machine of the class described, the combination with a plurality of accumulators, of actuating means therefor, a perforated strip, feeding means therefor, a recording mechanism, and mechanism cooperating with the perforations in the strip for controlling the listing by the recording mechanism of the total of each of the accumulators.

95. In a machine of the class described, the combination with a plurality of accumulators, of actuating means therefor, a strip, feeding means therefor, a recording mechanism controlled by the strip for listing the totals of the accumulators and means cooperating with the strip for intermittently disabling the feeding means for the purpose of enabling the recording of each total.

96. In a machine of the class described, the combination with a plurality of accumulators, of actuating means therefor, mechanism for recording the total of each of said accumulators, a strip, feeding means therefor, and mechanism controlled by the strip as it is fed through the machine for selecting the various accumulators to have their totals recorded.

97. In a machine of the class described, the combination with the plurality of accumulators, of actuating means therefor, mechanism for recording the total of each of said accumulators, a perforated strip, feeding means therefor, and mechanism cooperating with the perforations in the strip as it is fed through the machine for selecting the various accumulators for the purpose of having their totals recorded.

98. In a machine of the class described, the combination with a plurality of accumulators, of actuating means therefor, record controlled means for selecting the various accumulators to be actuated, mechanism for recording the total of each of said accumulators, and a strip for controlling the selection of the various accumulators in the recording of their totals.

99. In a machine of the class described, the combination with an accumulator, of differentially movable actuating racks therefor, graduated members controlling the movement of the racks from normal position differentially adjustable devices controlling the graduated members, means for establishing operative relation between the accumulator and the racks after the latter have been adjusted, and means for restoring the racks to normal position while in operative relation with the accumulator.

100. In a machine of the class described, the combination wtih an accumulator, of differentially movable actuating racks therefor, graduated members controlling the movement of the racks from normal position, differentially adjustable devices controlling the graduated members, means for moving the accumulator into engagement with the racks after the latter have been adjusted, and means for restoring the racks to normal position while in engagement with the accumulator.

101. In a machine of the class described, the combination with an accumulator, of differentially movable actuating racks therefor, graduated members controlling the movement of the racks from normal position, springs, slides moved differentially by the springs for controlling the graduated members, means for moving the accumulator into engagement with the racks after the latter have been adjusted, and means for restoring the racks to normal position while in engagement with the accumulator.

102. In a machine of the class described, the combination with an accumulator, of actuating means therefor, a normally inoperative recording mechanism for recording totals, and totalizing mechanism controlled by the actuating means for automatically rendering the recording mechanism operative.

103. In a machine of the class described, the combination with an accumulator, of actuating means therefor, type carriers, normally inoperative, controlled by said actuating means, and totalizing mechanism for automatically rendering the type carriers operative.

104. In a machine of the class described, the combination with an accumulator, of actuators for rotating said accumulator in one direction in the entering of items thereon and for rotating it in another direction in the recording of a total, a recording mechanism, normally inoperative in the entering of items on the accumulator, and totalizing mechanism for automatically rendering the recording mechanism operative.

105. In a machine of the class described, the combination with a plurality of accumulators, of actuating means therefor, a normally inoperative recording mechanism, and totalizing mechanism for automatically rendering the recording mechanism operative for the purpose of listing the total of any of the accumulators.

106. In a machine of the class described, the combination with a plurality of accumulators, of a set of differentially movable actuators common thereto and graduated members controlling the movement of the actuators and the selection of the accumulator to be actuated.

107. In a machine of the class described, the combination with a plurality of accumulators, of a set of differentially movable actuators common thereto, graduated members controlling the movement of the actuators and the selection of the accumulator to be actuated, means for establishing operative relation between the selected accumulator and the actuators after the latter have been adjusted under the control of the graduated members, and means for restoring the actuators to normal position while they are in operative relation with the selected accumulator.

108. In a machine of the class described, the combination with a plurality of accumulators, of a set of actuators common thereto, a differentially movable device for rocking any one of said accumulators into engagement with the actuators, a graduated member controlling said movable device, and a series of adjustable pins controlling said graduated member.

109. In a machine of the class described, the combination with a plurality of accumulators, of a set of actuators common thereto, a plurality of differentially fulcrumed levers for imparting a variable relative movement between the accumulators and actuators for the purpose of establishing operative relation between any one of the accumulators and the actuators, and means for selecting and operating any desired lever.

110. In a machine of the class described, the combination with a plurality of accumulators, of a set of actuators common thereto, a plurality of levers for variably shifting the accumulators bodily to bring any desired one into operative relation with the actuators, and means for selecting and operating any desired lever.

111. In a machine of the class described, the combination with an accumulator, of actuating means therefor, means for determining the extent of movement imparted to the accumulator by the actuating means, and an operating mechanism for controlling the determining means and the actuating means upon different cycles of operation of said mechanism.

112. In a machine of the class described, the combination with an accumulator, of actuating means therefor, means for determining the extent of movement imparted to the accumulator by the actuating means, and an operating mechanism for positioning the determining means upon one cycle of operation thereof so as to control the actuation of the accumulator by the actuating means upon a subsequent cycle of operation of said mechanism.

113. In a machine of the class described, the combination with an accumulator, of actuating means therefor, means for determining the extent of movement imparted to the accumulator by the actuating means, and an operating mechanism for controlling the actuation of the accumulator by the actuating means during which cycle of operation the determining means is positioned for controlling the subsequent actuation of the accumulator by the actuating means.

114. In a machine of the class described, the combination with an accumulator of actuating means therefor, means for determining the extent of movement imparted to the accumulator by the actuating means, and an operating mechanism for positioning the determining means upon one cycle of operation thereof and upon a succeeding cycle for controlling the actuation of the accumulator by the actuating means in accordance with the previous position of the determining means and for again positioning the determining means for controlling the subsequent actuation of the accumulator.

115. In a machine of the class described, the combination with a plurality of accumulators, of actuating means common thereto, selecting mechanism for establishing operative relation between any of the accumulators and the actuating means, amount determining means controlling the extent of movement of the actuating means, and an operating mechanism for controlling the positioning of the determining means upon one cycle of operation thereof and upon the succeeding cycle of operation actuating the selecting mechanism and the actuating means.

116. In a machine of the class described, the combination with a plurality of accumulators, of actuating means therefor, selecting mechanism for establishing operative relation between any of the accumulators and the actuating means, amount determining means controlling the extent of movement imparted to the selected accumulator by the actuating means, an operating mechanism for controlling the positioning of the determining means upon one cycle of operation and upon the succeeding cycle of operation actuating the selecting mechanism and the actuating means, and a record strip controlling the operating mechanism.

117. In a machine of the class described, the combination with an accumulator, of actuating means therefor, means determining the extent of movement imparted to the accumulator by the actuating means, an operating mechanism actuating the determining means and the actuating means upon different cycles of operation of said mechanism, and a record strip controlling the operating mechanism.

118. In a machine of the class described, the combination with an accumulator, of actuating means therefor, means determining the extent of movement imparted to the accumulator by the actuating means, an operating mechanism actuating the determining means and the actuating means upon different cycles of operation of said mechanism, and a record strip controlling the operating mechanism and the positioning of the determining means by the operating mechanism.

119. In a machine of the class described, the combination of a plurality of accumulators, of differentially movable actuators common thereto, means for establishing operative relation between any one of the accumulators and actuators, elements each having a series of graduated steps for determining the extent of movement of said actuators, and a record strip controlling the aforesaid establishing means and the graduated elements.

120. In a machine of the class described, the combination of the plurality of accumulators, of a set of differentially movable actuators, means for moving any one of the said accumulators into engagement with the actuators, graduated elements each having a series of graduations for determining the extent of movement of said actuators, and a record strip controlling the aforesaid moving means and the graduated elements.

121. In a machine of the class described, the combination with a movable frame, of a plurality of accumulators mounted therein, a set of actuators common to said accumulators, and independent record controlled means for first shifting the frame to bring a desired accumulator into position to be engaged with the actuators and then moving the selected accumulator into engagement with said actuators.

122. In a machine of the class described, the combination of a plurality of accumulators, of differentially movable actuators therefor normally disengaged therefrom, a perforated record strip, pins cooperating with the perforation in said strip, and devices controlled by the pins for engaging the actuators and any desired accumulator and for determining the extent of movement to be imparted to the actuators.

123. In a machine of the class described, the combination with a differentially movable frame, of a plurality of accumulators arranged in groups, pivoted frames one for each group of accumulators and carried by the differentially movable frame, a set of differentially movable actuators common to said accumulators, and record controlled means for differentially moving said differentially movable frame for bringing several accumulators into juxtaposition with the actuators, and for rocking but one of the pivoted frames to carry the desired accumulator mounted in the pivoted frame into engagement with the actuators.

124. In a machine of the class described, the combination with a plurality of accumulators, of a set of differentially movable actuators common thereto and graduated members each having a series of graduations controlling the movement of the actuators and the selection of the accumulator to be actuated.

125. In a machine of the class described, the combination with an operating mechanism of alternatively effective feeding means operated by the operating mechanism for feeding record material, one means when effective being constructed to feed the record 126. In a machine of the class described, the combination with the record strip having perforations, of two alternatively effective feeding means therefor one means when effective being constructed to feed the record strip variable distances, while the other means is constructed to feed the strip an invariable distance, and means controlled by the perforations in said record strip for controlling the variable distances the strip is fed.

127. In a machine of the class described, the combination of a plurality of groups of accumulators, of the set of actuators for each group for simultaneously entering items on an accumulator in each group and also for clearing any desired accumulator of any group, means for moving any desired accumulator of each group into engagement with its respective set of actuators, and means for locking all the actuators against movement in a clearing operation, except the set of actuators for the group of accumulators including the accumulator to be cleared.

128. In a machine of the class described, the combination with two accumulators, of a set of actuators for each accumulator for simultaneously entering items on the two accumulators and also for clearing their respective accumulators, and means for locking either set of actuators against movement only when the other set of actuators is clearing its accumulators.

129. In a machine of the class described, the combination with two accumulators, of a set of differentially movable actuators for each accumulator normally disengaged therefrom, means for engaging the accumulators and their actuators after the latter have been differentially adjusted, mechanism for then restoring the actuators to normal position for the purpose of entering the same items on the accumulators, means for engaging but one accumulator and its set of actuators previous to the adjustment of its set of actuators whereby the accumulator is cleared, and means for locking the set of actuators for the accumulator not cleared against movement during a clearing operation of the other accumulator.

130. In a machine of the class described, the combination of a plurality of groups of accumulators, of the set of actuators for each group for simultaneously entering items on an accumulator in each group and also for clearing any desired accumulator of any group, means for moving any desired accumulator of each group into engagement with its respective set of actuators, means for locking all the actuators against movement in a clearing operation, except the set of actuators for the group of accumulators including the accumulator to be cleared and mechanism for recording the amounts cleared from the accumulators.

131. In a machine of the class described, the combination with two accumulators, of a set of actuators for each accumulator for simultaneously entering items on the two accumulators and also for clearing their respective accumulators, means for locking either set of actuators against movement only when the other set of actuators is clearing its accumulators and mechanism for recording the amounts cleared from the accumulators.

132. In a machine of the class described, the combination with two accumulators, of a set of differentially movable actuators for each accumulator normally disengaged therefrom, means for engaging the accumulators and their actuators after the latter have been differentially adjusted, mechanism for then restoring the actuators to normal position for the purpose of entering the items on the accumulators, means for engaging but one accumulator and its set of actuators previous to the adjustment of its set of actuators whereby the accumulator is cleared, and means for locking the set of actuators for the accumulator not cleared against movement during a clearing operation of the other accumulator, and mechanism for recording the amounts cleared from the accumulators.

133. In a machine of the class described, the combination with two groups of accumulators, of a set of actuators for each group for simultaneously entering items on an accumulator in each group, and also for clearing any desired accumulator in either group, means for locking one set of actuators for a group of accumulators against movement when an accumulator in the other group is being cleared by its set of actuators, and record controlled means for selecting the accumulators to be actuated in an item entering operation and the accumulator to be cleared in a clearing operation.

134. In a machine of the class described, the combination of a plurality of groups of accumulators, of the set of actuators for each group for simultaneously entering items on an accumulator in each group and also for clearing any desired accumulator of any group, means for moving any desired accumulator of each group into engagement with its respective set of actuators, means for locking all the actuators against movement in a clearing operation, except the set of actuators for the group of accumulators including the accumulator to be cleared and record controlled means governing the operation of the actuators.

135. In a machine of the class described, the combination with two accumulators, of a set of actuators for each accumulator for simultaneously entering items on the two accumulators and also for clearing their respective accumulators, and means for locking either set of actuators against movement only when the other set of actuators is clearing its accumulator and record controlled means for governing the operation of the actuators.

136. In a machine of the class described, the combination with two accumulators, of a set of differentially movable actuators for each accumulator normally disengaged therefrom, means for engaging the accumulators and their actuators after the latter have been differentially adjusted, mechanism for then restoring the actuators to normal position for the purpose of entering the same items on the accumulators, means for engaging but one accumulator and its set of actuators previous to the adjustment of its set of actuators whereby the accumulator is cleared, means for locking the set of actuators for the accumulator not cleared against movement during a clearing operation of the other accumulator and record controlled means governing the operation of the actuators.

137. In a machine of the class described, the combination of a plurality of groups of accumulators, of the set of actuators for each group for simultaneously entering items on an accumulator in each group and also for clearing any desired accumulator of any group, means for moving any desired accumulator of each group into engagement with its respective set of actuators, means for locking all the actuators against movement in a clearing operation, except the set of actuators for the group of accumulators including the accumulator to be cleared, mechanism for recording the amounts cleared from the accumulators and record controlled means governing the operation of the actuators.

138. In a machine of the class described, the combination with two accumulators, of a set of actuators for each accumulator for simultaneously entering items on the two accumulators and also for clearing their respective accumulators, means for locking either set of actuators against movement only when the other set of actuators is clearing its accumulator, mechanism for recording the amounts cleared from the accumulators, and record controlled means for governing the operation of the actuators.

139. In a machine of the class described, the combination with two accumulators, of a set of differentially movable actuators for each accumulator normally disengaged therefrom, means for engaging the accumulators and their actuators after the latter have been differentially adjusted, mechanism for then restoring the actuators to normal position for the purpose of entering the items on the accumulators, means for engaging but one accumulator and its set of actuators previous to the adjustment of its set of actuators whereby the accumulator is cleared, and means for locking the set of actuators for the accumulator not cleared against movement during a clearing operation of the other accumulator, mechanism for recording the amounts cleared from the accumulators and record controlled means governing the operation of the actuators.

140. In a machine of the class described, the combination of a plurality of groups of accumulators, of a set of actuators for each group for simultaneously entering items on an accumulator in each group and also for clearing any desired accumulator of any group, means for moving any desired accumulator of each group into engagement with its respective set of actuators, means for locking all the actuators against movement in a clearing operation, except the set of actuators for the group of accumulators including the accumulator to be cleared and record controlled means for selecting the accumulator to be cleared.

141. In a machine of the class described, the combination of a plurality of groups of accumulators, of the set of actuators for each group for simultaneously entering items on an accumulator in each group and also for clearing any desired accumulator of any group, means for moving any desired accumulator of each group into engagement with its respective set of actuators, means for locking all the actuators against movement in a clearing operation, except the set of actuators for the group of accumulators including the accumulator to be cleared, a normally inoperative mechanism for recording the amount cleared from the accumulator and a manipulative device for placing said mechanism in operative condition.

142. In a machine of the class described, the combination with a plurality of groups of accumulators, of a set of actuators for each group of accumulators for entering items on an accumulator in each group, and also for clearing any desired accumulator of any group, common means for determining the extent of movement of the actuators in an item entering operation, means for moving any desired accumulator of each group to engage it with its respective sets of actuators, and means for locking all the actuators against movement in clearing operations except the set of actuators for the group of accumulators including the accumulator to be cleared.

143. In a machine of the class described, the combination with an accumulator, of racks for actuating the same, pivoted members on said racks having a normal position relative thereto, means for engaging said members to restore the racks to normal position, devices, one for each member and tripped by the accumulator, and means for operating the tripped devices to move the corresponding pivoted members relative to the racks and thereby move the racks an extra step for the purpose of effecting transfers.

144. In a machine of the class described, the combination with a plurality of accumulators, each comprising a plurality of accumulating elements, actuating racks common to the accumulators and having a normal position, members on said racks having a normal position relative thereto, means for engaging said members to move said racks to normal position, devices, one for each member, tripped by the accumulating elements as the latter pass positions requiring transfers, and means for operating the tripped devices to move the corresponding members relative to the racks and thereby move the racks an extra step of movement for the purpose of effecting transfers.

145. In a machine of the class described, the combination with a plurality of accumulators arranged in a series of groups, of a set of actuators common to all of said accumulators, record controlled means for bodily shifting the accumulators for the purpose of bringing a group of the accumulators and the actuators into juxtaposition and for establishing operative relation between any accumulator of the selected group and the actuators, and transfer devices common to all of said accumulators.

146. In a machine of the class described, the combination with a plurality of accumulators arranged in groups, of a set of actuators common to all of said accumulators, single transfer means common to all of said accumulators and means for imparting a relative movement between the accumulators and the actuators for the purpose of bringing a group of accumulators and actuators in juxtaposition, and for establishing operative relation between any accumulator of the selected group and actuators.

147. In a machine of the class described, the combination of the plurality of accumulators arranged in a series of groups, of the set of differentially movable actuators common to all of said accumulators and having a normal position, transfer means common to all the accumulators for preparing the actuators for an extra step of movement for the purpose of effecting required transfers, and means for imparting a relative movement between the accumulators and the actuators for the purpose of bringing a group of accumulators and actuators into juxtaposition and for establishing operative relation between any accumulator, of the selected group and actuators.

148. In a machine of the class described, the combination with a plurality of accumulators arranged in series, of a set of actuators common to all of said accumulators and having a normal position, transfer means common to all the accumulators for preparing the actuators for an extra step of movement when transfers are required, and record controlled means for imparting a relative movement between the accumulators and the actuators for the purpose of bringing a series of accumulators and actuators into juxtaposition and for establishing operative relation between any accumulator of the selected group and the actuators.

149. In a machine of the class described, the combination with an accumulator comprising a plurality of denominational elements, of actuating racks therefor, bell crank levers pivoted on said racks, operating means for retaining the bell cranks in a normal position relative to the racks and moving the racks, and members controlled by the denominational elements of the accumulator when transfers are required for preventing the bell crank levers from assuming their normal position so that the racks are moved an extra step by the operating means to effect transfers.

150. In a machine of the class described, the combination of a plurality of accumulators each comprising a plurality of denominational elements, of actuating racks common thereto, members one for each denominational element in each accumulator normally in juxtaposition with their corresponding denominational elements, a common rod connecting the members for the denominational elements of like denominations, transfer means common to all the accumulators, and projections on said denominational elements for effecting movement of their members and of the connecting rod to prepare said transfer means for effective operation.

151. In a machine of the class described, the combination with an accumulator comprising a plurality of denominational elements, of actuating racks therefor, bell crank levers pivoted on said racks, operating means for positively moving the racks and engaging said levers and thereby retaining the latter in a normal position relative to the racks, and members controlled by the denominational elements when transfers are required for preventing the bell crank levers from assuming their normal position so that the racks are positively moved an extra step by the operating means to effect transfers.

152. In a machine of the class described, the combination with a plurality of accumulators each comprising a plurality of denominational elements, actuating racks common thereto, record controlled means controlling the extent of movement of the actuators, members one for each denominational element in each accumulator normally in juxtaposition with their corresponding denominational elements, a common rod connecting the members for the denominational elements of like denominations, transfer means controlled by said rod and projections on said denominational elements for effecting movement of their members and the connecting rod to prepare said transfer means for effective operation.

153. In a machine of the class described, the combination with a plurality of accumulators each comprising a plurality of denominational elements, actuating racks common thereto, record controlled means for selecting the accumulator to be actuated, members one for each denominational element of each accumulator, common rods connecting the members for the denominational elements of like denominations, transfer means controlled by said rods, and projections on said denominational elements for effecting movement of their members and the connecting rods to prepare said transfer means for effecting operation.

154. In a machine of the class described, the combination with a plurality of accumulators each comprising a plurality of denominational elements, actuating racks common thereto, independent record controlled means for selecting the accumulator to be actuated, and for determining the extent of movement to be imparted to the selected accumulator by the actuators, members one for each denominational element in each accumulator, rods common to the denominational elements of like order connecting the members for these elements, transfer means controlled by said rods, and projections on said denominational elements for effecting movement of their members and connecting rods to prepare said transfer means for effective operation.

155. In a machine of the class described, the combination with an accumulator comprising a plurality of denominational elements, of actuating racks therefor, projections on said racks bell crank levers pivoted on said racks, operating means for moving said actuating racks and engaging said levers and thereby normally retaining the latter in engagement with the projections on said racks, pivoted members moved bodily by the denominational elements as the latter are moved past positions requiring transfers, and means for rocking the bodily moved pivoted members about their pivots to prevent the bell crank levers from assuming their normal position so that the racks are moved an extra step by the operating means to effect the required transfers.

156. In a machine of the class described, the combination with an accumulator comprising a plurality of denominational elements, of actuating racks therefor, projections on said racks bell crank levers pivoted on said racks, operating means for moving said actuating racks and engaging said levers and thereby normally retaining the latter in and thereby normally retaining the latter in engagement with projections on said racks, pivoted members moved bodily by the denominational elements as the latter are moved past positions requiring transfers, latching means for retaining the members in their bodily moved position, and means for rocking the bodily moved pivoted members about their pivots to prevent the bell crank levers from assuming their normal position so that the actuating racks will be moved an extra step of movement by the operating means to effect the required transfers.

157. In the machine of the class described, the combination with a main operating mechanism, of an accumulator comprising a plurality of denominational elements, actuating racks therefor, bell crank levers pivoted on said racks, a device actuated by the main operating mechanism for moving said racks and retaining the bell crank levers in normal position relative to the actuating racks, pivoted members moved bodily by the denominational elements as the latter are moved past positions requiring transfers, latching means for retaining the members in their bodily moved positions, means for rocking the bodily moved pivoted members about their pivots to prevent the bell crank levers from assuming their normal position so that the racks are moved an extra step by the operating mechanism, and means operated by the main operating mechanism for disabling said latching means.

158. In a machine of the class described, the combination with an accumulator comprising a plurality of denominational elements, of actuating racks therefor, record controlled means for governing the extent of movement of said actuating racks, bell crank levers pivoted on said racks, operating means for moving said actuating racks and normally retaining the bell crank levers in relative position to the racks, pivoted members moved bodily by the denominational elements as the latter are moved past positions requiring transfers, and means for rocking the bodily moved pivoted members about their pivots to prevent the bell crank levers from assuming their normal position relative to the racks so that the racks are moved an extra step by the operating means to effect the required transfers.

159. In a machine of the class described, the combination with a plurality of accumulators each comprising a plurality of denominational elements, of actuating racks common thereto, bell crank levers pivoted on said racks, operating means normally retaining the bell crank levers in a normal position relative to the racks and for moving the rack elements one for each denominational element of each accumulator operated by the denominational elements when the latter are moved to positions requiring transfers, pivoted members each of which is common to denominational elements of like order and adapted to be bodily moved by said element and means for rocking the bodily moved members about their pivots to prevent the bell crank levers from assuming their normal position relative to the racks so that the racks are moved an extra step of movement by the operating means to effect the required transfers.

160. In a machine of the class described, the combination with a main operating mechanism, of a plurality of accumulators, each comprising a plurality of denominational elements, of actuators common thereto, bell crank levers pivoted on said actuators, a device actuated by the operating mechanism for moving said actuating racks and engaging said bell crank levers and thereby normally retaining the latter in a normal position relative to the racks, arms one for each denominational element operated by the denominational elements when the latter are moved past positions requiring transfers, pivoted members each of which is common to the denominational elements of like order and connected to the corresponding arms and thereby moved bodily when one of the arms is moved, latching means for retaining the members in their bodily moved positions, means controlled by the operating mechanism for rocking the bodily moved members about their pivots to prevent the bell crank levers from assuming their normal position relative to the racks so that the racks are moved an extra step of movement by the operating device to effect the required transfers, and the second device operated by the main operating mechanism for disabling said latching means.

161. In a machine of the class described, the combination with a plurality of groups of accumulators, of a set of actuators for each group of accumulators, a perforated record strip, a plurality of sets of pins cooperating with the perforations in said strip, differentially movable devices controlled by certain sets of said pins for establishing operative relation between an accumulator of each group and its set of actuators, and elements one for each actuator and having a series of graduations, the elements being controlled by another set of said pins for determining the extent of movement of said actuators.

162. In a machine of the class described, the combination with a plurality of groups of accumulators, of a set of actuators for each group of accumulators, a perforated record strip, a plurality of sets of pins cooperating with the perforations in said strip, differentially movable devices controlled by certain sets of said pins for establishing operative relation between an accumulator of each group and its set of actuators, graduated elements controlled by another set of said pins for determining the extent of movement of said actuators, mechanism normally holding said differentially movable devices from movement, and means controlled by perforations in said strip for disabling said holding mechanism.

163. In a machine of the class described, the combination with a plurality of accumulators, of actuating means therefor normally disengaged therefrom, a perforated record strip, pins cooperating with the perforations in said strip, devices controlled by the pins for engaging the actuating means and any desired accumulator and for determining the extent of movement to be imparted to the engaged accumulator by said actuating means, means normally rendering said devices inoperative, and means controlled by perforation in said strip for disabling said holding means.

164. In a machine of the class described, the combination with a plurality of accumulators, of a set of differentially movable actuators common thereto, a record strip, means controlled thereby for selecting any one of said accumulators to be actuated by the actuators, means normally locking said selecting means against operation, and a device controlled by said record strip disabling said locking means.

165. In a machine of the class described, the combination with a plurality of accumulators, of a set of differentially movable actuators common thereto, independent record controlled means for selecting the accumulator to be actuated and for determining the extent of movement imparted to the selected accumulator by the actuators, mechanism normally rendering said record controlled means inoperative, and record controlled means for disabling said mechanism.

166. In a machine of the class described, the combination with a plurality of accumulators, of a set of differentially movable actuators common thereto, record controlled means for establishing operative relation between the actuators and any desired accumulator, mechanism normally rendering said establishing means inoperative, and record controlled means for disabling said mechanism.

167. In a machine of the class described, the combination with a plurality of accumulators, of a set of differentially movable actuators common thereto, record controlled means for establishing operative relation between the actuators and any desired accumulator and for determining the amount entered upon the latter by said actuators, mechanism normally rendering said record controlled means inoperative, and a record controlled device for disabling said mechanism.

168. In a machine of the class described, the combination with a plurality of accumulators, of a set of differentially movable actuators common thereto, a record controlled means for selecting the accumulator to be actuated and for rocking the selected accumulator into engagement with the actuators, mechanism normally rendering said record controlled means inoperative, and a record controlled device for disabling said mechanism.

169. In a machine of the class described, the combination with a plurality of accumulators, of a set of differentially movable actuators common thereto, a frame carrying said accumulators, a selecting device, record controlled means for moving the frame and operating the selecting device for the purpose of establishing operative relation between one of the accumulators and the actuators, mechanism normally rendering said record controlled means inoperative, and a record controlled device for disabling said mechanism.

170. In a machine of the class described, the combination with a movable frame, of a plurality of accumulators pivotally mounted therein, a set of differentially movable actuators common to said accumulators, record controlled means for moving the frame and for rocking one of the accumulators mounted therein into engagement with the actuators, mechanism normally rendering said record controlled means inoperative, and a record controlled device for disabling said mechanism.

171. In a machine of the class described, the combination with a plurality of groups of accumulators, of means for selecting an accumulator of each group and for actuating the selected accumulators, mechanism normally rendering said means inoperative, and record controlled means for disabling said mechanism.

172. In a machine of the class described, the combination with a plurality of groups of accumulators, of a set of actuators common to each group, a selecting device for each group for establishing operative relation between any one of the accumulators of each group and its respective set of actuators, means for controlling the operation of the selecting devices, mechanism normally rendering said means inoperative, and record controlled means for disabling said mechanism.

173. In a machine of the class described, the combination with a plurality of accumulators, of a set of actuators common thereto, record controlled means for imparting a relative movement between the accumulators, and the actuators for the purpose of establishing operative relation between the actuators and any one of the accumulators and for controlling the movement of said actuators, mechanism normally rendering said record controlled means inoperative, and a record controlled device for disabling said mechanism.

174. In a machine of the class described, the combination with a plurality of accumulators, of a set of actuators common thereto, independent record controlled means for moving any one of the accumulators into engagement with the actuators and for determining the extent of movement of the actuators, mechanism rendering said independent means inoperative, and a record controlled device for disabling said mechanism.

175. In a machine of the class described, the combination with a movable frame, of a plurality of accumulators mounted therein, a set of actuators common to said accumulators, a perforated record strip, means controlled by the perforations in said strip for selecting the accumulator to be actuated and for determining the extent of movement to be imparted thereto by said actuators, mechanism holding said means against movement, and a device controlled by said record strip for disabling said holding mechanism.

176. In a machine of the class described, the combination with means for accumulating items, of a perforated record strip, means controlled by the perforations therein for clearing said accumulating means, mechanism rendering said means inoperative, and a device controlled by said perforated record strip for disabling said mechanism.

177. In a machine of the class described, the combination with an accumulator, of actuators therefor, a perforated record strip, a set of pins cooperating with the perforations in said strip, differentially movable slides controlled by said pins, means connected with the slides for controlling the movement of the actuators, mechanism normally rendering said means inoperative, and a device controlled by said perforated record strip for disabling said mechanism.

178. In a machine of the class described, the combination with an accumulator, of actuating means therefor, normally inoperative, a record strip, feeding means therefor, mechanism controlled by said strip for disabling the feeding means and enabling the actuating means for the accumulator, and means for preventing the enabling of the actuating means when said strip is not in the machine.

179. In a machine of the class described, the combination with an accumulator, of actuating means therefor normally inoperative, a record strip, feeding means for said strip, driving mechanism for the feeding means, means controlled by the record strip for disabling the feeding means and for establishing operative relation between the driving mechanism and the accumulator actuating means, and means for preventing the enabling of the actuating means when said strip is not in the machine.

180. In a machine of the class described, the combination with an accumulator, of actuating means therefor, a record strip controlling said actuating means, independent feeding means for said strip, means controlled by the strip for disabling one of said feeding means and for enabling another of said feeding means, and means for preventing the enabling of one of said feeding means when said strip is not in the machine.

181. In a machine of the class described, the combination with an accumulator, of actuating means therefor, a record strip controlling said actuating means, two independent feeding means for said strip, driving mechanism common to both of said feeding means, means controlled by the strips for disabling one of said feeding means and for enabling the other of said means, and means for preventing the enabling of one of said feeding means when said strip is not in the machine.

182. In a machine of the class described, the combination with an accumulator, of actuating means therefor, a record strip controlling said actuating means, normally operative feed rollers for said strip, a normally inoperative reciprocatory member for also feeding said strip, means controlled by the strip for disabling the feed rollers and enabling the reciprocatory member, and means for preventing said strip controlled means from enabling the reciprocatory member when the strip is not in the machine.

183. In a machine of the class described, the combination with a plurality of accumulators, of a set of actuators common thereto, a record strip, feeding means therefor, mechanism controlled by said strip for disabling the feeding means and for establishing operative relation between any one of said accumulators and the actuators, and means for disabling said mechanism when the strip is not in the machine.

184. In a machine of the class described, the combination with a plurality of accumulators, of actuating means therefor, and record controlled means for recording the total accumulated on any desired accumulator, and as an incident thereto record special characters to identify the accumulators from which the totals are recorded.

185. In a machine of the class described, the combination with a plurality of accumulators, of actuating means therefor, and record controlled means for recording the total accumulated on any desired accumulator and for clearing the accumulator from which the total is recorded and also recording special characters for identifying the accumulators cleared.

186. In a machine of the class described, the combination with a plurality of accumulators, of a set of actuators common thereto, mechanism controlled by the actuators for recording the total on any desired accumulator, and also special characters to identify the accumulator from which the totals are recorded, and record controlled means for determining the accumulator from which the total is to be recorded.

187. In a machine of the class described, the combination with a plurality of accumulators, of actuating means therefor, a strip, feeding means therefor, and mechanism controlled by the strip for recording the total on each one of said accumulators as the strip is fed through the machine, and automatically and as an incident thereto, recording special characters to identify the accumulators from which the totals are cleared.

188. In a machine of the class described, the combination with a plurality of accumulators, of actuating means therefor, a perforated strip, feeding means therefor, a recording mechanism, mechanism cooperating with the perforations in the strip for controlling the listing by the recording mechanism of the total of each of the accumulators, and automatically and as an incident thereto, recording special characters to identify the accumulators from which the totals are cleared.

189. In a machine of the class described, the combination with a plurality of accumulators, of actuating means therefor, a strip, feeding means therefor, recording mechanism controlled by the strip for listing the totals of the accumulators, and as an incident thereto recording special characters to identify the accumulators cleared, and means cooperating with the strip for intermittently disabling the feeding means for the purpose of enabling the recording means to record each total.

190. In a machine of the class described, the combination with a plurality of accumulators, of actuating means therefor, mechanism for recording the total of each of said accumulators, and as an incident thereto recording special characters to identify the accumulators from which the totals are recorded, a strip, feeding means therefor, and mechanism controlled by the strip as it is fed through the machine for selecting the various accumulators to have their totals recorded.

191. In a machine of the class described, the combination with the plurality of accumulators, of actuating means therefor, mechanism for recording the total of each of said accumulators, and as an incident thereto record special characters to identify the accumulators from which the totals are recorded, a perforated strip, feeding means therefor, and mechanism cooperating with the perforations in the strip as it is fed through the machine for selecting the various accumulators for the purpose of having their totals recorded.

192. In a machine of the class described, the combination with a plurality of accumulators, of actuating means therefor, record controlled means for selecting the various accumulators to be actuated, mechanism for recording the total of each of said accumulators, and as an incident thereto, record special characters to identify the accumulators from which the totals are recorded, and a strip for controlling the selection of the various accumulators in the recording of their totals.

193. In a machine of the class described, the combination with a plurality of accumulators, of actuating means therefor, a normally inoperative recording mechanism, and totalizing mechanism for rendering the recording mechanism operative for the purpose of listing the total of any of the accumulators, and automatically and as an incident thereto, designate by special characters the accumulators from which the totals are recorded.

194. In a machine of the class described, the combination with a plurality of accumulators, of a set of differentially movable actuators common thereto, and members one for each actuator having a series of graduations for controlling the movement of the actuators and the selection of the accumulator to be actuated.

195. In a machine of the class described, the combination with a plurality of accumulators each comprising a plurality of denominational elements, of special elements one associated with each accumulator and capable of but one movement, the extent of movement of the special elements of the accumulators being different from each other, actuators common to the denominational elements of like order, and a differentially movable member common to the special elements, type carriers controlled by the actuators for printing amounts, and a type carrier controlled by the differential member controlled by the special elements for recording special characters beside the amounts recorded to identify the accumulators actuated by the actuators.

196. In a machine of the class described, the combination with a plurality of accumulators each comprising a plurality of movable denominational pinions, of special pinions, one associated with each accumulator actuators for the accumulators, and recording mechanism under the control of the actuators for recording the amount of actuation of the actuators, and under the control of the special pinions for recording special characters beside the amounts recorded to identify the accumulators actuated.

197. In a machine of the class described, the combination with a plurality of accumulators each comprising a plurality of rotary denominational elements, of special rotary elements each associated with a corresponding accumulator and each capable of but one extent of movement, actuators for the accumulators, type carriers controlled by the actuators for recording the totals accumulated on the accumulators, members common to the special elements of the various accumulators, and type carriers controlled by said members for recording characters to identify the accumulators from which the totals are recorded.

198. In a machine of the class described, the combination with a plurality of accumulators each comprising a plurality of rotary denominational elements, of special rotary elements one associated with each accumulator and each capable of but one extent of movement, actuators for the accumulators, type carriers controlled by the actuators for recording the totals accumulated on the accumulators, members common to the special elements of the various accumulators, type carriers controlled by said members for recording characters to identify the accumulators from which the totals are recorded, means normally locking the members for the special elements against movement, and means for disabling said locking means when a total is to be recorded.

199. In a machine of the class described, the combination with a plurality of accumulators each comprising a plurality of rotary denominatonal elements, of special rotary elements associated with the accumulators and each capable of but one extent of movement, of actuators for the accumulators, type carriers controlled by the actuators for recording the totals accumulated on the accumulators, members common to the special elements of the various accumulators, type carriers controlled by said members for recording characters to identify the accumulators from which the totals are recorded, means for normally locking the actuators of the denominational elements and the members for the special elements against movement, and means for disabling said locking means when a total is to be recorded.

200. In a machine of the class described, the combination with a plurality of groups of accumulators each comprising the plurality of denominational elements, of special movable elements associated with the accumulators, a set of actuators for each group of accumulators common to the like denominational elements of each group, differentially movable members common to the special elements of the accumulators of each group and controlled thereby, type carriers, controlled by said actuators for recording the total accumulated on any desired accumulator of any group, and type carriers controlled by the differentially movable members for the special elements for recording special characters to identify the accumulators from which the totals are taken.

201. In a machine of the class described, the combination with a plurality of groups of accumulators each comprising a plurality of denominational elements, of special elements associated with the accumulators, a set of actuators for each group of accumulators, differentially movable members, common to the special elements of the accumulators of each group, and controlled thereby, type carriers controlled by said actuators for recording the amount of actuation of any desired accumulator of any group, and type carriers one for each differentially movable member for recording characters to designate beside the amounts recorded the accumulators actuated, the type carrier for a differentially movable member of but one group of accumulators being used to record the characters when a total of an accumulator of that group is being recorded, and the type carriers for the differentially movable members of more than one group is used when the amount of actuations of an accumulator of another group is being recorded.

202. In a machine of the class described, the combination with a plurality of groups of accumulators each comprising the plurality of denominational elements, of special movable elements associated with the accumulators, a set of actuators for each group of accumulators, differentially movable members, common to the special elements of each accumulator of each group and controlled thereby, type carriers normally inoperative and controlled by said actuators for recording the total accumulated on any desired accumulator of any group, and type carriers normally inoperative and controlled by the differentially movable members for the special elements in all the groups of accumulators for recording special characters to identify the accumulators from which the totals are taken, and means for rendering said type carriers operative when totals are to be recorded.

203. In a machine of the class described, the combination with a plurality of groups of accumulators each comprising a plurality of denominational elements, of special elements associated with the accumulators, a set of actuators for each group of accumulators common to the like denominational elements of the accumulators of each group for entering items on the accumulators, differentially movable members common to the special elements for each group of accumulators and controlled thereby, type carriers controlled by said actuators for recording the total accumulated on any desired accumulator of any group, and type carriers controlled by the differentially movable members for recording special characters to identify the accumulators from which the totals are recorded.

204. In a machine of the class described, the combination with a plurality of groups of accumulators each comprising a plurality of denominational elements, of special elements associated with the accumulators, a set of actuators for each group of accumulators common to the like denominational elements of the accumulators in their groups, differentially movable members common to the special elements of the accumulators of each group and controlled thereby, type carriers controlled by the said actuators for recording the amount of actuation of any desired accumulator of any group, type carriers one for each differentially movable member for designating beside the amounts recorded the accumulators actuated, the type carrier for a differentially movable member of but one group of accumulators being used to record the characters when a total of an accumulator of that group is being recorded, and the type carriers for the differentially movable members of more than one group is used when the amount of actuations of an accumulator of another group is being recorded, and record controlled means for selecting the accumulator to be actuated.

205. In a machine of the class described, the combination with a plurality of groups of accumulators each comprising the plurality of denominational elements of special movable elements associated with the accumulators, a set of actuators for each group of accumulators common to the like denominational elements of the accumulators of each group, differentially movable members, common to the special elements for the accumulators of each group, and controlled thereby, type carriers normally inoperative and controlled by said actuators for recording the total accumulated on any desired accumulator of any group, type carriers normally inoperative and controlled by the differentially movable members for the special elements for recording special characters to identify the accumulator from which the total is taken, means for rendering said type carriers operative when a total is to be recorded, and record controlled means for selecting the accumulator from which a total is to be recorded, 206. In a machine of the class described, the combination with a plurality of groups of accumulators each comprising a plurality of denominational elements, of special elements associated with the accumulators, a set of actuators for each group of accumulators common to the like denominational elements of the accumulators of each group for entering items on the accumulators, differentially movable members common to the special elements of each group of accumulators and controlled thereby, type carriers controlled by said actuators for recording the total accumulated on any desired accumulator of any group, type carriers controlled by the differentially movable members for recording special characters to identify the accumulators from which the totals are recorded, record controlled means for controlling the extent of movement of the actuators in an item entering operation, and selecting the accumulator to be actuated in both item entering and total taking operations.

207. In a machine of the class described, the combination with a plurality of accumulators each comprising a plurality of denominational pinions, of actuating means therefor, a special pinion associated with each accumulator, spring means for each special pinion for normally retaining the latter in normal position, means for limiting the extent of movement of the special pinions, differentially movable racks controlled by said special pinions and movable to an extent dependent upon the accumulator actuated, and type carriers controlled by said differentially movable members for recording special characters to identify the accumulators actuated.

208. In a machine of the class described, the combination with a plurality of accumulators each comprising a plurality of denominational pinions, of actuating means therefor, special pinions associated with the accumulators, spring means for the special pinions for normally retaining the latter in normal position, means for limiting the extent of movement of the special pinions, type carriers for recording the amounts accumulated on the accumulators, differentially movable racks controlled by the special pinions, type carriers controlled by said differentially movable racks for recording special characters to identify the accumulators from which the totals are recorded, and record controlled means for selecting the accumulator to be actuated.

209. In a machine of the class described, the combination with a plurality of accumulators arranged in series, of a plurality of frames, each carrying a series of accumulators, actuators common to the accumulators, means for bringing a plurality of accumulators into juxtaposition with the actuators, a selecting device for rocking one of the accumulator frames, to engage the actuators and one of the accumulators brought in juxtaposition therewith, spring means preventing movement of the other frames for the accumulators, and means for positively moving the engaged accumulator out of engagement with the actuators.

210. In a machine of the class described, the combination with a plurality of accumulators, of a corresponding plurality of pivoted frames, each frame carrying an accumulator, actuators common to the accumulators in juxtaposition therewith, a selecting device common to the accumulators for positively rocking any of the accumulator frames to engage an accumulator carried thereby with the actuator, springs for preventing movement of the other accumulator frames, and means common to all the accumulators, for moving the engaged accumulator out of engagement with the actuators.

211. In a machine of the class described, the combination with a plurality of accumulators arranged in series, of the plurality of frames, each carrying a series of accumulators, actuators common to the accumulators, means for bringing an accumulator in each series into juxtaposition with the actuators, a selecting device for rocking any one of the accumulator frames to engage one of the accumulators brought into juxtaposition and the actuator, spring means for preventing movement of the other frames, means for positively moving the engaged accumulator out of engagement with the actuators, and record controlled means controlling the operation of a selecting device.

212. In a machine of the class described, the combination with a plurality of accumulators arranged in series, of the plurality of frames, each carrying a series of accumulators, actuators common to the accumulators, means for bringing an accumulator of each series into juxtaposition with the actuator, a selecting device for rocking any one of the accumulator frames to engage one of the accumulators brought into juxtaposition and the actuator, spring means for preventing movement of the other frames, means for positively moving the engaged accumulator out of engagement with the actuators, and record controlled means controlling the operation of the selecting device and the extent of movement of the actuators.

213. In a machine of the class described, the combination with a plurality of accumulators arranged in series of a plurality of pivoted frames, each frame carrying a series of accumulators, actuators common to the accumulators, means for bringing an accumulator of each series into juxtaposition with the actuators, a selecting device common to the accumulators for positively rocking any of the accumulator frames to engage an accumulator carried thereby with the actuator, spring means for preventing movement of the other accumulator frames, means common to all the accumulators for moving the engaged accumulator out of engagement with the actuators, and record controlled means controlling the operation of the selecting device.

214. In a machine of the class described, the combination with a plurality of accumulators arranged in series, of a plurality of pivoted frames, each frame carrying a series of accumulators actuators common to the accumulators, means for bringing an accumulator of each series into juxtaposition with the actuators, a selecting device common to the accumulators for positively rocking any of the accumulator frames to engage an accumulator carried thereby with the actuators, spring means for preventing movement of the other frames, means for positively moving the engaged accumulator out of engagement with the actuators, and record controlled means controlling the operation of the selecting device and the extent of movement of the actuators.

215. In a machine of the class described, the combination of selective groups of totalizers, means for automatically selecting any totalizer of any group, and means for actuating the selected totalizer.

216. In a machine of the class described, the combination of selective groups of totalizers, record controlled means for selecting any totalizer of any group, and means for actuating the selected totalizer.

217. In a machine of the class described, the combination of selective groups of totalizers, record controlled means for automatically selecting any totalizer of any group, and means for actuating the selected totalizer.

218. In a machine of the kind described, the combination of selective groups of totalizers, means for automatically selecting any totalizer of any group, and means for automatically actuating the selected totalizer.

219. In a machine of the class described, the combination of selective groups of totalizers, record controlled means for selecting any totalizer of any group, and record controlled means for actuating the selected totalizer.

220. In a machine of the class described, the combination of selective groups of totalizers, record controlled automatic means for selecting any totalizer of any group, and record controlled automatic means for actuating the selected totalizer.

221. In a machine of the class described, the combination of groups of totalizers, automatic means for selecting any one of the groups, automatic means for selecting any totalizer of the selected group, and automatic means for actuating the selected totalizer.

222. In a machine of the class described, the combination of groups of totalizers, means for selecting any one of the groups, record controlled means for selecting any totalizer from the selected group, and record controlled means for actuating the selected totalizer.

223. In a machine of the class described, the combination of groups of totalizers, means for selecting any one of the groups, record controlled automatic means for selecting any totalizer of the selected group, and record controlled automatic means for actuating the selected totalizer.

224. In a machine of the class described, the combinations of groups of totalizers, automatic means for selecting any one of the groups, automatic means for selecting any totalizer of the selected group, and means for actuating the selected totalizer.

225. In a machine of the class described, the combination of groups of totalizers, record controlled means for selecting any one of the groups, record controlled means for selecting any totalizer of the selected group, and means for actuating the selected totalizer.

226. In a machine of the class described, the combination of groups of totalizers, record controlled automatic means for selecting any one of the groups, record controlled automatic means for selecting any totalizer of the selected group, and means for actuating the selected totalizer.

227. In a machine of the class described, the combination of a plurality of totalizers each comprising a set of denominational elements all positioned by denominations upon a common shaft, a set of actuators therefor, differentially controlled operating means for positioning the shaft and totalizers with respect to the actuators, and automatic means for controlling the last mentioned means.

228. In a machine of the class described, the combination of a plurality of totalizers each comprising a series of denominational elements arranged by denominations upon a common support, actuators therefor, mechanism for positioning the totalizers with respect to the actuators, mechanism for operating the actuators, automatic means for controlling the operating mechanism to properly position the totalizers and to determine the extent of movement of the actuators.

229. In a machine of the class described, the combination of a plurality of totalizers arranged in a series each totalizer comprising a set of denominational elements positioned by denominations upon a shaft, a single set of actuators for all the totalizers of the series, a main driving mechanism, differential mechanisms for adjusting the totalizers and the actuators respectively, and record controlled means for determining the amount of movement of the differential mechanisms.

230. In a machine of the class described, the combination of a plurality of totalizers arranged in a series, each totalizer comprising a set of denominational elements positioned by denominations upon a shaft, a single set of actuators for all the totalizers of the series, a main driving mechanism, differential mechanisms for adjusting the totalizers and the actuators respectively, and automatic means for determining the amount of movement of the differential mechanisms.

231. In a machine of the class described, the combination with a main operating mechanism, a plurality of totalizers each comprising a plurality of denominational elements with all elements of each denomination grouped together, a set of actuators common to the elements of all of the totalizers, means for shifting the totalizers as a whole to bring the elements of any one of the same into cooperative relation with the actuators, and record controlled means for determining which of the totalizers shall be brought into such relation.

232. In a machine of the class described, the combination of groups of totalizers, a control record having both group and amount determining control points therein, an analyzer for interpreting the record, means controlled by the analyzer for selecting the totalizer or totalizers represented by the control points of the record, and means also controlled by the analyzer for entering on the selected totalizer or totalizers the amounts represented by the amount perforations of the record.

233. In a machine of the class described, the combination of groups of totalizers, a control record having amount determining control points and totalizer group selecting positions with control points in those positions which control groups from which totalizers are to be selected, means controlled by the record for selecting the totalizer or totalizers indicated by the perforations in the group selecting control positions, and means for entering on the selected totalizer or totalizers amounts indicated by the amount control points of the record.

234. In a machine of the class described, the combination of groups of totalizers, a control record having amount determining control perforations arranged in denominational positions and totalizer group selecting positions with control perforations in those positions which control groups from which totalizers are to be selected, an analyzer for interpreting the record, means controlled by the analyzer for selecting the totalizer or totalizers indicated by the control record, and means for entering on the totalizer or totalizers the amounts indicated by the amount perforations of the denominational positions of the record.

235. In a machine of the class described, the combination of groups of totalizers, a control record having one or more denominational positions with digit determining perforations in the positions, and also having totalizer group controlling positions with controlling perforations in those positions which control the groups from which totalizers are to be selected, an analyzer for interpreting the record, means controlled by the analyzer for determining the group or groups from which the totalizer or totalizers are to be selected, means controlled by the analyzer for selecting the desired totalizer or totalizers from the selected group or groups, and means controlled by the analyzer for entering upon the selected totalizer or totalizers the amounts determined by the perforations in the denominational positions of the control record.

236. In a machine of the class described, the combination of a plurality of totalizers arranged by denominations upon a shaft, actuators equal in number to the denominations in the totalizers, automatic means for positioning the totalizers one by one and the actuators relatively to each other, and means for recording the data upon each totalizer as it is cleared.

237. In a machine of the class described, the combination of a plurality of totalizers arranged by denominations upon a single shaft, a set of actuators equal in number to the denominations of the totalizers, means for automatically shifting the shaft with respect to the actuators so as to engage the actuators with the totalizers one by one, and means for recording the data of each totalizer as it is cleared.

238. In a machine of the class described, the combination of a plurality of totalizers arranged in order, means for selecting the totalizers one by one to be restored to zero, actuators equal in number to the denominations of the totalizer for restoring the same to zero, record producing means controlled by each actuator for producing on the record data representing the amount upon its particular denomination, and record producing means for producing upon the record data representing the numbers of the totalizers as they are cleared.

239. In a machine of the class described, the combination of a plurality of registers, a control record having data perforations and classification perforations therein, means controlled by the record for selecting registers as determined by the classification perforations and entering therein the data represented by the data perforations, means controlled by the registers for recording the data which the registers contain, and means for identifying on the record the registers from which the data is taken.

240. In a machine of the class described, the combination of a plurality of registers, a control record having data control perforations and classification control perforations therein, means controlled by the record for selecting registers as determined by the classification perforations and entering therein data as determined by the data control perforations, means for clearing the registers one by one and recording the data contained therein, and means for simultaneously recording the numbers of the registers from which the classified data is taken.

241. In a machine of the class described, the combination of a plurality of registers, record controlled means for entering data upon the registers, means for automatically returning the registers to zero and for simultaneously recording the amounts upon the registers, means for driving the machine, and means for engaging either the record controlled means or the recording means with the driving means and simultaneously locking out the other, so that only one mechanism can be engaged at a time.

242. In a machine of the class described, the combination of a plurality of registers, means common to all of the registers for operating the same, record controlled means for selecting the registers to be actuated when the machine is used to compile data, recording means controlled by the registers when the machine is used to record data, and means for engaging the record controlled means and for disengaging the recording devices when the machine is used to compile data, and for disengaging the record controlled means and engaging the recording devices when the machine is used to record data.

243. In a machine of the class described, the combination of a group of totalizers, actuating means therefor common to all of the totalizers of the group, means for automatically moving the group of totalizers to select the totalizer to be operated by the actuating means, and means for automatically controlling the movement of the actuating means.

244. In a machine of the class described, the combination of a group of totalizers mounted to move together upon a support, an actuating means therefor common to all of the totalizers of the group, means for automatically moving the group of totalizers and the actuating means relative to each other to position the totalizers one at a time for operation, and means for automatically controlling the movement of the actuating means.

245. In a machine of the class described, the combination of a group of totalizers mounted to move together and having an idle and an active position, an actuating means therefor common to all of the totalizers of the group, and means for shifting the group of totalizers from its idle to its active position, and means to engage the selected totalizer with the actuating means.

246. In a machine of the class described, the combination of a group of totalizers, actuating means therefor common to all of the totalizers of the group, and record controlled means for moving the group of totalizers to select the totalizer to be operated by the actuating means.

247. In a machine of the class described, the combination of a group of totalizers, actuating means therefor common to all of the totalizers of the group, and automatically controlled differential means for positioning the group of totalizers to select the totalizer to be operated by the actuating means.

248. In a machine of the class described, the combination of a group of totalizers, actuating means therefor common to all of the totalizers of the group, and record controlled differential means for positioning the group of totalizers to select the totalizer to be operated by the actuating means.

249. In a machine of the class described, the combination of a group of totalizers, actuating means therefor common to all of the totalizers of the group, record controlled means for moving the group of totalizers to select the totalizer to be operated by the actuating means, and means for automatically controlling the movement of the actuating means.

250. In a machine of the class described, the combination of a group of totalizers, an actuating means therefor common to all of the totalizers of the group, differential means for positioning the group of totalizers to select the totalizers to be operated by the actuating means, and means for automatically controlling the movement of the actuating means.

251. In a machine of the class described, the combination of a group of totalizers, an actuating means therefor common to all of the totalizers of the group, record controlled differential means for positioning the group of totalizers to select the totalizer to be operated by the actuating means, and means for automatically controlling the movement of the actuating means.

252. In a machine of the class described, the combination of a plurality of totalizers arranged in axial alinement, actuators for the elements of the totalizers, differentially controlled operating means for positioning the totalizers with respect to the actuators, and automatic means for controlling the last mentioned means.

253. In a machine of the class described, the combination of a plurality of totalizers arranged in axial alinement upon a common support, actuators for the several denominational elements of the totalizers, differentially controlled operating means for positioning the totalizers with respect to the actuators, and automatic means for controlling the last mentioned means.

254. In a machine of the class described, the combination of a plurality of totalizers arranged in axial alinement, actuators for the totalizers, differentially controlled operating means for positioning the totalizers with respect to the actuators, and record controlled means for controlling the last mentioned means.

255. In a machine of the class described, the combination of a plurality of totalizers arranged in axial alinement upon a common support, actuators for the totalizers, differentially controlled operating means for positioning the totalizers with respect to the actuators, and record controlled means for controlling the last mentioned means.

256. In a machine of the class described, the combination of a plurality of totalizers, each comprising a set of denominational elements all positioned by denominations upon a common shaft, a set of actuators therefor, differentially controlled operating means for positioning the shaft and totalizers with respect to the actuators, and record controlled means for controlling the last mentioned means.

257. In a machine of the class described, the combination of a plurality of totalizers each comprising a series of denominational elements arranged by denominations upon a common support, actuators therefor, operating mechanism for positioning the totalizers with respect to the actuators and for operating the actuators, and record controlled means for controlling the operating mechanism to properly position the totalizers and to determine the extent of movement of the actuators.

258. In a machine of the class described, a combination of groups of totalizers, a control record having both totalizer and amount determining perforations therein, means controlled by the record for selecting the totalizer or totalizers represented by certain of the perforations of the record, and means also controlled by the record for entering on the selected totalizer or totalizers the amounts represented by the amount perforations of the record.

259. In a machine of the class described, the combination of a plurality of totalizers, each comprising a series of denominational elements arranged by denominations upon a common support, actuators therefor, a control record, operating mechanism controlled by the record for positioning the totalizers with respect to the actuators, and mechanism also controlled by the record for operating the actuators.

260. In a machine of the class described, the combination of a plurality of totalizers, each comprising a series of denominational elements arranged by denominations upon a common support, actuators therefor, a record provided with control perforations, an analyzer for interpreting the record, mechanism controlled by the analyzer for positioning the totalizers with respect to the actuators, and mechanism controlled by the record for operating the actuators.

261. In a machine of the class described, the combination of a plurality of totalizers arranged in a plurality of groups, the corresponding totalizers of the respective groups being similarly arranged, a record having both totalizer and amount determining perforations therein, actuators for the totalizers, differential mechanism controlled by the totalizer perforations, for adjusting the totalizers with respect to the actuators as required by the totalizer perforations in the record, and means controlled by the amount perforations for operating the actuators as required by the amount perforations in the record.

262. In a machine of the class described, the combination of a plurality of groups of totalizers, the totalizers of each group comprising a series of denominational elements arranged by denominations upon a common shaft, actuators therefor, a control record, operating means controlled by the record for positioning the totalizers with respect to the actuators, and means for operating the actuators.

263. In a machine of the class described, the combination of a plurality of registers arranged in a plurality of groups, actuating means common to all of the registers of all of the groups, a record having totalizer selecting perforations arranged therein, means controlled by the record for engaging the registers one by one with the actuating means in the order required by the perforations of the record, and means for operating the actuators.

264. In a machine of the class described, the combination of a plurality of groups of totalizers, the totalizers of each group being arranged upon a single support, a set of actuators equal in number to the denominations of the totalizers, automatic means for engaging the totalizers of all the groups with the actuators one by one, for restoring them to zero, and means for recording the data of each totalizer as it is restored to zero.

265. In a machine of the class described, the combination of groups of totalizers, means for automatically selecting a plurality of totalizers from the groups, and means for concurrently actuating the selected totalizers.

266. In a machine of the class described, the combination of groups of totalizers, record controlled means for selecting a plurality of totalizers from the groups, and means for concurrently actuating the selected totalizers.

267. In a machine of the class described, the combination of groups of totalizers, means for automatically selecting totalizers one from each of a plurality of groups, and means for automatically actuating the selected totalizers.

268. In a machine of the class described, the combination of groups of totalizers, means for automatically selecting totalizers one from each of a plurality of groups, and means for actuating the selected totalizers.

269. In a machine of the class described, the combination of groups of totalizers, record controlled means for selecting totalizers one from each of a plurality of groups, and means for actuating the selected totalizers.

270. In a machine of the class described, the combination of groups of totalizers, record controlled means for selecting one totalizer from each of a plurality of groups, and means for actuating the selected totalizers.

271. In a machine of the class described, the combination of a plurality of registers, a control record having data control points and classification control points, means controlled by the record for selecting registers as determined by the classification control points and entering therein the data represented by the data control points, and means controlled by the registers for making a record of the data which they contain.

In testimony whereof I affix my signature in the presence of two witnesses.

FRED M. CARROLL.

Witnesses:
R. C. GLASS,
CARL W. BENST.